(12) United States Patent (10) Patent No.: US 6,873,911 B2
Nishira et al. (45) Date of Patent: Mar. 29, 2005

(54) METHOD AND SYSTEM FOR VEHICLE OPERATOR ASSISTANCE IMPROVEMENT

(75) Inventors: Hikaru Nishira, Kanagawa (JP); Taketoshi Kawabe, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/356,742

(22) Filed: Feb. 3, 2003

(65) Prior Publication Data

US 2003/0187578 A1 Oct. 2, 2003

(30) Foreign Application Priority Data

Feb. 1, 2002 (JP) ........................................ 2002-025181
Aug. 23, 2002 (JP) ........................................ 2002-243212

(51) Int. Cl.⁷ ............................................. G06F 17/10
(52) U.S. Cl. ......................... 701/301; 701/96; 340/436; 340/901
(58) Field of Search ............................. 701/48, 33, 36, 701/93, 96, 301, 302; 340/425.5, 436, 901; 180/167, 170

(56) References Cited

U.S. PATENT DOCUMENTS

| | | | |
|---|---|---|---|
| 5,465,079 A | * | 11/1995 | Bouchard et al. ............ 340/576 |
| 5,765,116 A | | 6/1998 | Wilson-Jones et al. |
| 5,913,375 A | | 6/1999 | Nishikawa |
| 5,926,126 A | | 7/1999 | Engelman |
| 6,026,347 A | | 2/2000 | Schuster |
| 6,353,785 B1 | * | 3/2002 | Shuman et al. ............... 701/48 |
| 6,577,937 B1 | * | 6/2003 | Shuman et al. ............... 701/48 |
| 6,577,943 B2 | * | 6/2003 | Nakao et al. .................. 701/80 |

FOREIGN PATENT DOCUMENTS

| | | |
|---|---|---|
| DE | 198 21 163 | 11/1999 |
| DE | 100 48 102 | 4/2002 |
| DE | 101 37 292 A | 3/2003 |
| JP | 7-104850 | 4/1995 |
| JP | 9-142236 | 6/1997 |
| JP | 2000-108721 | 4/2000 |
| JP | 2001-52297 | 2/2001 |

OTHER PUBLICATIONS

"Continuation/GMRES Method for Fast Algorithm of Non-linear Receding Horizon Control", Toshiyuki Ohtsuka, Proceedings of the 39th IEEE Conference on Decision and Control, pp. 766–771.

* cited by examiner

*Primary Examiner*—Gertrude A. Jeanglaude
(74) *Attorney, Agent, or Firm*—McDermott Will & Emery LLP

(57) ABSTRACT

A method improves operator assistance of an automobile. On substantially real time basis, data on the automobile and on intervehicle relationship involving the automobile are collected. The data are processed to determine variables for evaluation. The determined variables are evaluated to recommend control input.

53 Claims, 36 Drawing Sheets

FIG. 20
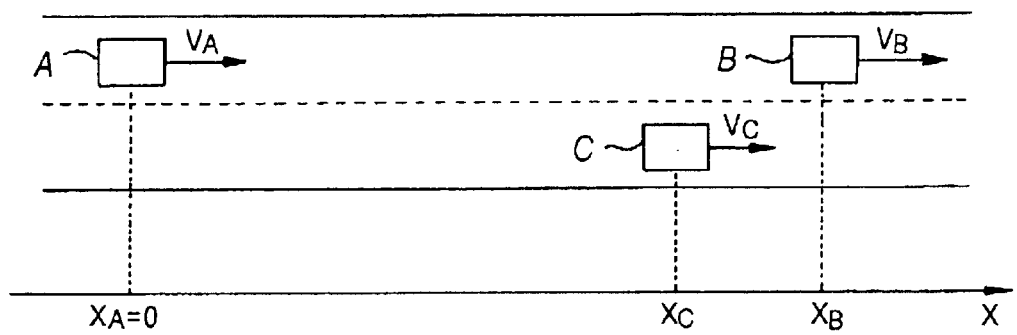
FIG. 21A
q = 1
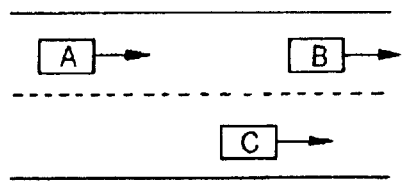

q = 2
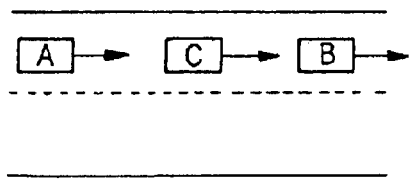

q = 3
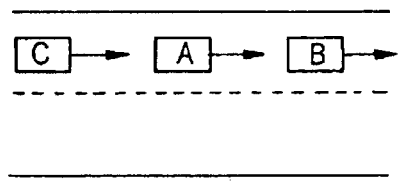

METHOD AND SYSTEM FOR VEHICLE OPERATOR ASSISTANCE IMPROVEMENT

BACKGROUND OF THE INVENTION

1. Field of the Invention

The present invention relates in general to the field of vehicle operation, and more particularly, to a method and system for improving the assistance to a vehicle operator.

2. Description of the Background Art

For each automobile on highways, the drivers cognitive load increase to maintain a safe "headway" to the vehicle it is following and to track a desired trajectory including lane change. Human beings have a finite ability to perceive the vehicle environment in which the vehicle is operating, e.g., the road is conditions, traffic conditions, etc, to attend to elements of the environment, to cognitively process the stimuli taken in, to draw appropriate meaning from perceptions, and to act appropriately upon those perceived meanings. Furthermore, there is great variation within the driving population in both native and developed abilities to drive. Training experience can be used. Unfortunately, there is little formal or informal training in the skills involved in driving, beyond the period when people first apply for their licenses. Driver training programs have not proven to be particularly effective, nor is training continued through the driving career. In fact, most people think of driving as a right rather than a privilege. Further, most think of themselves as good drivers and of "the other person" as the one who creates problems. Unless and until change takes place that encourages drivers to wish to improve their driving skill, it seems that technological solutions designed to minimize cognitive load have the potential for improving the safety of the highway transportation system.

To address these safety concerns, there has been proposed a driver assistance system that attempts to minimize cognitive load in making lane change. The system operates continuously taking in vehicle environment data that encompasses data related to the environment in which the vehicle is operating, e.g., the road conditions, traffic conditions, etc. Sensing devices provide the vehicle environment data. Radar, laser, ultra-sonic and video systems can provide a map of objects near the vehicle and their motion relative to the vehicle. JP-A2001-52297 proposes a system of this category. The map provides present locations and speeds of vehicles, which are evaluated to justify a proposed action, e.g., lane change. The concept behind is to recommend action or actions, which the present environment data allows. Since the data available is limited to what the map provides, the action or actions recommended fail to accomplish a satisfactory level of driving skill. For example, a vehicle operator of improved driving skill would employ accelerating/braking and lane change maneuvers if the present vehicle environment does not allow a lane change. Apparently, s/he sees future vehicle environment upon initiating such maneuvers.

For a variety of reasons, it is desirable to develop a method and system for improving assistance to a vehicle operator, which is fit to and thus accepted by the vehicle operator.

SUMMARY OF THE INVENTION

The present invention provides, in one aspect thereof, a method for improving operator assistance of an automobile, the method comprising:

collecting, on substantially real time basis, data on the automobile and on intervehicle relationship involving the automobile;

processing the data to determine variables for evaluation; and evaluating the determined variables to recommend control input.

BRIEF DESCRIPTION OF THE DRAWINGS

The present invention will be apparent from reading of the following description in conjunction with the accompanying drawings.

FIG. 12 illustrates an example of driving situation, which the present invention is applicable to.

FIG. 18 illustrates an example of driving situation, which the present invention is applicable to.

FIG. 20 illustrates an example of driving situation for explaining the operation of the present invention.

FIGS. 21A, 21B and 21C illustrate three future intervehicle relationships derivable from the illustrated driving situation in FIG. 20.

FIG. 28 illustrates an example of driving situation, which the present invention is applicable to.

FIG. 32 illustrates an example of driving situation, which the present invention is applicable to.

FIG. 36 illustrates an example of driving situation, which the present invention is applicable to.

DETAILED DESCRIPTION OF THE INVENTION

Figure 1:
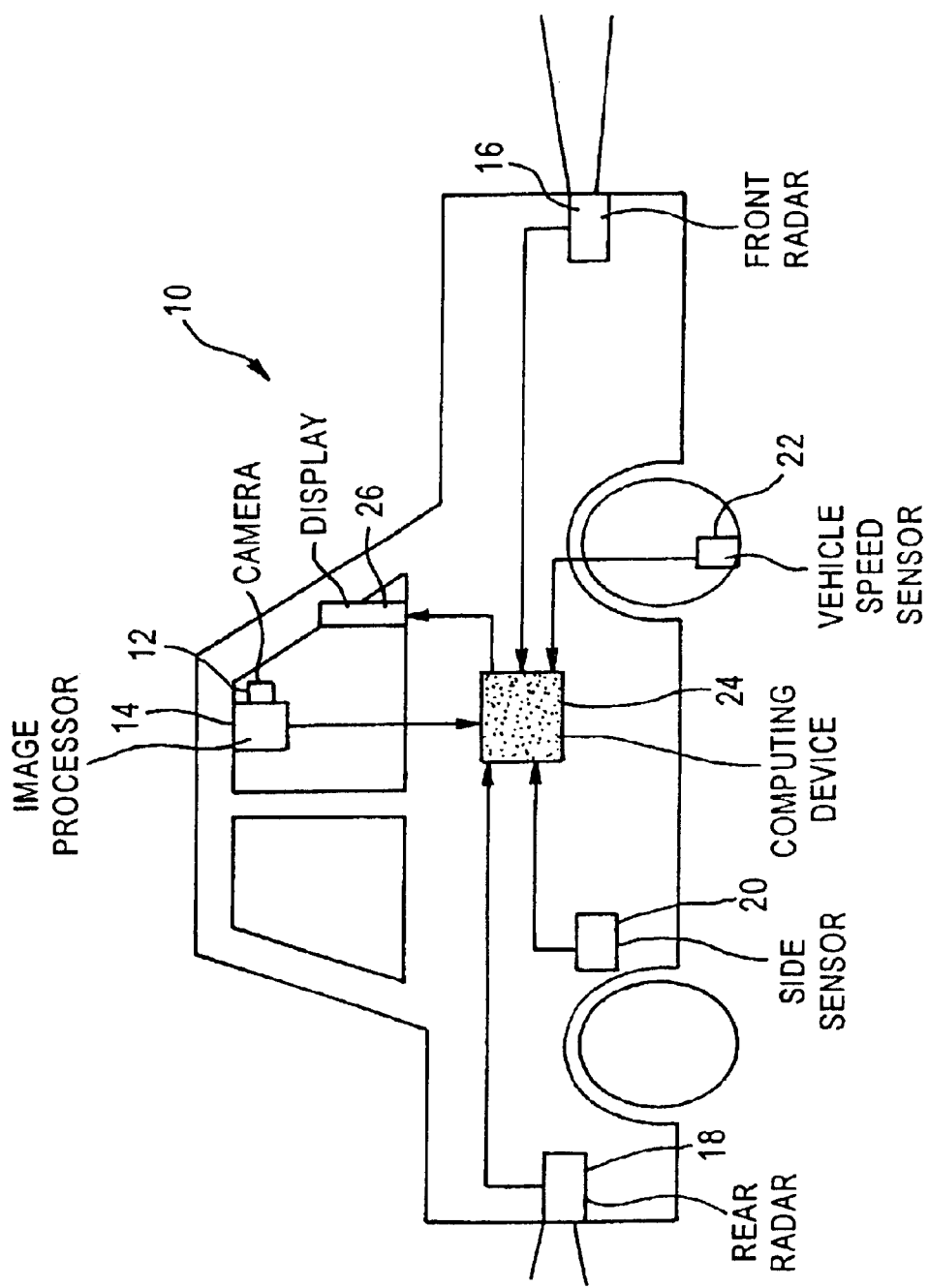
FIG. 1 is an automobile installed with a method and system for improving assistance to a vehicle operator in accordance with one exemplary implementation of the present invention.

As used throughout this specification, the terms vehicle operator and driver are used interchangeably and each are used to refer to the person operating an automobile. The term automobile is used to refer to the automobile operated by a vehicle operator and installed with a method and system for improving operator assistance. The term obstacle vehicle is used to refer to one of a group of obstacle vehicles located in and coming into a monitored field around the automobile, Referring to FIGS. 1 and 2, an automobile is generally designated at 10 although it is labeled "A" in each of the driving situations. The automobile 10 is installed with an environment sensing system (ESS) and a state sensing system (SSS). In the embodiment, the ESS detects current locations of a group of obstacle vehicles on a road in a monitored field around the automobile 10 and lane markings to recognize locations of lanes on the road. The SSS detects vehicle speed of the automobile 10.

The automobile 10 is provided with a camera 12. The camera 12 is mounted on the automobile 10, for example, in the vicinity of the internal rear-view mirror in order to detect the presence of lane markings on a road. In response to signals from the camera 12, a signal image processor 14 estimates the presence of the adjacent lane or lanes, if any, on the road. The automobile 10 is provided with front radar 16. The front radar 16 is mounted on the automobile 10, for example, in the middle of the front grille in order to detect the locations of obstacle is vehicle/s in front. The automobile 10 is provided with rear radar 16. The rear radar 16 is mounted on the automobile 10, for example in the middle of the rear grille in order to detect the locations of obstacle vehicle/s in rear. The automobile 10 is provided with two side sensors, only one shown at 20. The side sensors 20 are mounted on the automobile 10, for example in appropriate portions viewing the adjacent lateral traffic conditions in order to detect the locations of obstacle vehicle/s in the adjacent lane/s. Each side sensor 20 may be in the form of an ultrasonic sensor or a camera combined with an image processor. Of course, radar may be used as each side sensor 20. The camera 12 and image processor 14 are used to complement, if need be, the information derived from the front radar 16.

In the embodiment, the ESS includes the camera 12, image processor 14, front radar 16, rear radar 18 and side sensors 20.

The automobile 10 is provided with a vehicle speed sensor that includes a rotary encoder 22. The rotary encoder 22 is mounted on a road wheel of the automobile in order to generate a pulse train having varying period with revolution speed of the road wheel.

In the embodiment, the SSS includes the vehicle speed sensor incorporating the rotary encoder 22.

The automobile 10 is provided with a computing device 24. The computing device 24 includes a microprocessor-based controller that includes a microprocessor in communication with its peripheral devices. The microprocessor is in communication with computer-readable storage medium. As will be appreciated by those skilled in the art, the computer-readable storage medium, for example, may include a random access memory (RAM), a read-only memory (ROM), and/or a keep-alive memory (KAM). The computer-readable storage medium has stored therein data relating to computer-readable instructions is for the microprocessor to perform a method for improving the assistance to the vehicle operator in driving the automobile 10. The microprocessor processes incoming signals from the image processor 14, front radar 16, rear radar 18, side sensors 20 and rotary encoder 22 to recommend control input. An example of a vehicle application area is the field of driver assistance. In the illustrated embodiment, the computing device 24 applies the recommended future control input to a trajectory processor coupled with an interface 42 having a display 26. The trajectory processor includes a microprocessor in communication with its peripheral devices.

Figure 2:
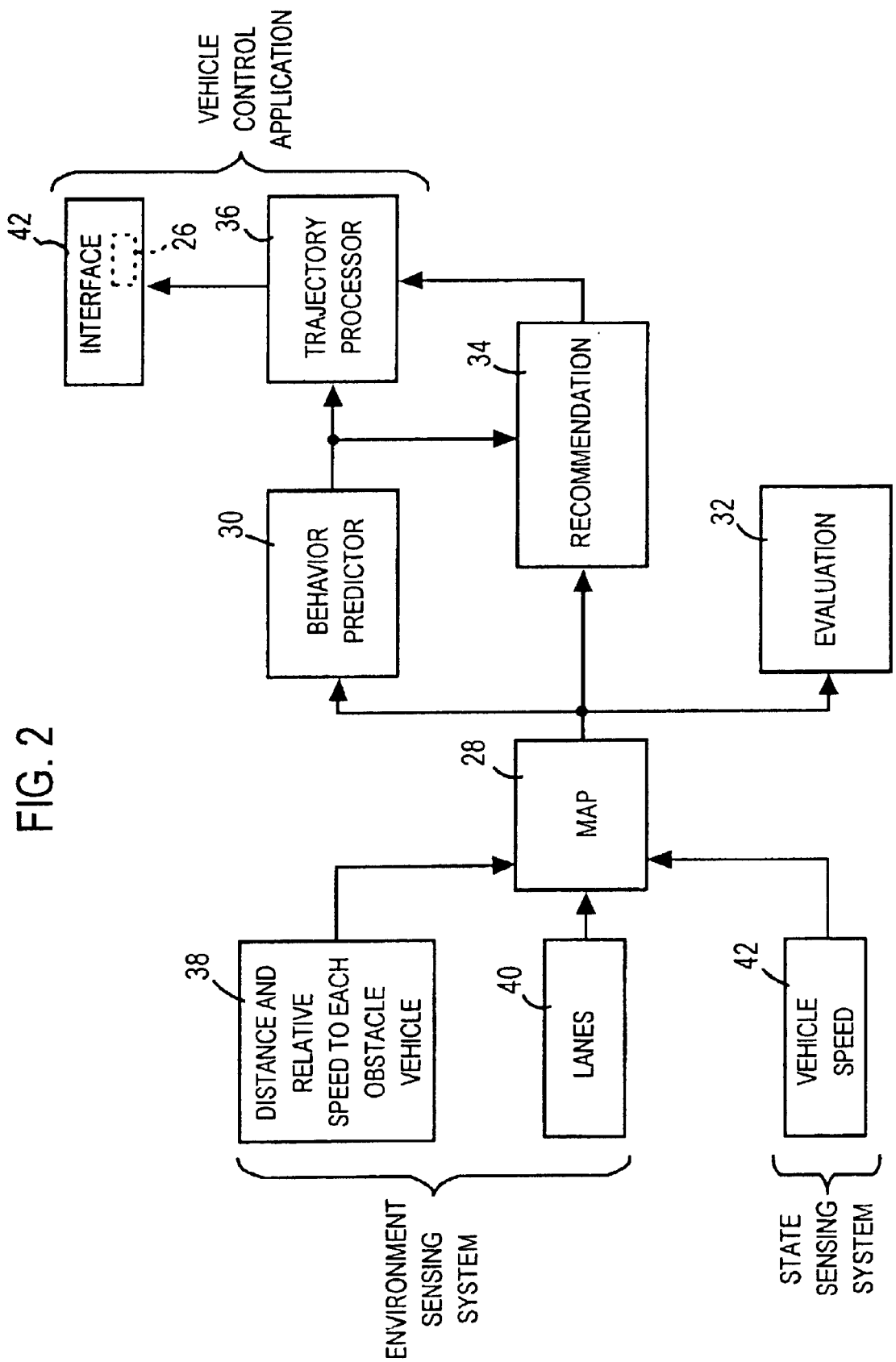
FIG. 2 is a block diagram illustrating the present invention.

With particular reference to FIG. 2, the system includes a map component 28, a behavior predictor component 30, an evaluation component 32, and a recommendation component 34. In FIG. 2, the trajectory processor illustrated at 36. Boxes 38, 40 and 42 represent automobile environment data and automobile state or state data carried by output signals of the ESS (12, 14, 16, 18, and 20) and SSS (22). The map component 30, evaluation component 32 and recommendation component 34 are hardware or software components, respectively. They are illustrated in FIG. 2 as separate elements for purposes of clarity and discussion. It will be appreciated that these components may be integrated into single module within the computing device 24.

Figure 3:
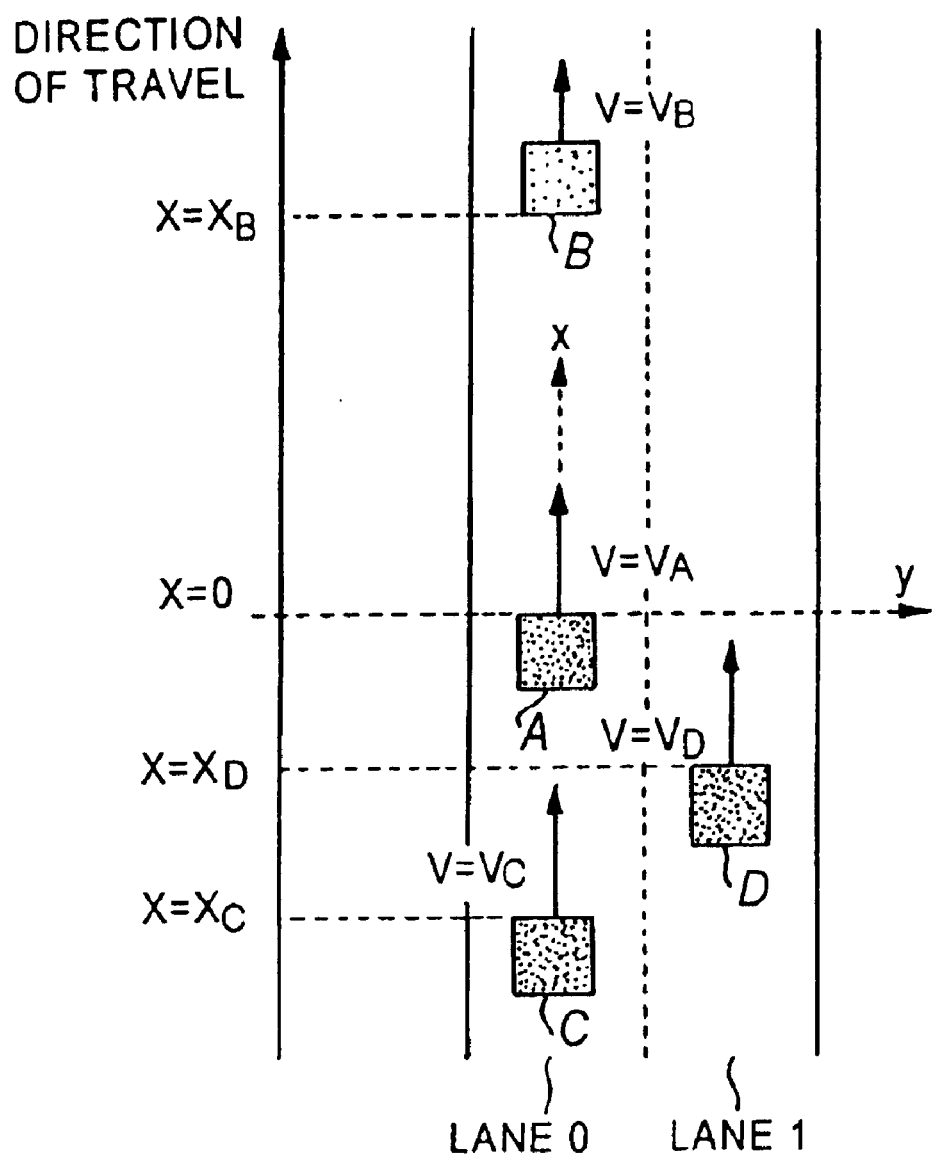
FIG. 3 illustrates an example of driving situation.

FIG. 3 demonstrates a driving situation within a roadway system having two lanes. In this driving situation, the automobile 10, now labeled A, is traveling at a longitudinal speed of $v_A$, and a group of obstacle vehicles, labeled B, C and D, are within the monitored range around the automobile A. In the same lane, the automobile A has the leading vehicle B and the following vehicle C. These obstacle vehicles B and C are traveling at longitudinal speeds of $v_B$ and $v_C$, respectively. In the adjacent next right lane 1, the obstacle vehicle D is traveling at a longitudinal vehicle speed of $v_C$. Using the Cartesian coordinate system fixed to the automobile A, the driving situation may be described. The intersection of the x- and y-axes is fixed at a portion on the front bumper of the automobile A. The x-axis extends in the traveling direction of the automobile A. The y-axis extends in the lateral direction of the automobile A.

Map Component 28:

With reference to the above-mentioned driving situation, we explain the system illustrated in FIG. 2 in detail. This system includes the map 28, which is coupled to the ESS and SSS. The ESS provides the environment data 38 and 40, which contain information of: distance to each of the obstacle vehicles B, C and D, relative speed to each obstacle vehicle, and location of lanes on the road. Millimeter radar, if employed, can directly provide information of relative speed to the obstacle vehicle. If other type of radar is used, a derivative filter may be used to provide the derivative of the output signal as information of relative speed. The SSS provides the vehicle state data 42, which contains information of: vehicle speed of the automobile A. In the embodiment, such pieces of information are used as inputs of the map 28 and processed for describing the present location and speed of each of the automobile A and obstacle vehicles B, C and D.

The map 28 recognizes which of the lanes each of the automobile A and obstacle vehicles B, C and D is. Assuming that an obstacle vehicle is in the same lane as the automobile A is, the situation is described as y=0. Assuming that an obstacle vehicle is in the adjacent next lane, the situation is described as y=1, if the adjacent next lane is on the right-hand side of the lane 0, or as y=−1, if the adjacent next lane is on the left-hand side of the lane 0. For example, in the illustrated driving situation in FIG. 3, it gives y=0 for the obstacle vehicles B and C, and y=1 for the obstacle vehicle D. The map 28 computes the position on the x-axis of the nearest one of head and tall of each of the obstacle vehicles B, C, and D. For example, in the illustrated driving situation in FIG. 3, it gives $x=x_B$ for the obstacle vehicle B, $x=x_C$ for the obstacle vehicle C, and $x=x_D$ for the obstacle vehicle D. The map 28 computes a longitudinal vehicle speed of each of the obstacle vehicles based on the vehicle speed of the automobile A and the relative speed to the obstacle vehicle. For example, in the illustrated driving situation, it gives $v=v_B$ for the obstacle vehicle B, $v=v_C$ for the obstacle vehicle C and $v=v_D$ for the obstacle vehicle D.

Thus, the map 28 describes the current driving situation as
($x=0$, $v=v_A$, $y=0$) for the automobile A;
($x=x_B$, $v=v_B$, $y=0$) for the obstacle vehicle B;
($x=x_C$, $v=v_C$, $y=0$) or the obstacle vehicle C; and
($x=x_D$, $v=v_D$, $y=1$) for the obstacle vehicle D.

The detailed description on the technique of computing the location of each lane and the distance to each obstacle vehicle is hereby omitted because it belongs to the prior art including, for example, JP-A 9-142236.

Figure 4:
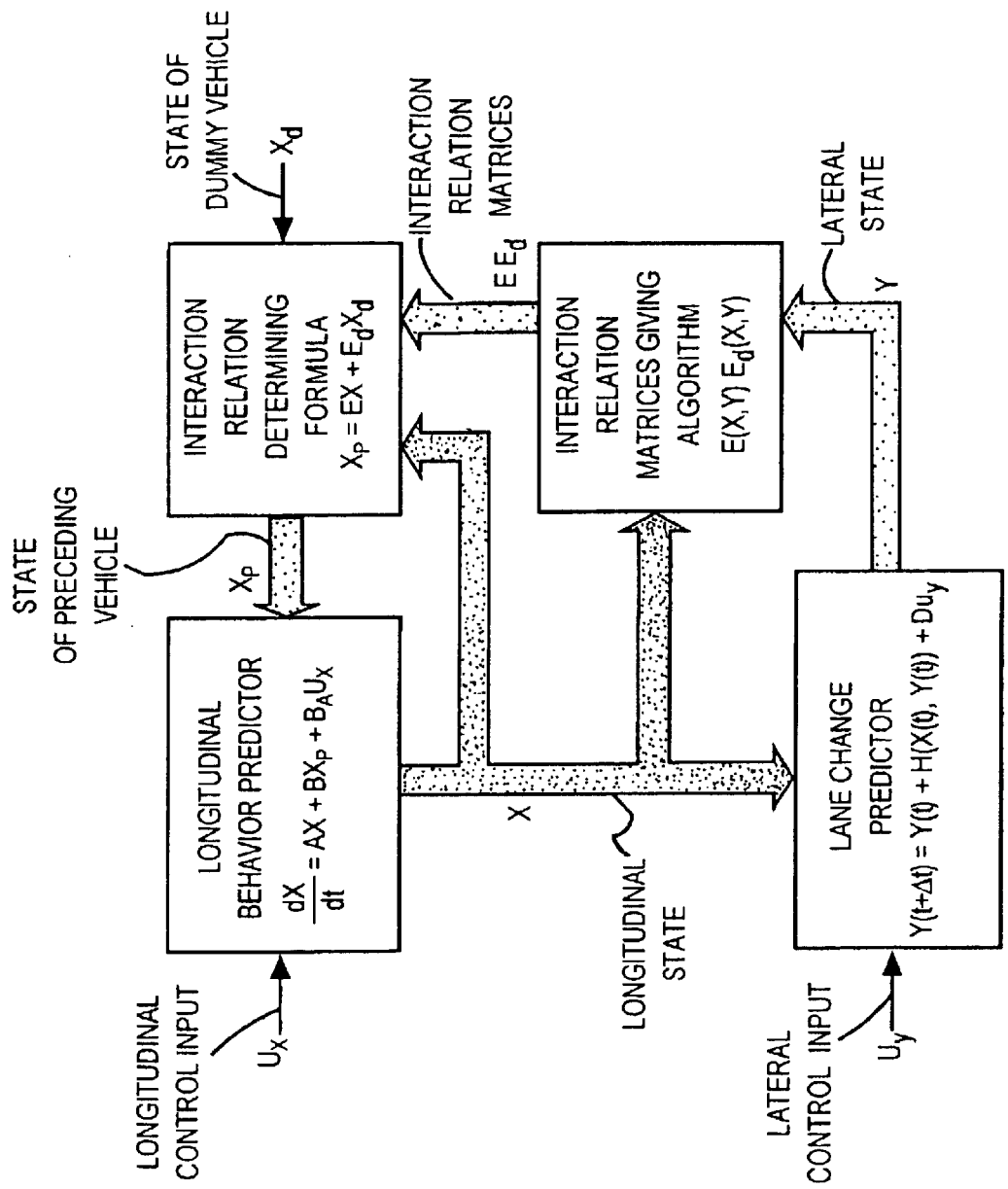
FIG. 4 is a block diagram of a behavior predictor is component.
Figure 5:
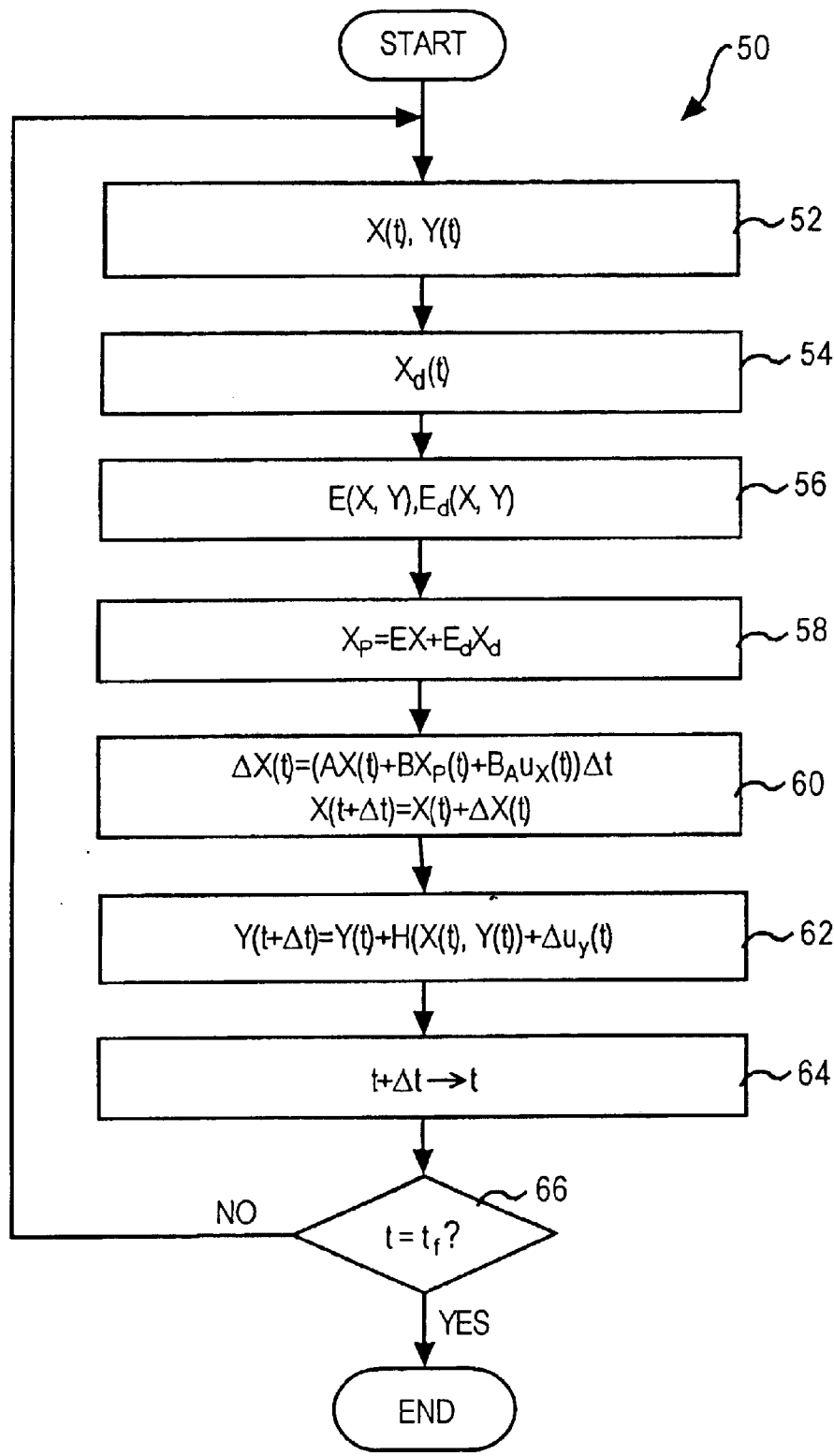
FIG. 5 is a flow chart illustrating operation of the behavior predictor component.

Behavior Predictor Component 30:

With reference also to FIGS. 4 and 5, the future behavior of the obstacle vehicles B, C and D may vary with different control input to the automobile A. Knowing in advance how each control input influences the future behavior is important. The behavior predictor 30 presents a predictor equation for simulation to give how control input to the automobile A influences the future behavior of the obstacle vehicles B, C and D. For further discussion, control input may be expressed as a set of longitudinal control input $u_x(t)$ and lane change or lateral control input $u_y(t)$. In the embodiment, the longitudinal control input $u_x(t)$ is expressed by a command for acceleration/deceleration. The lane change or lateral control input $u_x(t)$ may be expressed as $$u_y = \begin{cases} -1 & \text{... lane change to the left} \\ 0 & \text{... as it is} \\ 1 & \text{... lane change to the right} \end{cases} \quad (1)$$

We consider a vehicle model applicable to the vehicles in the illustrated driving situation in FIG. 3. The vehicle model is made of a longitudinal model component and a lane change model component. We explain the longitudinal model component below, and the lane change model component later.

First, we consider a first longitudinal model component that a vehicle follows the preceding vehicle in the same lane with time headway kept constant. This longitudinal model component may be expressed as $$\dot{x}=v$$
$$\dot{v}=k_1(x_p-x-h_v)+k_2(v_p-v) \quad (2)$$

where
x and v are the location and the vehicle speed of the vehicle following the preceding vehicle;
$\dot{v}$ is the vehicle acceleration;
$x_p$ and $v_p$ are the location and the vehicle speed of the preceding vehicle;
h is the desired value of time headway that is defined by D/v, D is the sum of the intervehicle spacing and the length of the preceding vehicle; and
$k_1$ and $k_2$ are the characteristic parameters expressing the dynamics of the vehicle following the preceding vehicle.

Second, we consider a second longitudinal model component that a vehicle has no preceding vehicle to follow and the vehicle travels at a desired value of vehicle speed. This longitudinal model component may be expressed as $$\dot{x}=v$$
$$\dot{v}=k_2(v_d-v) \quad (3)$$

where
$v_d$ is the desired value of vehicle speed.
Combining the equations (2) and (3), we have $$\frac{d}{dt}x = A_0 x + B_0 x_p \quad (4)$$

where $$x = \begin{bmatrix} x \\ v \end{bmatrix}, A_0 = \begin{bmatrix} 0 & 1 \\ -k_1 & -hk_1 - k_2 \end{bmatrix}, B_0 = \begin{bmatrix} 0 & 0 \\ k_1 & k_2 \end{bmatrix} \quad (5)$$

$$x_p = \begin{cases} (x_p \ v_p)^T & \text{for a vehicle having the preceding vehicle} \\ (x + hv \ v_d)^T & \text{for a vechicle having no vehicle to follow} \\ & \text{notation} \end{cases} \quad (6)$$

T is the evaluating (or predicting) period.
The equation (6) clearly indicates that the absence of or failure to detect the preceding vehicle is equivalent to the presence of a virtual preceding vehicle having the state $(x+hv \ v_d)^T$.

In each of the above-mentioned longitudinal model components, the state of preceding vehicle determines rule, which the following vehicle should obey. In a group of vehicles, each vehicle needs description on another vehicle it is preceding. Taking the illustrated driving situation in FIG. 3 as an example, the obstacle vehicle B is leading the automobile A, which is, in turn, leading the obstacle vehicle C. The obstacle vehicles C and D do not lead any vehicle. Let it be defined that $x^i$ is the state vector of a vehicle i, $x_p^i$ the state vector of the preceding vehicle, which the vehicle i is following, and $x_d^i$ the desired state vector of the vehicle i, where i=A or B or C or D. The illustrated driving situation in FIG. 3 may be described as $$x_P^A = x^B, \quad x_P^B = x_d^B, \quad x_P^C = x^A, \quad x_P^D = x_d^d \tag{7}$$

where $$x_d^i = \begin{bmatrix} x_i + hv_i \\ v_d^i \end{bmatrix}, \quad i = \{A, B, C, D\}. \tag{8}$$

Combining the state vectors, we define $$X_p = \begin{bmatrix} x_p^A \\ x_p^B \\ x_p^C \\ x_p^D \end{bmatrix}, \quad X = \begin{bmatrix} x^A \\ x^B \\ x^C \\ x^D \end{bmatrix}. \tag{9}$$

Describing the relationship (7), we have $$X_P = EX + E_d X_d \tag{10}$$

where $$X_d = \begin{bmatrix} x_d^A \\ x_d^B \\ x_d^C \\ x_d^D \end{bmatrix} \tag{11}$$

$$E = \begin{bmatrix} 0 & I & 0 & 0 \\ 0 & 0 & 0 & 0 \\ I & 0 & 0 & 0 \\ 0 & 0 & 0 & 0 \end{bmatrix}, \quad Ed = \begin{bmatrix} 0 & 0 & 0 & 0 \\ 0 & I & 0 & 0 \\ 0 & 0 & 0 & 0 \\ 0 & 0 & 0 & I \end{bmatrix} \tag{12}$$

notation

I represents the second order unit matrix, and 0 the second order zero matrix.

The vectors E and $E_d$, each of which is often called "Interaction Relation Matrix", express the intervehicle positional relationship. They are updated whenever the intervehicle positional relationship changes. For example, if the automobile A moves to a location in front of the obstacle vehicle D after lane change, the vectors E and $E_d$ are updated to express this new intervehicle positional relationship as follows:

$$E = \begin{bmatrix} 0 & 0 & 0 & 0 \\ 0 & 0 & 0 & 0 \\ 0 & I & 0 & 0 \\ I & 0 & 0 & 0 \end{bmatrix}, \quad Ed = \begin{bmatrix} I & 0 & 0 & 0 \\ 0 & I & 0 & 0 \\ 0 & 0 & 0 & 0 \\ 0 & 0 & 0 & 0 \end{bmatrix}. \tag{13}$$

The preceding description shows the first and second longitudinal model component. We now explain a third longitudinal model component appropriate for description of the automobile A. The third longitudinal model component includes vehicle operator longitudinal command $u_x$. The third longitudinal model component may be expressed as $$\dot{x}_A = v_A$$

$$\dot{v}_a = u_x \tag{14}.$$

Combining this third longitudinal model into the equation (4) and arraying from A, we have $$\frac{d}{dt} X = AX + BX_p + B_A u_x \tag{15}$$

where $$A = \begin{bmatrix} A_A & 0 & 0 & 0 \\ 0 & A_0 & 0 & 0 \\ 0 & 0 & A_0 & 0 \\ 0 & 0 & 0 & A_0 \end{bmatrix}, \quad B = \begin{bmatrix} 0 & 0 & 0 & 0 \\ 0 & B_0 & 0 & 0 \\ 0 & 0 & B_0 & 0 \\ 0 & 0 & 0 & B_0 \end{bmatrix}, \quad B_A = \begin{bmatrix} b_A \\ 0 \\ 0 \\ 0 \end{bmatrix} \tag{16}$$

$$A_A = \begin{bmatrix} 0 & 1 \\ 0 & 0 \end{bmatrix}, \quad b_A = \begin{bmatrix} 0 \\ 1 \end{bmatrix}$$

Incorporating the equation (10) into the equation (15), we have a predictor equation as $$\frac{d}{dt} X = (A + BE)X + BE_d X_d + B_A u_x. \tag{17}$$

The predictor equation (17) defines development of X with time in response to time series pattern of $u_x$, if A, 8 and $X_d$ are given. This development of X in response to time series pattern of $u_x$ is nothing but future behavior in the x-direction of the vehicles in response to time series pattern of vehicle operator longitudinal commands. The behavior predictor 30 presents the predictor equation (17), which describes future behavior of the group of the obstacle vehicles B, C and D in the x-direction in response to future vehicle operator longitudinal command.

The predictor equation (17) accounts for interaction between the automobile A and the obstacle vehicles B, C and D. Accounting for such interaction may be omitted in a driving situation illustrated in FIG. 18. In this illustrated driving situation, each vehicle operator can keep driving by looking ahead only so that a change in behavior of the automobile A will not have any influence on behaviors of the obstacle vehicles B, C and D. This is the case where the following predictor equations (18) and (19) may be used.

$$\frac{d}{dt} X = (A + BE)X + BE_d X_d \tag{18}$$

$$\frac{d}{dt} x^A = A_A x^A + b_A u_x \tag{19}$$

where $$x = \begin{bmatrix} x^B \\ x^C \\ x^D \end{bmatrix}, \quad X_d = \begin{bmatrix} x_d^B \\ x_d^C \\ x_d^D \end{bmatrix} \tag{20}$$

$$A = \begin{bmatrix} A_0 & 0 & 0 \\ 0 & A_0 & 0 \\ 0 & 0 & A_0 \end{bmatrix}, \quad B = \begin{bmatrix} B_0 & 0 & 0 \\ 0 & B_0 & 0 \\ 0 & 0 & B_0 \end{bmatrix}$$

-continued $$E = \begin{bmatrix} 0 & 0 & 0 \\ 0 & 0 & 0 \\ 0 & 1 & 0 \end{bmatrix}, E_d = \begin{bmatrix} 1 & 0 & 0 \\ 0 & 1 & 0 \\ 0 & 0 & 0 \end{bmatrix}. \quad (21)$$

The predictor equations (18) and (19) provide almost the same result as the predictor equation (17) does in creating a recommended trajectory for guiding the automobile A in the lane 0 to the appropriate point for lane change to the lane 1. If it is required to create the trajectory after the lane change, accounting for the interaction between the automobile A and the obstacle vehicle D cannot be omitted. In this case, too, the predictor equations (18) and (19) may be used to create another trajectory after the lane change by employing a rule to neglect the following obstacle vehicle D. In this manner, the predictor equations (18) and (19) can provide continuous assistance to the vehicle operator.

In the preceding description, we considered the longitudinal model component. Now, we consider the lane change model component. For various reasons, the vehicle operator determines lane change. In the embodiment, we consider a lane change model component for passing the preceding vehicle, and explain how to implement it as a predictor model. The lane change model component explained here is made of a first subcomponent to determine whether or not a vehicle operator has decided to make lane change, and a second subcomponent to determine whether or not the execution of lane change is possible.

First Subcomponent of Lane Change Model Component:

With continuing reference to the driving situation illustrated in FIG. 3, we proceed with our explanation by regarding the automobile A as a vehicle behaving in the same manner as the other obstacle vehicles B, C and D do in accordance with the model. Consider now the driving scenario that the automobile A starts decelerating by catching the preceding obstacle vehicle B. The vehicle a keeps traveling at longitudinal vehicle speed $V_B$ that is lower than longitudinal vehicle speed $v_A$ at which the automobile was traveling before deceleration. Let it be assumed that the operator of the automobile A has a desired vehicle speed $v_d^A$ and s/he will take driving maneuver involving lane change at appropriate timing to pass the preceding obstacle vehicle that keeps traveling at a vehicle speed lower than the desired vehicle speed $v_d^A$. We now define a variable $z^A(t)$ representing the growth of operator will to change lane. The variable $z^A(t)$ may be expressed as $$z^A(t) = \int_{t_0}^{t} (v_d^A - v_A) dt \quad (22)$$

where $t_o$ is the moment when the automobile A starts decelerating.

A threshold value $z_0^A$ is established. The variable $z^A(t)$ is compared to the threshold value $z_0^A$. When the variable $z^A(t)$ exceeds the threshold value $z_0^A$, it is determined that the vehicle operator of the automobile A has decided to change lane and starts looking the adjacent lane to find a space allowing the lane change.

For each of the obstacle vehicles B, C and D, the automobile A computes the variables $z^B(t)$, $z^C(t)$ and $z^D(t)$.

In the case where the automobile A is equipped with a device to detect direction indicators of the obstacle vehicles, the variable $z^B$ is initialized or increased to a value exceeding the threshold value upon recognition that the direction indicator of the preceding vehicle B, for example, clearly shows that the lane change is imminent.

Second Subcomponent of Lane Change Model Component:

In the driving situation illustrated in FIG. 3, the obstacle vehicle D is in the adjacent next lane. An index is computed, on which it is determined whether or not the intervehicle positional relationship allows the automobile A to change lane to a position in front of the obstacle vehicle D. As one example of the index, we introduce a determination function $f_{LC}(x^A, x^D)$, which may be is expressed as $$f_{LC} = (x^A, x^D) = \frac{x_A - x_D - \frac{1}{2D}(v_A - v_D)^2 s(v_D - v_A)}{v_D} \quad (23)$$

where d is the appropriate value having the dimension of deceleration and indicating the absolute value of the upper limit of a range of deceleration degrees, which the vehicle operator of the obstacle vehicle D experiences during normal braking.

In the equation (23), the function "s" is used. The function "s" may be expressed as $$s(x) = \begin{cases} 0 & x < 0 \\ 1 & x \geq 0. \end{cases} \quad (24)$$

A determination function threshold $f_{LC}^{0}$ is established. When the determination function $f_{LC}(x^A, x^D)$ exceeds the established threshold $f_{LC}^{0}$, it is determined that the intervehicle positional relationship allows the automobile A to change lane in front of the obstacle vehicle D.

We now consider the case when the relative vehicle speed is positive ($v_A \geq v_B$) so that the automobile A is traveling as fast as or faster than the obstacle vehicle D is. When the relative vehicle speed is zero or positive, the determination function $f_{LC}(x^A, x^D)$ expressed by the equation (23) means a "time headway" to the automobile A the obstacle vehicle D is following. Under this condition, when the determination function $f_{LC}(x^A, x^D)$ exceeds the threshold to, the automobile A can change lane to a position in front of the obstacle vehicle D.

Next, we consider the case when the relative vehicle speed is negative ($v_A < v_B$) so that the obstacle vehicle D is traveling faster than the automobile A is. When the relative vehicle speed is negative, the determination function $f_{LC}(x^A, x^D)$ expressed by the equation (23) means a "time headway" to the automobile A recognized at the moment immediately after the vehicle speed of obstacle vehicle D has decreased to the vehicle speed of automobile A as a result of deceleration of the obstacle vehicle D at the value d of deceleration. Under this condition, as the absolute value of the negative relative vehicle speed becomes large, a value of the determination function $f_{LC}(x^A, x^D)$ becomes small, making it hard for the automobile A to change lane.

Let us now consider another driving situation where an obstacle vehicle D* is in the adjacent next lane ahead of the automobile A. In this driving situation, the determination function $f_{LC}(x^A, x^D)$ expressed by the equation (23) cannot be used without modification. The modified determination function $f_{LC}*(x^A, x^D)$ may be expressed as $$f_{LC^*}(x^A, x^{D^*}) = \frac{x_A - x_{D^*} - \frac{1}{2d}(v_{D^*} - v_A)^2 s(v_A - v_{D^*})}{v_A}. \quad (25)$$

Let us now consider other driving situation where two obstacle vehicles D and D* are in the adjacent next lane. In this driving situation, both determination functions $f_{LC}(x^A, x^D)$ and $f_{LC}^*(x^A, x^D)$ are computed and the smaller one of them is compared to the threshold $f_{LC}^0$ in determining the possibility of lane change.

For each of vehicle, processing as mentioned above is carried out to make a determination as to lane change. When the determination indicates that it is allowed to change lane, such a vehicle is processed accordingly.

For description of a group of vehicle in the driving situation, we introduce a vector Y, which contains the information of lane in which each vehicle is. The vector Y may be expressed as $$Y = \begin{bmatrix} y_A \\ y_B \\ y_C \\ y_D \end{bmatrix} \quad (26)$$

We now consider an "auto-man" $H^i(X, Y)$, i={B, C, D}. The auto-man contains the first and second subcomponents of lane change model component, which are expressed by the equations (22) and (23), and provides an output $u_y(t)$ as expressed by the equation (1). A model expressing varying of the vector Y with time may be expressed as $$Y(t+\Delta t)=Y(t)+H(X(t),Y(t))+Du_y \quad (27)$$

where $$H(X(t), Y(t)) = \begin{bmatrix} 0 \\ H^B(X(t), Y(t)) \\ H^C(X(t), Y(t)) \\ H^D(X(t), Y(t)) \end{bmatrix}, D = \begin{bmatrix} 1 \\ 0 \\ 0 \\ 0 \end{bmatrix} \quad (28)$$

$$H^i(X, Y) = \begin{cases} 1 & \ldots z^i(t) > z_0^i \text{ and } y_i = 0 \\ & \text{and } f_{LC}(X^i, X^j) > f_{LC}^0 \;\forall j \; y_i = 1 \\ -1 & \ldots z^i(t) > z_0^i \text{ and } y_i = 1 \\ & \text{and } f_{LC}(X^i, X^k) > f_{LC}^0 \;\forall k \; y_k = 0 \\ 0 & \ldots \text{otherwise} \end{cases} \quad (29)$$

where $\forall j$ and $\forall k$ are for all j and k;

$\Delta t$ is the update period.

A change in Y causes a change in intervehicle positional relationship in the driving situation, making it necessary to adjust the interaction matrices E and $E_d$ to a new intervehicle positional relationship. Besides, it is necessary to initialize the internal variable z(t) of the auto-man H to 0 (zero).

All of the preceding description on the behavior predictor 30 can be understood with reference to block diagram in FIG. 4 or flow chart in FIG. 5.

The block diagram in FIG. 4 clearly illustrates the longitudinal and lane change behavior predictor equations, which are presented by the behavior predictor 30. An example of how a microprocessor would implement the behavior predictor 30 can be understood with reference to FIG. 5. The flow chart in FIG. 5 illustrates a control routine 50 of operation of the behavior predictor 30.

In box 52, the microprocessor inputs X(t) and Y(t). In the next box 54, the microprocessor inputs $X_d(t)$. In box 56, the microprocessor defines E(X, V) and $E_d(X, Y)$. In box 58, the microprocessor computes $X_p$. In boxes 60 and 62, the microprocessor computes the behavior predictor equations. In box 64, the microprocessor increases the timer t by $\Delta t$. In box 66, the microprocessor determines whether or not the timer t matches the terminal time $t_f$. If this is not the case, the logic returns to box 52. In summary, the behavior predictor 30 presents the predictor equations (17) and (27). The longitudinal control input $u_x(t)$ and the lateral control input $u_y(t)$ are given. The initial values of X and Y are given by the map 28. Given these data, the time integral of the predictor equations (17) and (27) will give predicted future values X(t) and Y(t) when the vehicle operator applies the longitudinal and lateral control inputs $u_x(t)$ and $u_y(t)$ to the automobile A.

Evaluation Component 32.

The evaluation component 32 presents an evaluation function, which may be used to evaluate the predicted behavior to determine relevance of control inputs with respect to maneuver(s) designated. The evaluation function generator 32 may be mathematically described as an evaluation index J that is, in this example, a functional with regard to the two control inputs $u_x(t)$ and $u_y(t)$. The evaluation index J may be expressed in generalized form as $$J[u_x, u_y] = \psi(X(t_f), Y(t_f)) + \int_{t_0}^{t_f} \{L(X, Y) + M(u_x, u_y)\}dt \quad (30)$$

where $t_o$ is the present time;

$t_f$ is the terminal time when prediction is terminated;

$\Psi$ is the evaluation function to evaluate the group of vehicles at time $t_f$ when evaluation is terminated;

L is the evaluation function to evaluate behaviors of the group of vehicles during the evaluating period $[t_0 \; t_f]$;

M is the evaluation function to evaluate $u_x(t)$ and $u_y(t)$ during the evaluating period.

We can designate various maneuvers by altering the manner of taking the three different kinds of evaluation functions $\Psi$, L and M. Simple examples are as follows.

1. To meet operator demand for driving at vehicle speeds around a desired value of vehicle speed $v_d^A$, $$J[u_x, u_y] = \int_{t_0}^{t_f} q(v_d^A - v_A)^2 dt. \quad (31)$$

2. To meet operator demand for advancing the automobile A as far as possible in the adjacent next right lane by the time $t_f$, $$J[u_x, u_y] = -p_x x_A(t_f) + p_y(y_A(t_f)-1) \quad (32)$$

3. To meet operator demand for driving with less acceleration feel, $$J[u_x, u_y] = \int_{t_0}^{t_f} r u_x^2 dt. \quad (33)$$

4. To meet operator demand for reaching a point $(x^o, y^o)$ as soon as possible, $$J[u_x, u_y] = \int_{t_o}^{t_f} 1 dt \text{ and } x_A(t_f) = x^o, y_A(t_f) = y^o. \quad (34)$$

5. To meet operator demand for driving with sufficient intervehicle spacing in the same lane, $$J[u_x, u_y] = \int_{t_0}^{t_1} \sum_i I(x_A, y_A, x_i, y_i) dt. \quad (35)$$

where $$I(x_A, y_A, x_i, y_i) = \frac{\bar{\delta}(y_A, y_i)}{(x_A - x_i)^2 + \varepsilon} \quad (36)$$

$$\bar{\delta}(y_A, y_i) = \begin{cases} 0 & \text{if } y_A \neq y_i \\ 1 & \text{if } y_A = y_i \end{cases}.$$

In the equations (31) to (36), $p_x$ $p_y$, q, and r are positive values weighting the associated evaluations, respectively, and $\varepsilon$ is the positive small value for preventing the associated term from becoming infinite. In the equation (34) for the case of 4, the terminal time $t_f$ appears explicitly, and the location of the automobile A at the terminal time $t_f$ (the terminal conditions) is designated explicitly. The manner of treating the terminal time and the terminal conditions may slightly vary with different maneuvers applied. However, the subsequent processing of the equations (31) to (36) remains basically the same.

At least some of the above-mentioned evaluation functions may be used collectively. An evaluation function in the later described equation (41) is one example, in which the evaluation functions for the cases 1, 3, and 5 are mixed. Mixing the evaluation functions makes it possible to account for different operator demands in tradeoff manner.

Adjusting the values of the weighting parameters q and r determines the order in which the different operator demands are preferentially met. For example, it is required that a future trajectory of the automobile A does not interfere with a future trajectory of any of the other obstacle vehicles B, C and D. This essentially requirement is taken into account by the evaluation function expressed by the equation (35). Accordingly, mixing with this evaluation function of at least one of the evaluation functions expressed by the equations (31) to (34) allows creation of manipulated variables for collision avoidance.

Recommendation Component 34:

Before entering into description on the recommendation component 34, we hereby summarize the preceding description on the map 28, behavior predictor 30, and evaluation 32. The map 28 provides the present data on intervehicle relationship in the form of the vector $X(t_0)$ expressed by the equation (9) and the vector $Y(t_0)$ expressed by the equation (26). The behavior predictor 30 presents predictor equations (17) and (27). The predictor equation (27) may be replaced by the predictor equations (18) and (19) in certain driving situation. Here, we give a set of proposed time-series pair of control inputs $u_x^i(t)$ and $u_y^i(t)$. The character i at the shoulder of each of $u_x$ and $u_y$ indicates the positive real number of the whole 1, 2, . . . N. N indicates the number by which the evauating period $[t_0\ t_f]$ is divided. Given the set of proposed time-series pair of control inputs $\{u_x^i(t), u_y^i(t)\}$, the time integral of the predictor equations (17) and (27) predicts future values $X(t)$ and $Y(t)$ indicative of future behavior of the obstacle vehicles group. The evaluation 32 has maneuver or maneuvers. The evaluation 32 evaluates the predicted future values $X(t)$ and $Y(t)$ to determine relevance of each member of the set of proposed time-series pair of control inputs $u_x^i(t)$ and $u_y^i(t)$ with respect to the maneuver(s). Based on the determined relevance, the recommendation 34 determines whether or not each member of the set of proposed time-series of pair of control inputs $u_x^i(t)$ and $u_x^i(t)$ be recommended. The operation of recommendation generator 34 can be understood with reference to the flow chart in FIG. 6.

Figure 6:
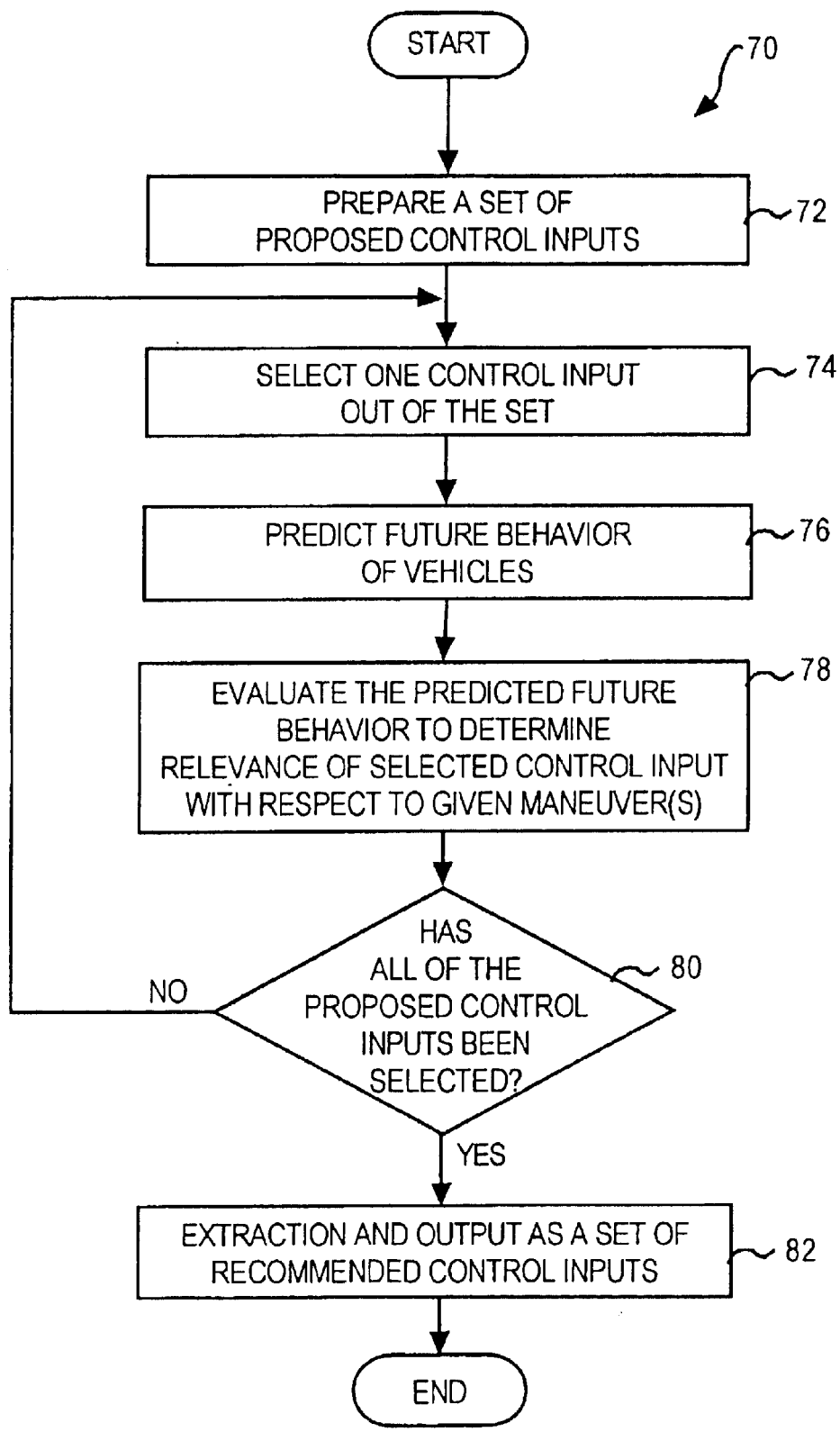
FIG. 6 is a flow chart frustrating operation of a recommendation component.

The flow chart in FIG. 6 illustrates a control routine 70 of one exemplary implementation of the recommendation 34.

In box 72, the microprocessor prepares a set of proposed pairs of control inputs for examination to determine relevance with respect to given maneuver(s). There are various examples of manner of preparing the set of proposed pairs of control inputs. Here, we explain one representative example of such manner below.

A. First, we divide the evaluating period $[t_0\ t_f]$ by N to provide a time interval 1/N $(t_f-t_0)$ of a set of proposed time-series pair of control inputs. The set of proposed is time-series pair of control inputs is described as $$u_x(t_o), u_x\left\{t_o + \frac{1}{N}(t_f - t_o)\right\}, \quad (37)$$
$$\ldots u_x\left\{t_o + \frac{i}{N}(t_f - t_o)\right\}, \ldots u_x\left\{t_f - \frac{1}{N}(t_f - t_o)\right\}$$
$$u_y(t_o), u_y\left\{t_o + \frac{1}{N}(t_f - t_o)\right\}, \ldots u_y\left\{t_o + \frac{i}{N}(t_f - t_o)\right\},$$
$$\ldots u_y\left\{t_f + \frac{1}{N}(t_f - t_o)\right\}$$

B. Second, we consider an allowable range of values which each of control inputs $u_x(t)$ and $u_y(t)$ may take at each of N number of moments within the evaluating period $[t_0\ t_f]$.

As is clear from equation (1), what $u_y(t)$ may take are three (3) values $-1, 0, 1$.

Here, we define the allowable range of values which the control input $u_x(t)$ may take at a given moment of the N number of moments within the evaluating period $[t_0\ t_f)$ as $$u^{min} \leq U_x(t) \leq u_{max}.$$

We quanticize numerical space $(u_{max}-u_{min})$ by dividing it by n to obtain n number of different values. Generalized form of the n number of different values is $$u_x(t) = \left\{ u_{min} + \frac{1}{n-1}(u_{max} - u_{min}), j = 0, \ldots, n-1 \right\} \quad (38)$$

Figure 7:
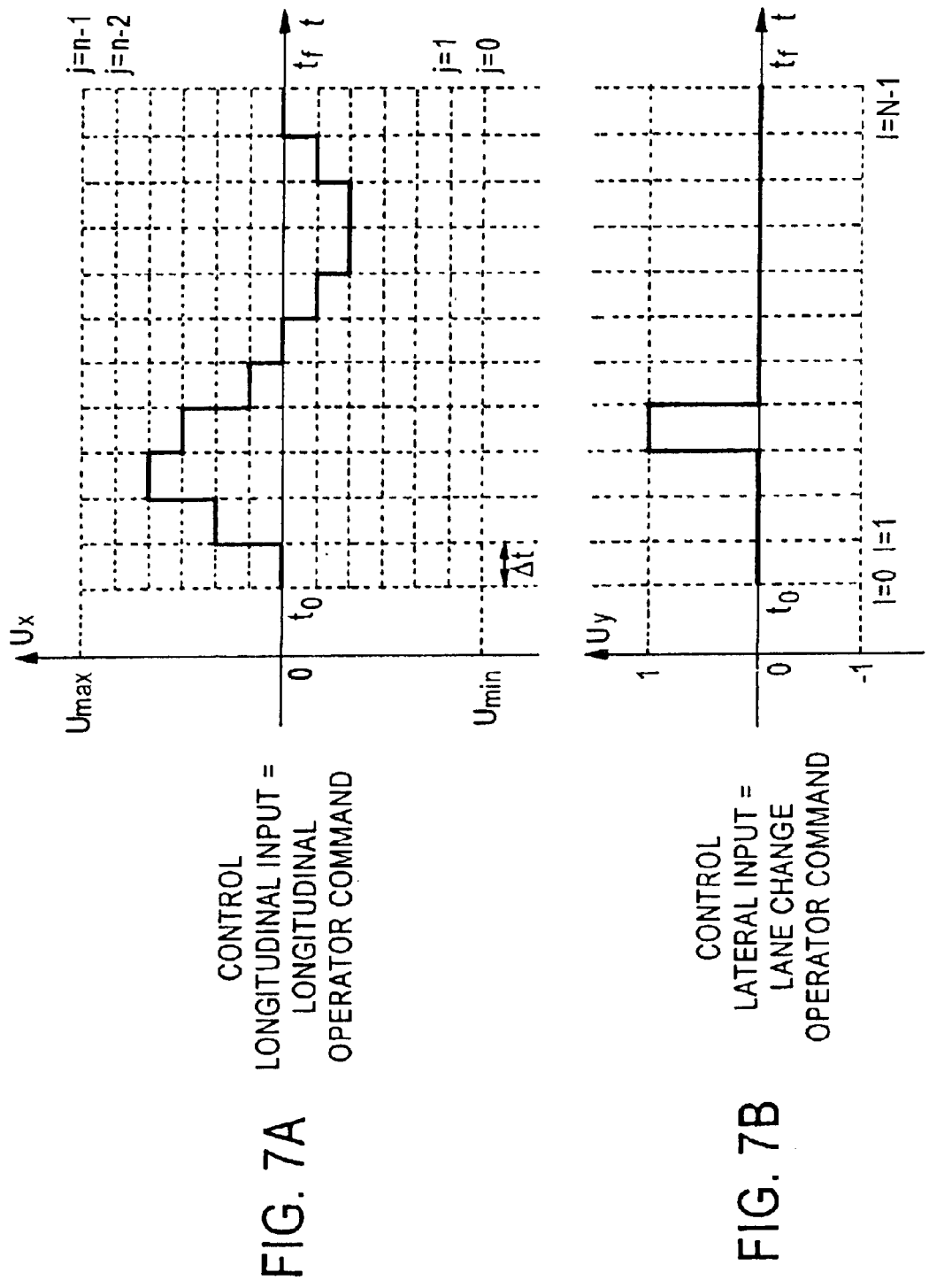
FIGS. 7A and 7B illustrate in broken line grid a set of proposed pairs of control longitudinal and lateral inputs.

As illustrated in FIGS. 7A and 7B, we now have $(3n)^N$ number of values which the control inputs $u_x(t)$ and $u_y(t)$ may take during the evaluating period $[t_0\ t_f]$.

Next, we now explain another representative example of the manner of providing the set of proposed pairs of control inputs. In the first mentioned example, all of $(3n)^N$ number of values needs to be submitted for examination to determine is relevance of each value. According to this example, we assume some driving scenarios derivable from the present intervehicle positional relationship and pick up some probable values, which are fit to the assumed driving scenarios, out of the whole $(3n)^N$.

Next, we now explain another representative example, which uses mathematical equations expressing control laws rather than setting the time-series values. We provide a number (for example, m) of pairs, each pair containing control law governing operator longitudinal input and logic governing operator lateral input (lane change). Each pair may be expressed as $\{f^i(X, Y) H^i(X, Y)\}$. The term $f^i(X, Y)$ expresses control law governing operator longitudinal input, as expressed, for example, by the second equation of equation (2). The term $H^i(X, Y)$ expresses control logic governing operator lateral input (lane change), as expressed, for example, by equation (29). The notation i is the index (i=1, 2, ... m). In this case, substituting $u_x=f^i(X, Y)$ and $u_y=H^i(X, Y)$ into the predictor equations (17) and (27) to give closed loops, respectively, enables the time integration in box 76 as different from the explicitly substituting the time-series values $u_x$ and $u_y$ into them.

In the next box 74, the microprocessor selects one pair from the prepared set of proposed pairs of control inputs.

In box 76, the microprocessor predicts future behavior $X(t)$, $Y(t)$ of all of the vehicles A, B, C and D with respect to the selected proposed pair of control inputs. The microprocessor obtains the result by time integrating the predictor equations (17) and (27) after substituting the selected proposed pair into them, respectively.

In box 78, the microprocessor evaluates the predicted future behavior $X(t)$, $Y(t)$ to determine relevance of the selected pair with respect to given maneuver(s). The microprocessor substitutes the predicted behavior $X(t)$, $Y(t)$ and the selected is pair $u_x$, $u_y$ into the evaluation function generator 32, see also to FIG. 2, that is, into the functional $J[u_x, u_y]$, equation (30), to yield a result, as the relevance of the maneuver(s). We have referred to examples of such maneuvers which may be described into the functional $J[u_x, u_y]$ as the equations (31) to (35). The relationship between the computing result given by the functional $J[u_x, u_y]$ and the relevance may be set in any desired manner. In the embodiment, the computing result reduces as the relevance of the selected pair $u_x$, $u_y$ with respect to the maneuver(s) rises. The computing result is stored in association with the selected pair of control inputs $u_x$, $u_y$.

In the next box 80, the microprocessor determines whether or not the entire proposed pairs of control input have been selected. If this is not the case, the control logic returns to box 74. If the computed results have been stored with respect to all of the prepared proposed pairs of control inputs, the control logic goes to box 82.

In box 82, the microprocessor extracts, as a recommended pair of control inputs for a future moment within the evaluating period $[t_0, t_f]$, at least one proposed pair of control inputs out of the prepared set. The extraction is based on the determined relevance of each proposed pair of the prepared set, which are expressed by the stored computed results of the functional $J[u_x, u_y]$. In the embodiment, the microprocessor extracts a proposed pair of control inputs having the minimum computed value among the computed results for the future moment for each moment within the evaluating period $[t_0, t_f]$. Upon or immediately after the completion of extraction over all of the moments within the evaluating period $[t_0, t_f]$, the microprocessor outputs the extracted proposed pairs of control inputs as a set of recommended pairs of control inputs. If the prepared set is given by the mathematical model $\{f^i(X, Y) H^i(X, Y)\}$, the microprocessor performs necessary conversion to give time-series values as the set of recommended pairs of control inputs.

In the description on the flow chart in FIG. 6, we have shown only one of various examples algorithm. Another example is to terminate predicting future behavior upon finding, as a recommended pair of control inputs for a given moment within the evaluating period $[t_0, t_f]$, a proposed pair of control inputs whose computed value of the functional $J[u_x, u_y]$ is less than or equal to a predetermined value. Other example is to output plural proposed pairs of control inputs if whose computed values of the functional $J[u_x, u_y]$ are less than or equal to a predetermined value.

Trajectory Processor 36:

With reference again to FIG. 2, the trajectory processor 36 is coupled with the recommendation generator 34 and also with the prediction generator 30. In order to compute predicted future trajectories of the entire vehicles A, B, C and D, the trajectory processor 36 time integrates the predictor equations (17), (27), presented by the behavior predictor 30, after substituting the set of recommended pairs of control inputs $u_x(t)$, $u_y(t)$. The computed results are provided to an interface 42. In the embodiment, the interface 42 includes the display 26.

Interface 42:

The interface 42 is coupled to the trajectory processor 36 to form one of various examples of vehicle control applications. In the embodiment, the interface 42 processes the computed results from the trajectory processor 36 to present image and/or voice information to the vehicle operator in a manner to prompt the vehicle operator to applying the set of recommended pairs of control inputs $u_x(t)$, $u_y(t)$ to the automobile A. An example of image information to be presented includes a trajectory that the automobile is recommended to track with or without future trajectories of the obstacle vehicles B, C and D. An example of is voice information includes verbal guidance to prompt the vehicle operator to applying the set of recommended pairs of control inputs $u_x(t)$, $u_y$ to the automobile A. Another example of vehicle control application includes controlling of reaction force opposed to manual effort of acceleration to prompt the vehicle operator to prompt the vehicle operator to applying the recommended control input um to the automobile A.

This section provides the description on updating of the set of recommended pair of control inputs. The terminal time $t_f$ of the prediction time is finite, making it necessary to repeat at regular intervals processing to create an updated set of recommended pair of control inputs. The vehicle environment around the automobile A changes due to incoming vehicle and/or outgoing vehicle with respect to a detectable area by the onboard sensing devices. The vehicle environment also changes if one of the obstacle vehicles B, C and D should take unexpected behavior. These cases demand updating of the recommended pair of control inputs.

Thus, according to the embodiment of the present invention, we use the latest prediction of behavior of the obstacle vehicles for a criterion in determining whether or not updating is required. This latest prediction may be expressed as $$\hat{X}(t), \hat{Y}(t) \tag{39}$$

Expressing the current behavior of the obstacle vehicles as $X(t)$ and $Y(t)$, we define a deviation e as follows:

$$e = k_x(X(t) - \hat{X}(t))^T(X(t) - \hat{X}(t)) + k_y(Y(t) - \hat{Y}(t))^T(Y(t) - \hat{Y}(t)) \tag{40}$$

where $k_x$ and $k_y$ are weighting values.

A deviation threshold $e_{th}$ is established. The microprocessor initiates processing to create an updated set of recommended pairs of control inputs when the deviation e exceeds the threshold deviation $e_{th}$.

Figure 8:
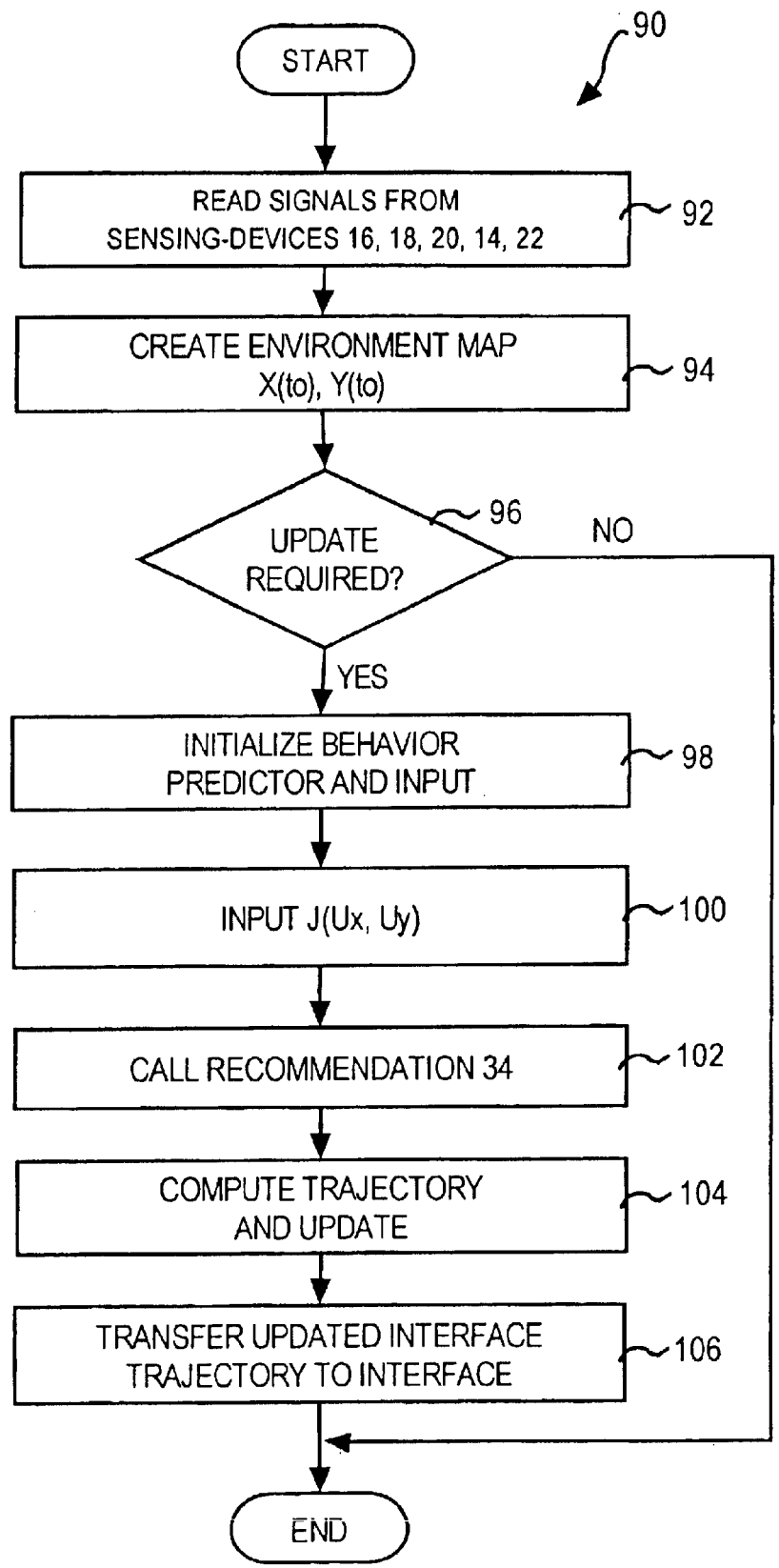
FIG. 8 is a flow chart illustrating operation the present invention.

Referring next to FIG. 8, the operation of the previously described embodiment is explained along with the illustrated driving situation in FIG. 3. The flow chart in FIG. 8 illustrates a control routine 90. At regular intervals, the microprocessor calls this control routine 90 and repeats its execution.

In box 92, the microprocessor within the computing device 24 performs reading operation of the signals from the sensing devices 16, 18, 20, 14, and 22 (see FIG. 1).

In box 94, the microprocessor performs the operation of the map creator 28 (see FIG. 2). Specifically, the microprocessor computes present values of state vectors $X(t_0)$ and $Y(t_0)$. Taking the driving situation in FIG. 3 as an example, the state vectors $X(t_0)$ and $Y(t_0)$ may be expressed as $$X(t_0) = (0 R_B + \dot{R}_B R_C + \dot{R}_C R_D + \dot{R}_D)^T$$

$$Y(t_o) = \begin{bmatrix} 0 \\ 0 \\ 0 \\ 1 \end{bmatrix} \quad (41)$$

where v is the vehicle speed of the automobile A;

$R_i$ is the measure of the intervehicle distance between the automobile A and the obstacle vehicle i (i={B, C, D}); and $\dot{R}$ is the measure or estimate of the relative speed between the automobile the obstacle vehicle i (i={B, C, D})

In box 96, the microprocessor determines whether or not updating of the set of recommended pair of control inputs is required. The conditions that demand the updating have been described so that repletion of the conditions is omitted for brevity of description. If the updating is not required, the execution of the routine comes to an end. If the updating is required, the control logic goes to box 98.

In box 98, the behavior predictor 30 (see FIG. 2) is updated. Specifically, the microprocessor creates models of the obstacle vehicles B, C and D, respectively, by setting appropriate values as parameters of each model and setting the initial values of the state vectors as shown in equation (41). What is done here is to initialize the predictor equations (17) and (21).

In box 100, the microprocessor inputs the functional J [$u_x$, $u_y$] for maneuver(s) from the evaluation function generator 32. For example, we assume that the evaluation function generator 32 sets a functional J to meet operator demand for driving with less acceleration feel at vehicle speeds around a desired value of vehicle speed $v_d^A$. This functional J may be expressed as $$J[u_x, u_y] = \int_{t_o}^{t_f} \left[ \left\{ \sum_{i=(B,C,D)} l(x_A, y_A, x_1, y_1) \right\} + \left\{ q(v_d^A - v_A)^2 + r u_x^2 \right\} \right] dt \quad (42)$$

where q and r are the appropriate positive values.

Figure 9:
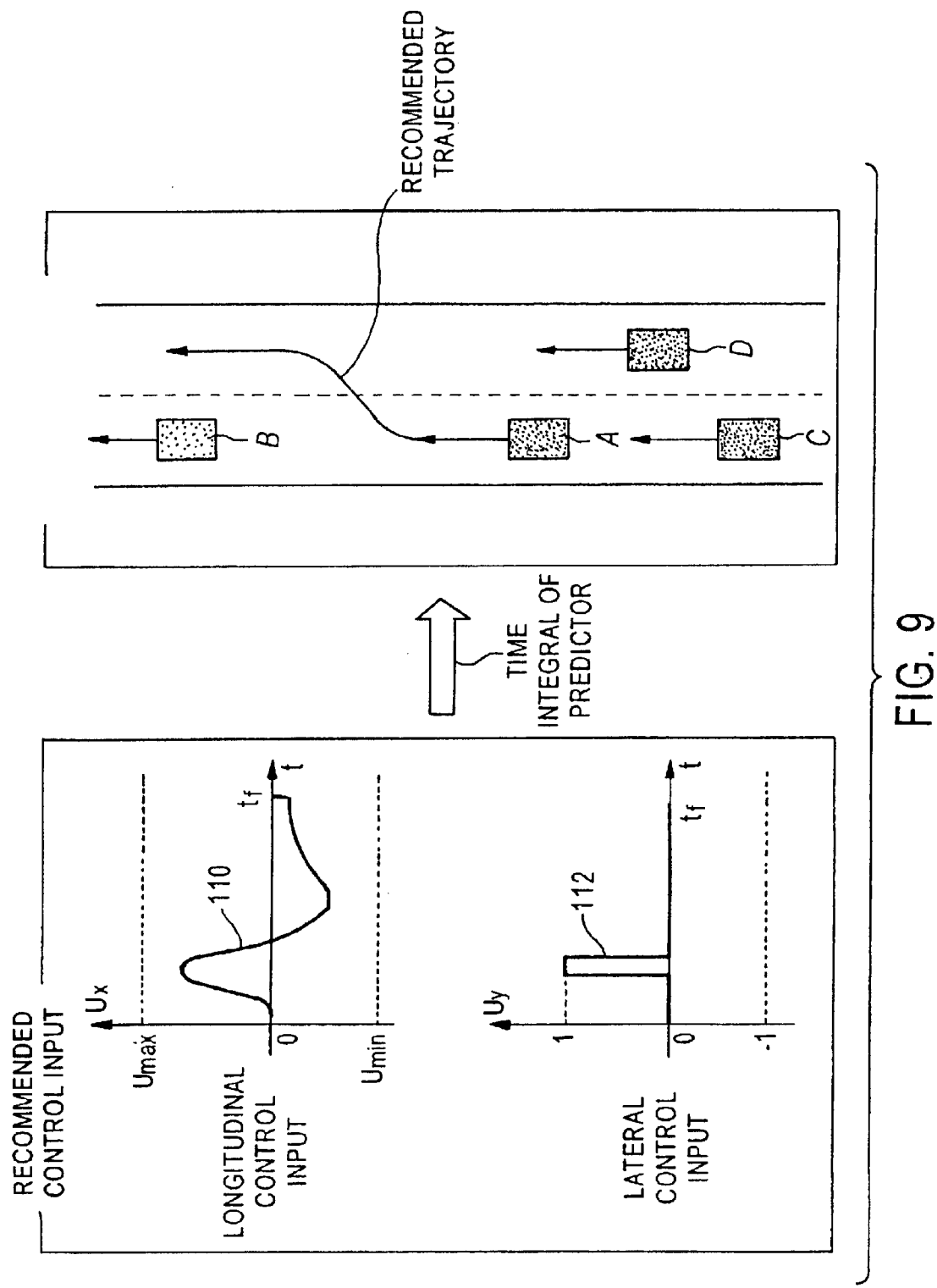
FIG. 9 is a view illustrating varying of recommended control input with time and a recommended trajectory within a screen of a display.

In the next box 102, the algorithm of the recommendation generator 34 is activated. As explained before along with the flow chart in FIG. 6, computing the equation (42), a set of recommended pairs of control inputs is generated. FIG. 9 shows a curved line 110 illustrating the recommended varying of longitudinal control input with time within the evaluating period from $t_0$ to $t_f$ and another pulse like line 112 illustrating the recommended varying of lateral control input with time within the same evaluating period. What is recommended here is to step on the accelerator for several seconds, to change lane to the right at a moment immediately after the peak of acceleration, and to gradually release the accelerator for deceleration toward the desired vehicle speed after having entered the right lane toward.

With reference back to the flow chart in FIG. 8, in box 104, the microprocessor computes a predicted behavior X(t) and Y(t) (predicted trajectories of each of the vehicles A, B, C and D) by integrating with respect to time the predictor equations (17), (27) after substituting the recommended control inputs $u_x$ and $u_y$ into them. With the predicted trajectories, the microprocessor updates the existing recommended trajectories.

In box 106, the microprocessor transfers the updated recommended trajectories for presentation at the display 26. After box 106, the execution of the routine comes to an end. One example of presentation at the display 26 is illustrated in FIG. 9.

Figure 10:
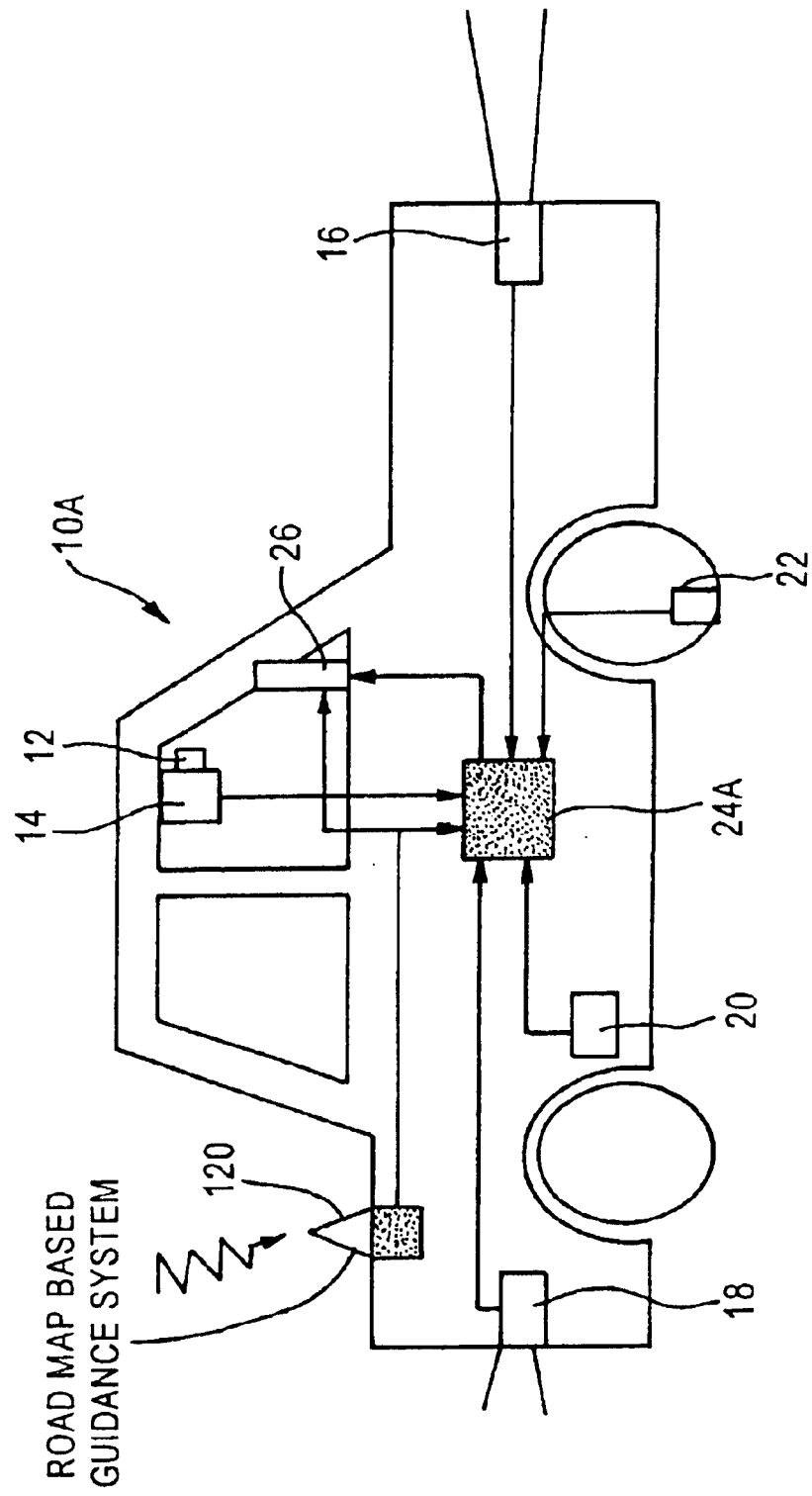
FIG. 10 is an automobile installed with a method and system for improving assistance to a vehicle operator in accordance with another embodiment of the present invention.

From the preceding description of the embodiment, it will be appreciated as an advantage that the behavior predictor 30 and evaluation function generator 32 enable the recommendation generator 34 to provide enhanced recommended pairs of control inputs, Another embodiment of the present invention can be understood with reference to FIGS. 10 to 14. In FIG. 10, the automobile, now generally designated at 10A, is substantially the same as the automobile 10 illustrated in FIG. 10. However, the automobile 10A is equipped with a road map based guidance system 120, which is often referred to as GPS navigation system. The road map based guidance system 120 uses Global Positioning System (GPS) with a combination of computer hardware and software components. The components include a map database, a GPS receiver and CPU. The map database includes an electronic map of the road structure, is stored. This database includes detailed information on lanes and ramps at interchanges on highways as well as a directory of potential travel destinations and business in the region. The GPS receiver picks up GSP signals that locate the automobile position as it travels. The computer CPU works with information received from each component of the system 120 to display the automobile's position along a road. A computing device now designated at 24A is substantially the same as the computing device 24 in FIG. 1 except the provision of component performing an additional function that will be described below.

Figure 11:
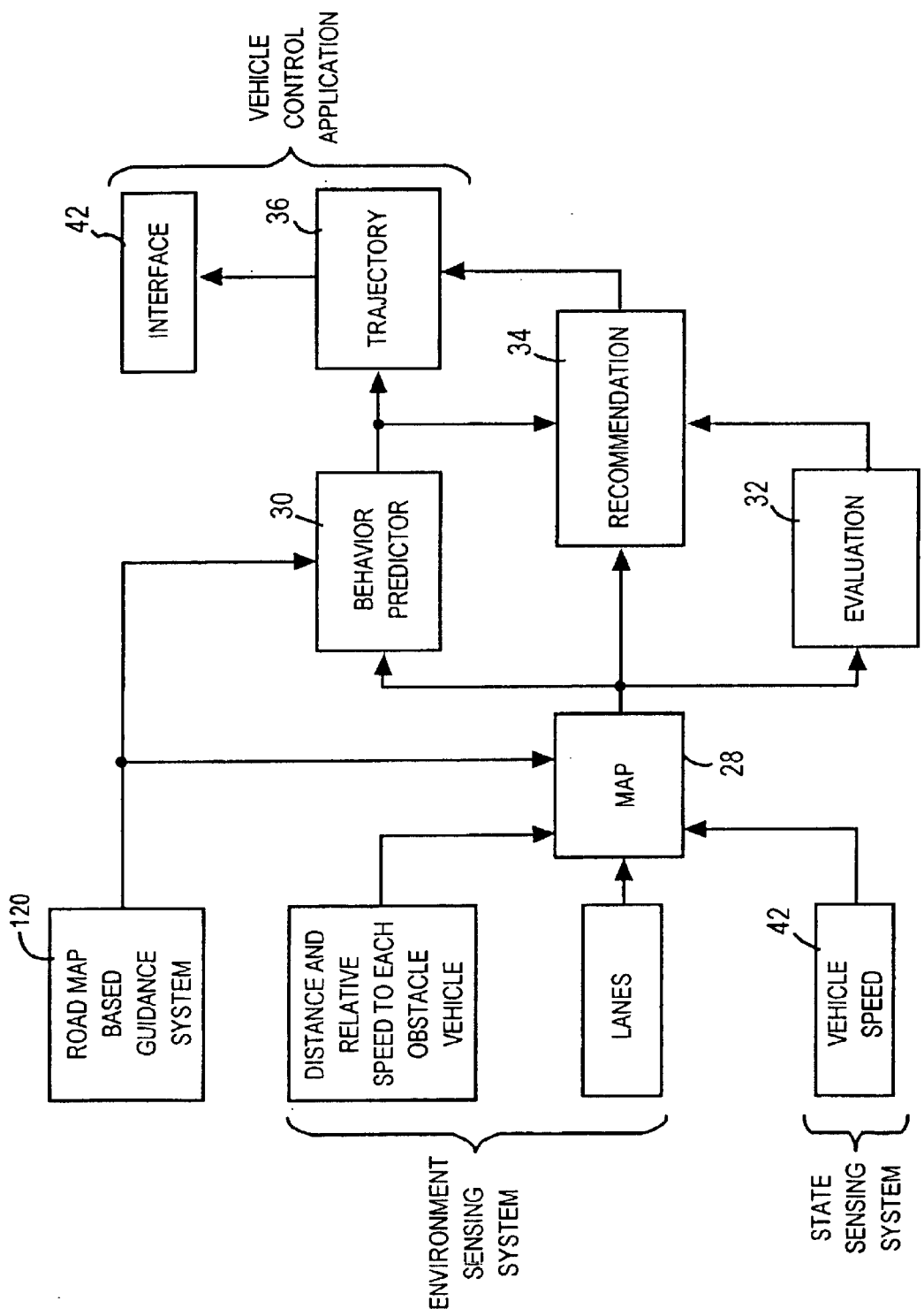
FIG. 11 is a block diagram, similar to FIG. 2, illustrating the present invention.

The block diagram in FIG. 11 illustrates the operation of the embodiment of the present invention. Comparing FIG. 11 with FIG. 2 reveals that the provision of road map based guidance system 120 only is a difference between them. The road map based guidance system 120 provides a map creator 28 and a behavior predictor 30 with additional information on the road. Taking the driving situation in FIG. 12 as an example, the map creator 28 can receive information from the system 120 and recognize that the adjacent next left lane is a ramp road of an interchange, which will merge at a position $X_{end}$ in the lane ahead of the automobile A.

To illustrate this driving situation, the map creator 28 provides the state vector as $$X(t_o) = \begin{bmatrix} X^A \\ X^B \\ X^C \\ X^D \\ X^E \end{bmatrix}, Y(t_o) = \begin{bmatrix} 0 \\ -1 \\ 0 \\ 0 \\ 0 \end{bmatrix} \quad (43)$$

where $$X^A = \begin{bmatrix} O \\ V \end{bmatrix}, X^i = \begin{bmatrix} R_i \\ v + \dot{R}_i \end{bmatrix}, i = \{B, C, D, E\}$$

We now consider a behavior predictor 30. We can use the previously described models to describe the automobile A and obstacle vehicles C, D and E. However, an obstacle vehicle B in the ramp road needs another model. One example of the model for obstacle vehicle B is described below.

Let it be assumed that the obstacle vehicle B follows the longitudinal control law expressed by the equation (3) and the lane change control law expressed by the equation (23). In this case, as the vehicle operator will change lane, it is not necessary to calculate the variable $z^B$. It is clear that the vehicle operator will decelerate the vehicle B as it approaches the end of the lane. Taking this into account, a longitudinal model component for the obstacle vehicle B may be expressed as $$\dot{x}_B = v_B$$

$$\dot{v}_B = k_2(v_d^B - v_B) - k_1 \frac{1}{x_{end} - x_B + \varepsilon} v_B \qquad (44)$$

where $\varepsilon$ is the small positive constant.

We now define $$x_d^i = \begin{bmatrix} x_i + hv_i \\ v_d^i \end{bmatrix}, i = \{A, C, D, E\}, \qquad (45)$$

$$x_d^B = \begin{bmatrix} x_i + hv_i - \frac{1}{x_{end} - x_B + \varepsilon} \\ v_d^B \end{bmatrix}, X_d = \begin{bmatrix} x_d^A \\ x_d^B \\ x_d^C \\ x_d^D \\ x_d^E \end{bmatrix}$$

Then, we have a predictor equation (in longitudinal direction) as $$\frac{d}{dt} X = (A + BE)X + BE_d X_d + B_A u_x \text{ where} \qquad (46)$$

$$E = \begin{bmatrix} 0 & 0 & I & 0 & 0 \\ 0 & 0 & 0 & 0 & 0 \\ 0 & 0 & 0 & 0 & 0 \\ 0 & 0 & 0 & 0 & 0 \\ 0 & 0 & 0 & I & 0 \end{bmatrix}, E_d = \begin{bmatrix} 0 & 0 & 0 & 0 & 0 \\ 0 & I & 0 & 0 & 0 \\ 0 & 0 & I & 0 & 0 \\ 0 & 0 & 0 & I & 0 \\ 0 & 0 & 0 & 0 & 0 \end{bmatrix} \qquad (47)$$

$$A = \begin{bmatrix} A_A & 0 & 0 & 0 & 0 \\ 0 & A_o & 0 & 0 & 0 \\ 0 & 0 & A_o & 0 & 0 \\ 0 & 0 & 0 & A_o & 0 \\ 0 & 0 & 0 & 0 & A_o \end{bmatrix}$$

$$B = \begin{bmatrix} 0 & 0 & 0 & 0 & 0 \\ 0 & B_o & 0 & 0 & 0 \\ 0 & 0 & B_o & 0 & 0 \\ 0 & 0 & 0 & B_o & 0 \\ 0 & 0 & 0 & 0 & B_o \end{bmatrix}, B_A = \begin{bmatrix} b_A \\ 0 \\ 0 \\ 0 \\ 0 \end{bmatrix} \qquad (48)$$

We also have a predictor equation (in lateral direction) as $$Y(t+\Delta t) = Y(t) + H(X(t), Y(t)) + Du_y \qquad (49)$$

where $$H(X(t), Y(t)) = \begin{bmatrix} 0 \\ H^B(X(t), Y(t)) \\ H^C(X(t), Y(t)) \\ H^D(X(t), Y(t)) \\ H^E(X(t), Y(t)) \end{bmatrix}, D = \begin{bmatrix} 1 \\ 0 \\ 0 \\ 0 \\ 0 \end{bmatrix} \qquad (50)$$

As mentioned above, the lane change of the vehicle B is apparent, the variable $z^B$ within $H^B(X, Y)$ should be initialized to a sufficiently large value for ease of lane change.

It is seen that the predictor equations (46) and (49) are the same, in form, as the predictor equations (17) and (27), respectively.

The functions of evaluation function generator 32, recommendation generator 34 and trajectory processor 36 are substantially the same as those of their counterparts of the previously described in connection with FIG. 2. Thus, the description on them is hereby omitted for brevity of description.

Let us now consider, as the evaluation function generator 34, two following different forms of evaluation index J.

$$J[u_x, u_y] = \qquad (51)$$

$$\int_{t_o}^{t_f} \left\{ \left( \sum_{i=\{B,C,D,E\}} l(x_A, y_A, x_i, y_i) \right) + \left( q(v_d^A - v_A)^2 + ru_x^2 \right) \right\} dt$$

$$J[u_x, u_y] = \int_{t_o}^{t_f} \left\{ \left( \sum_{i=\{B,C,D,E\}} l(x_A, y_A, x_i, y_i) \right) + \left( qy_B(t)^2 + ru_x^2 \right) \right\} dt \qquad (52)$$

It is noted that the equation (51) and the before mentioned equation (42) express the same maneuver. The maneuver expressed by the equation (52) contains accounting for making room ahead to allow the obstacle vehicle B easy to change lane.

Figure 12:
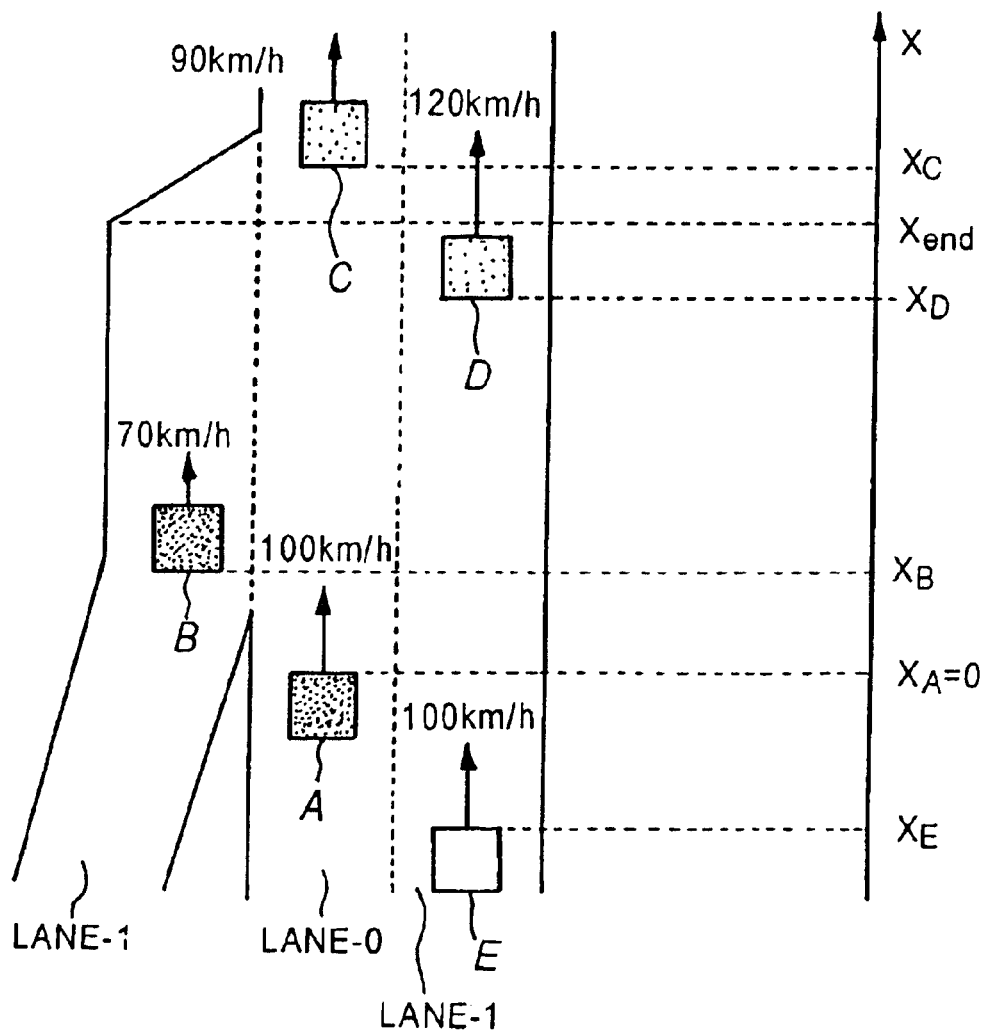
Figure 13:
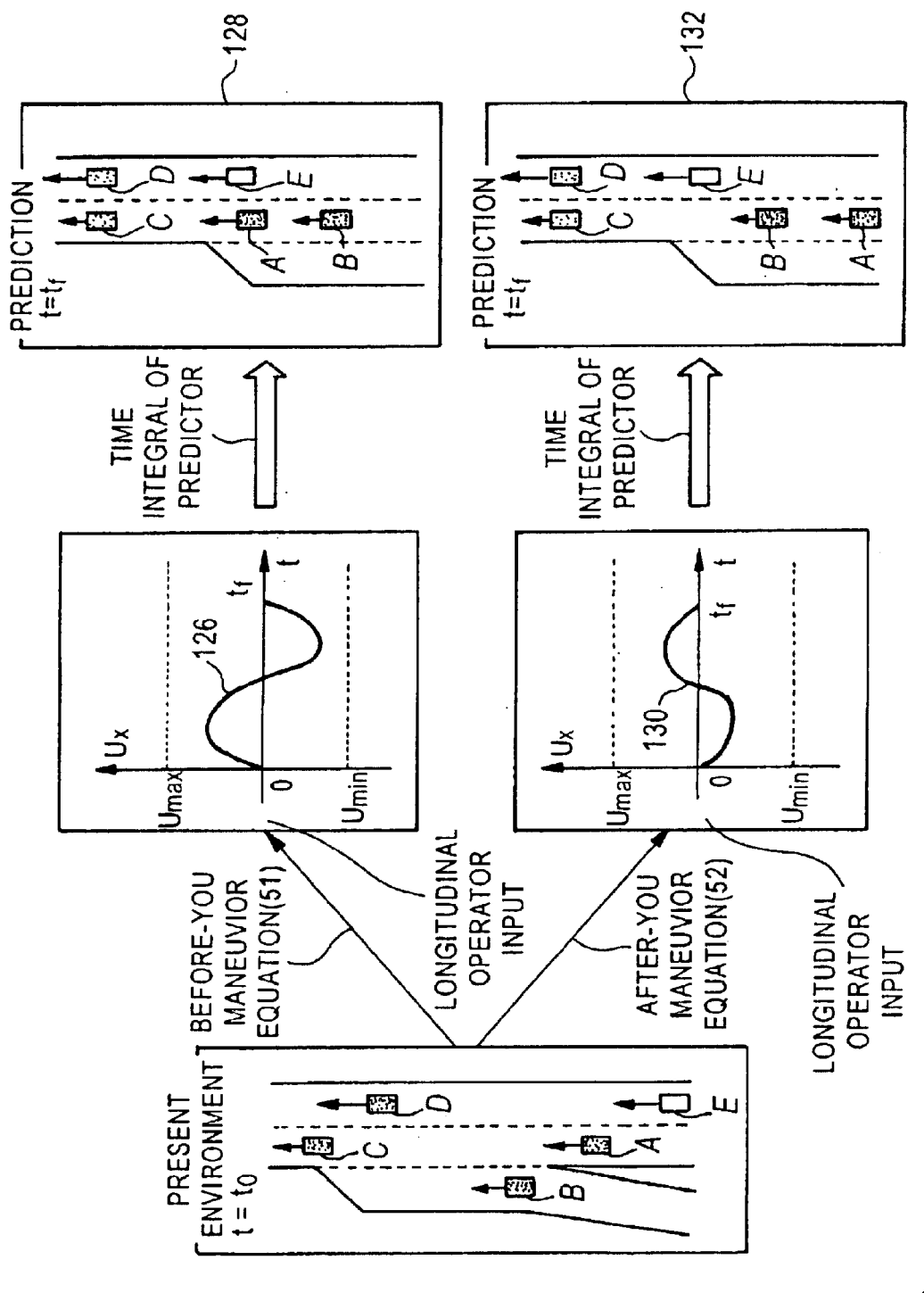
FIG. 13 illustrates one manner of displaying two different recommendations of control input to meet different maneuvers.

With reference now to FIG. 13, the curve 126 illustrates varying of recommended control input $u_x$ with time from the present time $t_0$ to future time $t_f$ if evaluation index J (51) is used in the illustrated driving situation in FIG. 12. The time $t_f$ terminates a evaluating period. Using the recommended control input 126, the trajectory processor 36 integrates the predictor equations (17) and (27) with respect to time to rind a future behavior of the vehicles in the illustrated driving situation in FIG. 12. One example of displaying the future behavior is shown at 128.

In FIG. 13, the curve 130 illustrates varying of recommended control input $u_x$ with time from the present time to to future time $t_f$ if evaluation index J (52) is used. Using the recommended control input 130, the trajectory processor 36 integrates the predictor equations (17) and (27) with respect to time to find a future behavior of the vehicles in the illustrated driving situation in FIG. 12. The future behavior is displayed at 132.

Figure 14:
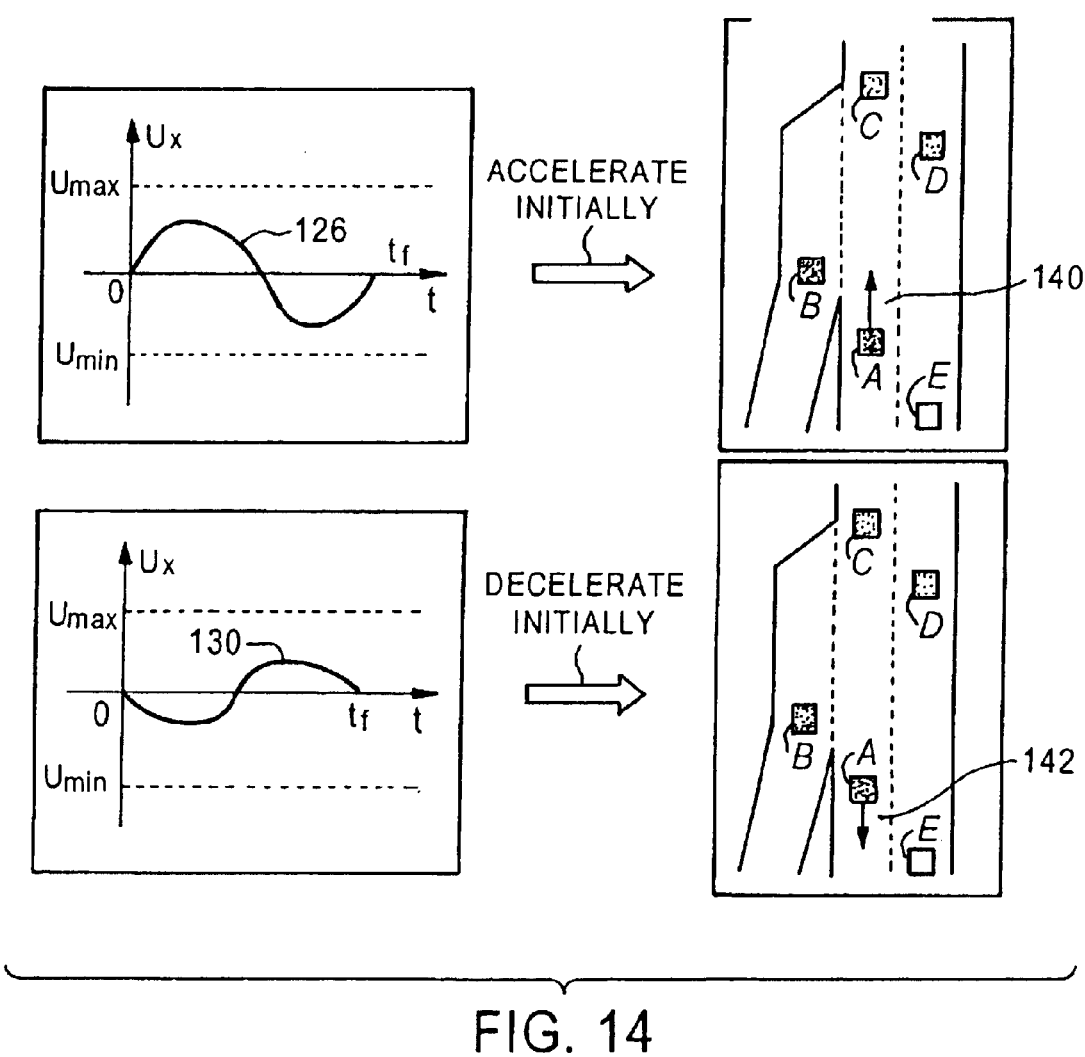
FIG. 14 illustrates another manner of displaying the two different recommendations of control input to meet different maneuvers.

FIG. 14 illustrates another manner of informing the vehicle operator of the automobile A. In this case, arrows 140 and 142 appear in the present driving situation road map to prompt the vehicle operator to acceleration or deceleration. For example, as the curve 126 recommends acceleration initially, the arrow 140 appears. Next, the curve 130 recommends deceleration, the arrow 142 appears.

Figure 15:
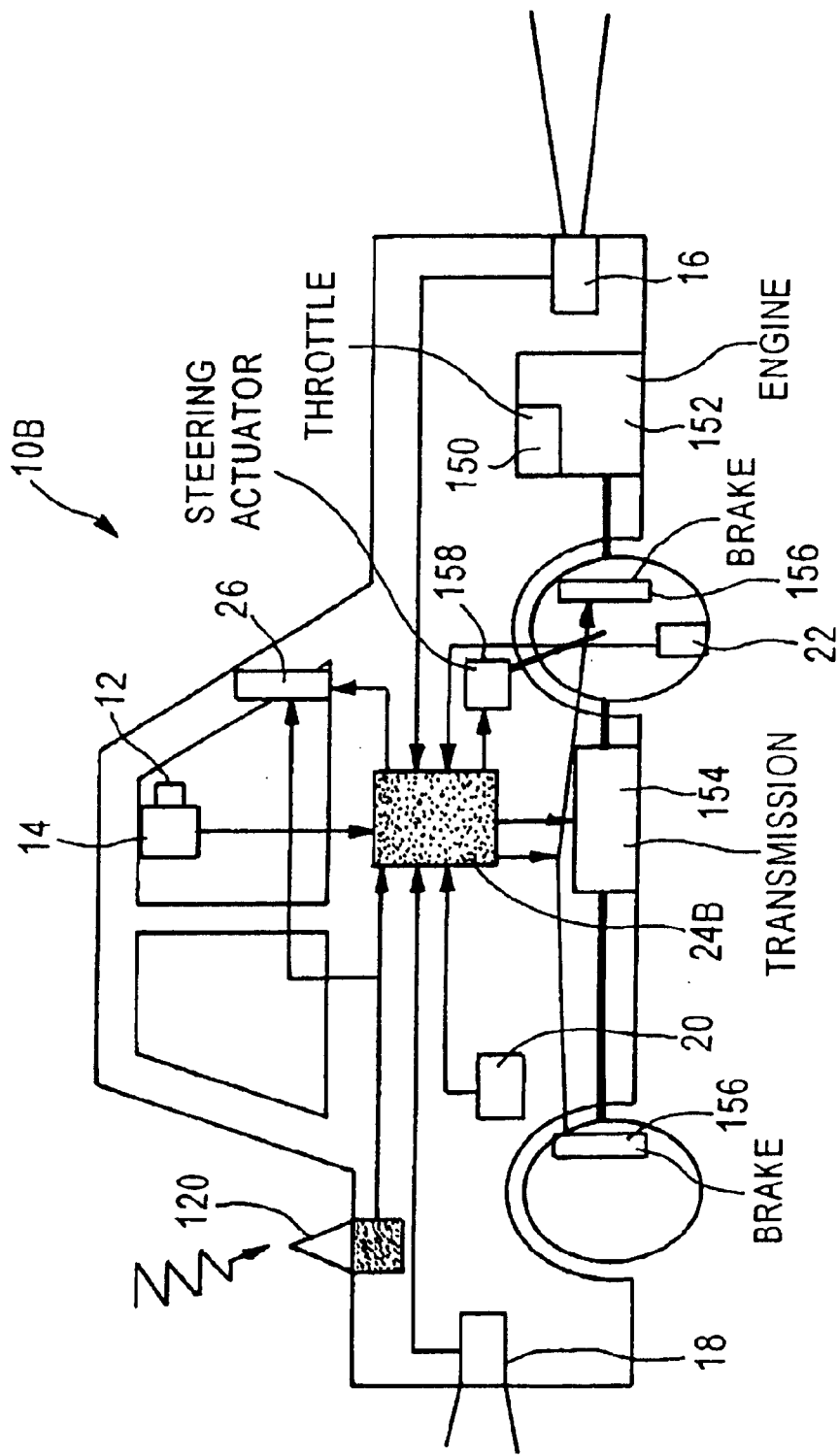
FIG. 15 is an automobile installed with a method and system for improving assistance to a vehicle operator in accordance with another embodiment of the present invention.

With reference now to FIGS. 15 to 19, another embodiment is described. In FIG. 15, the automobile, now generally designated at 10B, is substantially the same as the automobile 10A illustrated in FIG. 10. However, the automobile 10B is different from the automobile 10A in that a throttle 150 of an engine 152, a transmission 154, wheel brakes 156, and a steering actuator 158 ere under control of a computing device 24B. The computing device 243 is substantially the same as the computing device 24A of the automobile 10A. But, the computing device 24B has additional software components.

Figure 16:
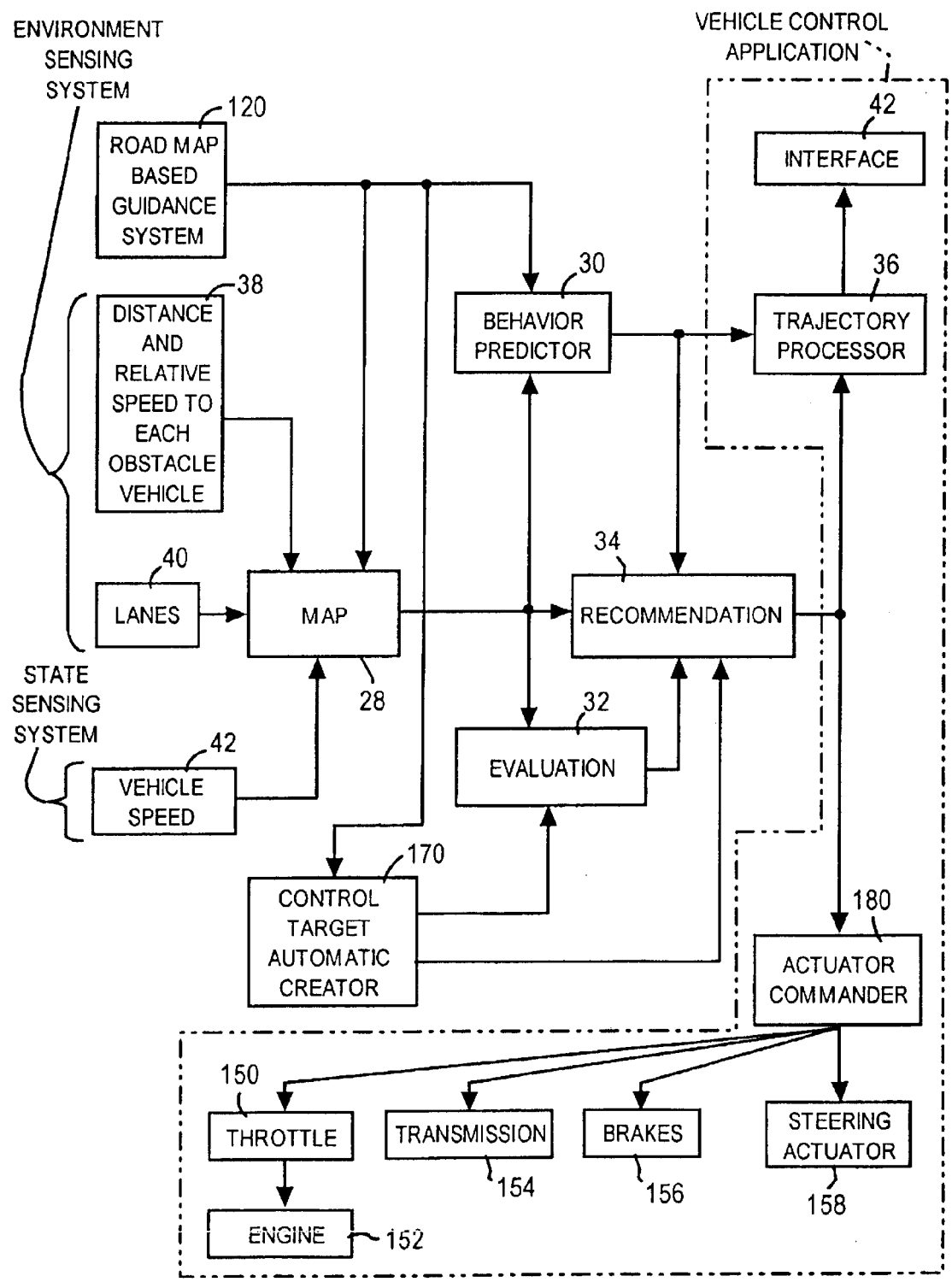
FIG. 16 is a block diagram, similar to FIG. 11, illustrating the embodiment of the present.

The block diagram in FIG. 16 shows, as the additional software components, a control target automatic generator 170 and an actuator commander 180.

The control target automatic generator 170 receives information from a road map based guidance system 120 and automatically selects the appropriate one or ones among various evaluation functions for use in a evaluation index generator 32. The control target automatic generator 170 automatically selects the appropriate terminal conditions among various terminal conditions for use in a recommendation generator 34. Using this function, it is now possible to accomplish a maneuver involving a lane change before the road diverges to take route along one branch road toward a destination that is set in the road map based guidance system 120.

The actuator commander 180 computes actuator commands necessary to realize acceleration/deceleration command and lane change command expressed by the recommended control input created at the recommended generator 34. The actuator commands are applied to the appropriate one or ones of actuators for throttle, transmission, brakes and steering.

Figure 17:
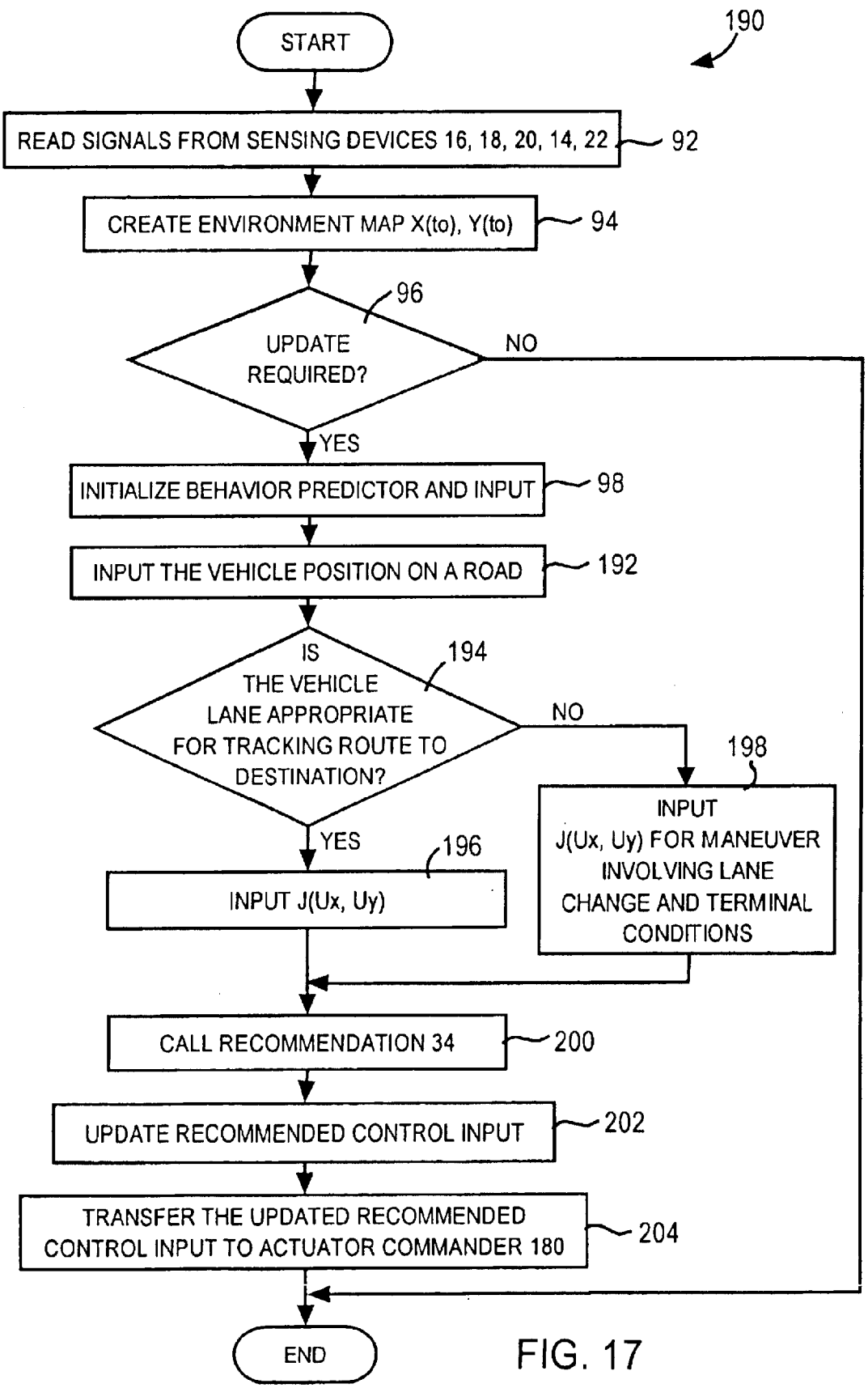
FIG. 17 is a flow chart illustrating the present invention.
Figure 18:
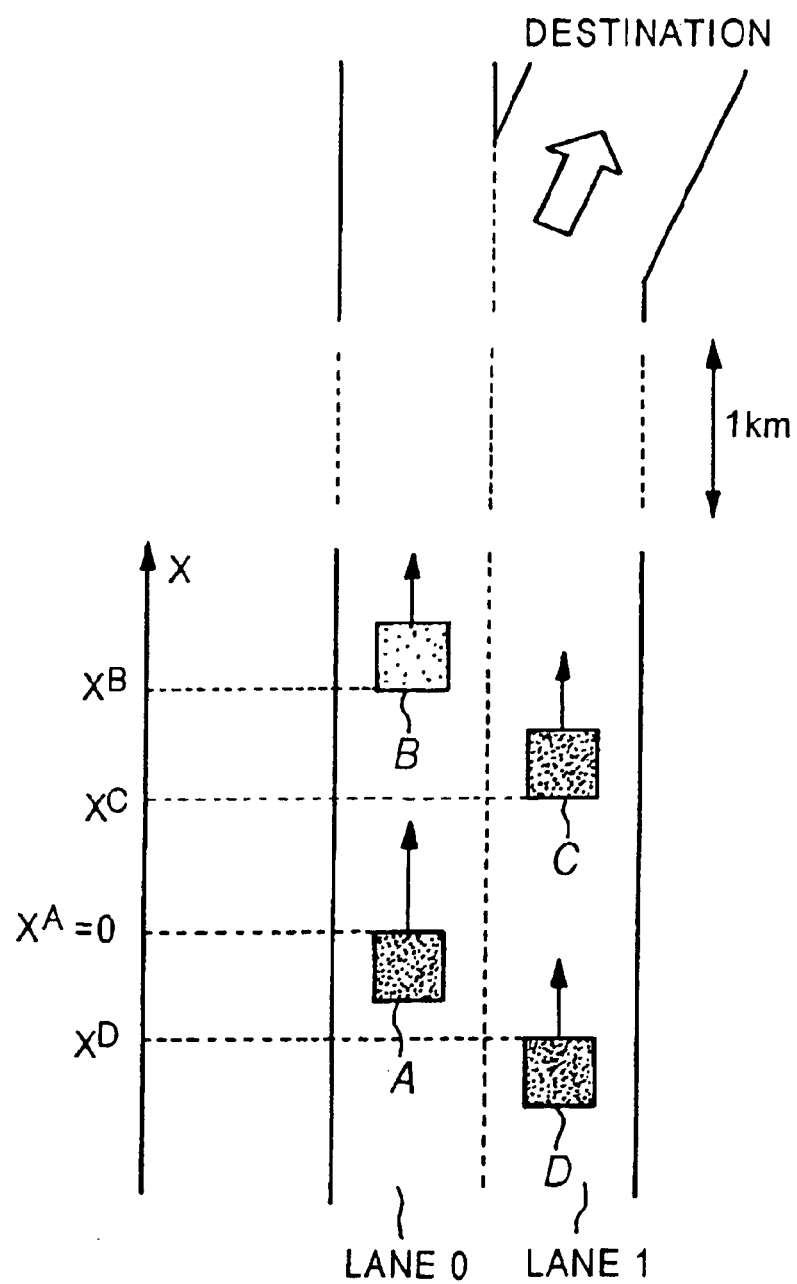

With reference to FIGS. 17 and 18, the operation of this embodiment is described. The driving situation in FIG. 18 indicates that, in the left lane (lane 0), the automobile A is following an obstacle vehicle B, while, in the right lane, an obstacle vehicle D is following an obstacle vehicle C. At a junction 1 Km ahead of the automobile A, the road it travels diverges into two branches. Taking the right branch is the only option toward the destination.

The flow chart in FIG. 17 illustrates a control routine 190. At regular intervals, the microprocessor calls the control routine 190 and repeats its execution. The operation of this embodiment is explained along this control routine 190 taking the driving situation in FIG. 16 as an example.

The control routine 190 may be regarded as a modification of the previously described control routine 90 illustrated in FIG. 8. Thus, the control routines 190 and 90 have the same boxes 92, 94, 96 and 98 immediately after the start of the routine. Although not identical, boxes 200, 202 and 204 of the control routine 190 may be regarded as substantially the same as the boxes 102, 104 and 106 of the control routine 90. The control routine 190 is different from the control routine 90 in that boxes 192, 194, 196 and 198 have replaced the box 100.

In FIG. 17, in box 94, the state vectors $X(t_0)$ and $Y(t_0)$ are initialized to describe the illustrated driving situation in FIG. 18. The state vectors $X(t_0)$ is initialized as shown in equation (41), and the state vector $Y(t_0)$ is initialized as follows:

$$Y(t_o) = \begin{bmatrix} 0 \\ 0 \\ 1 \\ 1 \end{bmatrix} \qquad (53)$$

The matrices E and Ed are initialized as shown in FIG. (13).

In box 192, the microprocessor inputs the automobile position from the road map based guidance system 120. This is the moment when the microprocessor recognize that the junction is located 1 Km ahead.

In box 194, the microprocessor determines whether or not the lane the automobile A is traveling is appropriate for tracking route to the destination. In the driving situation in FIG. 18, the left lane the automobile A travels is inappropriate so that the logic goes from box 194 to box 198. If the automobile A travels the right lane, the logic goes from box 194 to box 196. In box 196, the microprocessor inputs the same evaluation index J that has been determined by the evaluation index generator 32.

In box 198, the microprocessor picks up and input a new evaluation function and terminal conditions involving lane change as one of items to be evaluated. The evaluation function and terminal conditions are, for example, $$J[u_x, u_y] = \int_{t_o}^{t_f} \left\{ \left( \sum_{i=(B,C,D)} i(x_A, y_A, x_i, y_i) \right) + \left( q(v_d^A - v_A)^2 + ru_x^2 \right) \right\} dt$$

$$y(t_f) = 1 \qquad (54)$$

In this embodiment, as different from the previously described embodiment, the terminal conditions appear explicitly.

In box 200, the microprocessor calls algorithm of recommendation generator 34. The optimum control input $u_x$, $u_y$ is determined, which minimizes the function $J[u_x, u_y]$ (54). In this case, as the terminal conditions are explicit, the optimal control input is selected among proposed control inputs that include lane change to the right.

Figure 19:
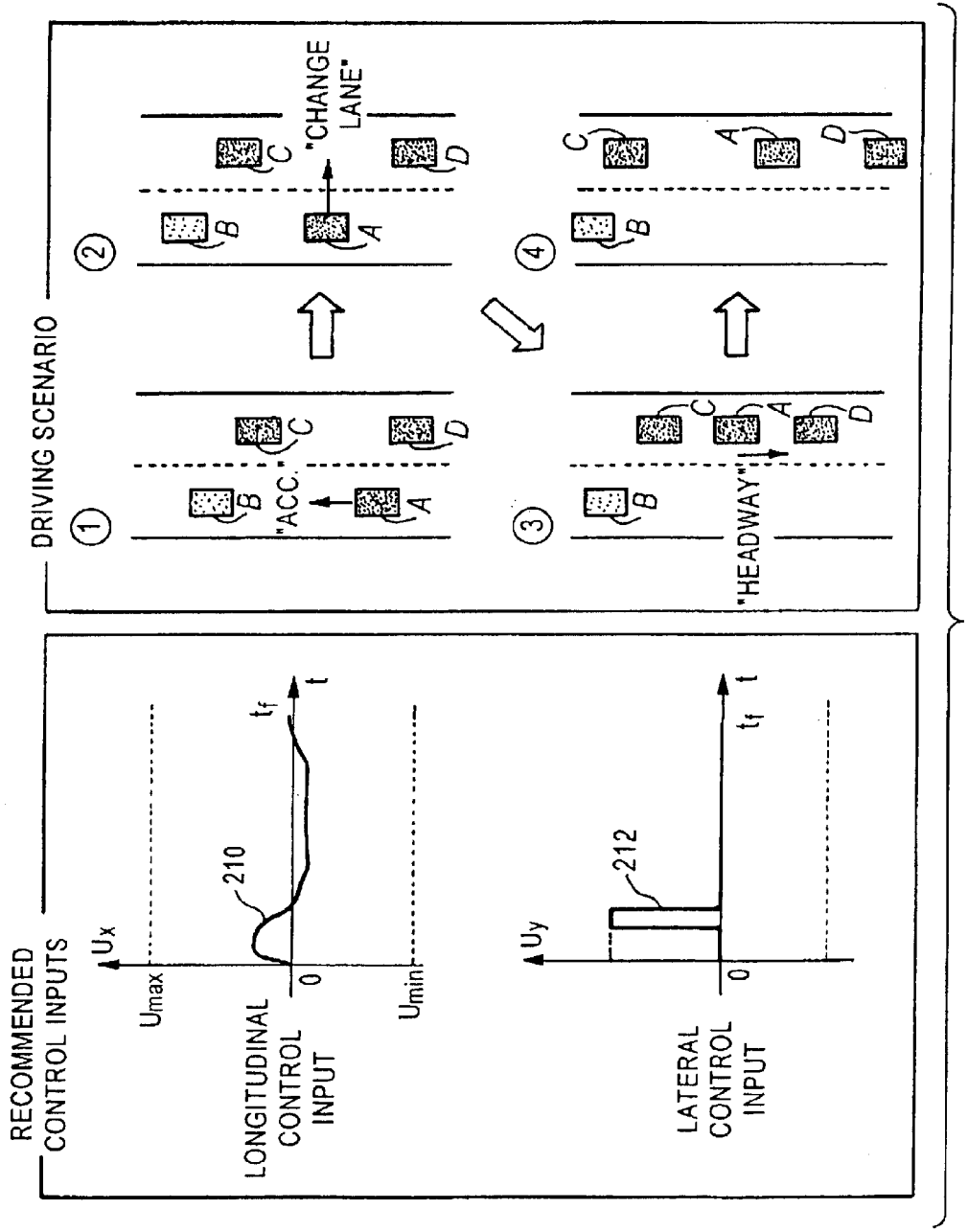
FIG. 19 illustrates another manner of displaying the recommendation of control input to meet a maneuver including lane change to take route toward a destination.

With reference to FIG. 19, the curves 210 and 212 illustrate the recommended optimal control input best fit to the driving situation in FIG. 18. They clearly teach (1) temporarily accelerating the automobile A until it moves to a point looking an intervehicle spacing in the next adjacent light lane, (2) changing lane, (3) gradually decelerating to increase the distance to the obstacle vehicle C, and (4) moving the automobile A at such a speed to maintain the headway. This scenario may be confirmed from the illustration in FIG. 19.

Returning back to FIG. 17, in block 202, the microprocessor updates the existing control input with the newly recommended control input.

In box 204, the microprocessor transfers the updated recommended control input to the actuator commander 180. The updated recommended control input causes the actuator commander 110 to alter the amount of one or some of actuator commands. The altered amounts of each of such actuator commands are transferred to the associated actuators to update the old amounts of the actuator commands. Each of the actuators operates in accordance with the present amount of the actuator command given until updated with the new one. After block 204, the routine comes to an end. The actuators may operate to fully accomplish the recommended control input. If desired, the actuators may alter the amount of reaction force in order to prompt the vehicle operator to manipulating the steering wheel and/or the accelerator to accomplish the recommended control input.

For brevity of description, the control routine 190 in FIG. 17 does not include box or boxes responsible for data transfer to the trajectory processor 36 and computation of predicted trajectories. If need arises, such blocks may be inserted after the updating job in box 202.

With reference now to FIGS. 20 to 25C, another embodiment is described. This and the first-mentioned embodiments (see FIGS. 1 and 2) are the same in hardware. However, this embodiment is different from the first mentioned embodiment in the contents of a behavior predictor 30 and a recommendation generator 34 (see FIG. 2).

We will now consider vehicle modeling of the illustrated driving situation in FIG. 20. In the left lane of a two-lane road, an automobile A is traveling at vehicle speed of $V_A$ and following the preceding obstacle vehicle a that is traveling at vehicle speed of $V_B$. The intervehicle spacing is too far. Thus, the vehicle operator of the automobile A has intention to adjust the intervehicle spacing to a desired distance. In the adjacent right lane, an obstacle vehicle C is traveling at vehicle speed $V_C$. The obstacle vehicle C is turning on a direction indicator to express an intention to change lane to the left. The vehicle speed $V_C$ is less than the vehicle speed $V_B$. For brevity. Let it be assumed that the vehicles A and B will keep the present lane so that the only the longitudinal component $u_x$ needs to be determined because the lane change or lateral component $u_y$ remains 0.

The predictor equations (2) and (3) constitute the behavior predictor 30 of this embodiment. For brevity, the obstacle vehicles B and C are traveling at their desired speeds, respectively, so that they will maintain their desired speeds till recognition of the preceding vehicle.

Figure 21B:
Figure 21C:

Accounting for the illustrated three future intervehicle relationships identified q=1, 2 and 3 in FIGS. 21A, 21B and 21C, we have a predictor equation in longitudinal direction.

$$\dot{x}=f(x, u_x, q) \quad (55)$$

Here, we define $$x=(x_A\ v_A\ x_B\ v_B\ , x_C\ v_C)^T \quad (56)$$

and $$f(x, u_x, 1)=(v_A u_x v_B 0 v_C 0)^T$$

$$f(x, u_x, 2)=(v_A u_x v_B 0 v_C k_1(x_C-x_B-hvc)+k_2(v_c-v_B))^T$$

$$f(x, u_x, 3)=(v_A u_x v_B 0 v_C k_1(x_C-x_A-hvc)+k_2(v_c-v_A))^T \quad (57)$$

Let us now consider the lane change model of the obstacle vehicle C. We use the determination functions (23) and (25), but we do not compute the variable $z^A(t)$ expressed by the equation (22) because the lane change intention is explicit. The shift conditions of q may be described as $$q:1 \to 3 \text{ if } \begin{array}{l} f_{LC}(x^C, x^B) > f_0 \\ f_{LC}(x^C, x^A) > f_0\ x_C \geq x_A \end{array}$$

$$q:1 \to 2 \text{ if } f_{LC}(x^C, x^A) > f_0\ x_C < x_A \quad (58)$$

The content of the evaluation index 32 will change depending on a change in the intervehicle positional relationship. To describe the driving situation 20 that has the illustrated three future intervehicle relationships in FIGS. 21A, 21B and 21C, we have $$J[u_x(t)] = \int_{t_0}^{t_f} L(x, u_x, q) dt \quad (59)$$

Here, we define $$L(x, u_x, 1)=rL_u(u_x)+w_B L_f(x_A, x_B)$$

$$L(x, u_x, 2)=rL_u(u_x)+w_C L_f(x_A, x_C)$$

$$L(x, u_x, 3)=rL_u(u_x)+w_B L_f(x_A x_B)+w_C L_b(x_A, x_C) \quad (60)$$

where r, $w_B$ and $w_C$ are the weighting factors, each in the form of a real positive number; and Here, we explain what evaluation functions $L_u$, $L_f$, and $L_b$ incorporated in the evaluation index J mean.

$L_u(u_x)=(1/2)u_x^2$ expresses the demand for less acceleration/deceleration.

$L_f(x_A, x_B)=a(x_B-x_A)+b/(x_B-x_A)$ expresses the demand for a reasonable distance to the preceding vehicle, where a and b are the parameters determining the form of the evaluation function.

$L_b(x_A, x_C)=1/(x_a-x_C)$ expresses the demand for a reasonable distance to the following obstacle vehicle.

Solving the lane change model (58) yields a typical optimization control problem defined by the predictor equation (55) and the evaluation index (59). For such typical optimization problem, mathematical conditions (needed conditions for optimization), which the optimal solution (recommended control input) must satisfy, are well known. Thus, the data set structure of proposed control input is limited using such well known conditions. This is beneficial in determining the recommended control input quickly. One implementation is disclosed in T. Ohtsuka, "Continuation/GMRES Method for Fast Algorithm of Nonlinear Receding Horizon Control," in Proceedings of the 39th IEEE Conference on Decision and Control, pp. 766–771, 2000, which has been incorporated by reference in its entirety.

We now explain the needed conditions for optimization to obtain algorithm.

We now define the following Hamiltonian out of the evaluation function L and the predictor equation f.

$$H(x, u_x \lambda, q)=L(x, u_x, q)+\lambda^T(t)f(x, u_x, q) \quad (61)$$

$\lambda(t)$ is the vector variable having the same order components as those of the predictor equation. In this case, we describe the needed conditions for the optimization as $$\frac{\partial H(x, u_x, \lambda, q)}{\partial u_x} = 0 \quad (62)$$

$$\dot{x}=f(x, u_x, q), x(t_0)x_0 \quad (63)$$

$$\dot{\lambda} = -\left(\frac{\partial H(x, u_x, \lambda, q)}{\partial x}\right)^T, \lambda(t_f) = x_0 \quad (64)$$

where $x_0$ is the state of vehicle cluster at $t=t_0$

Figure 22:
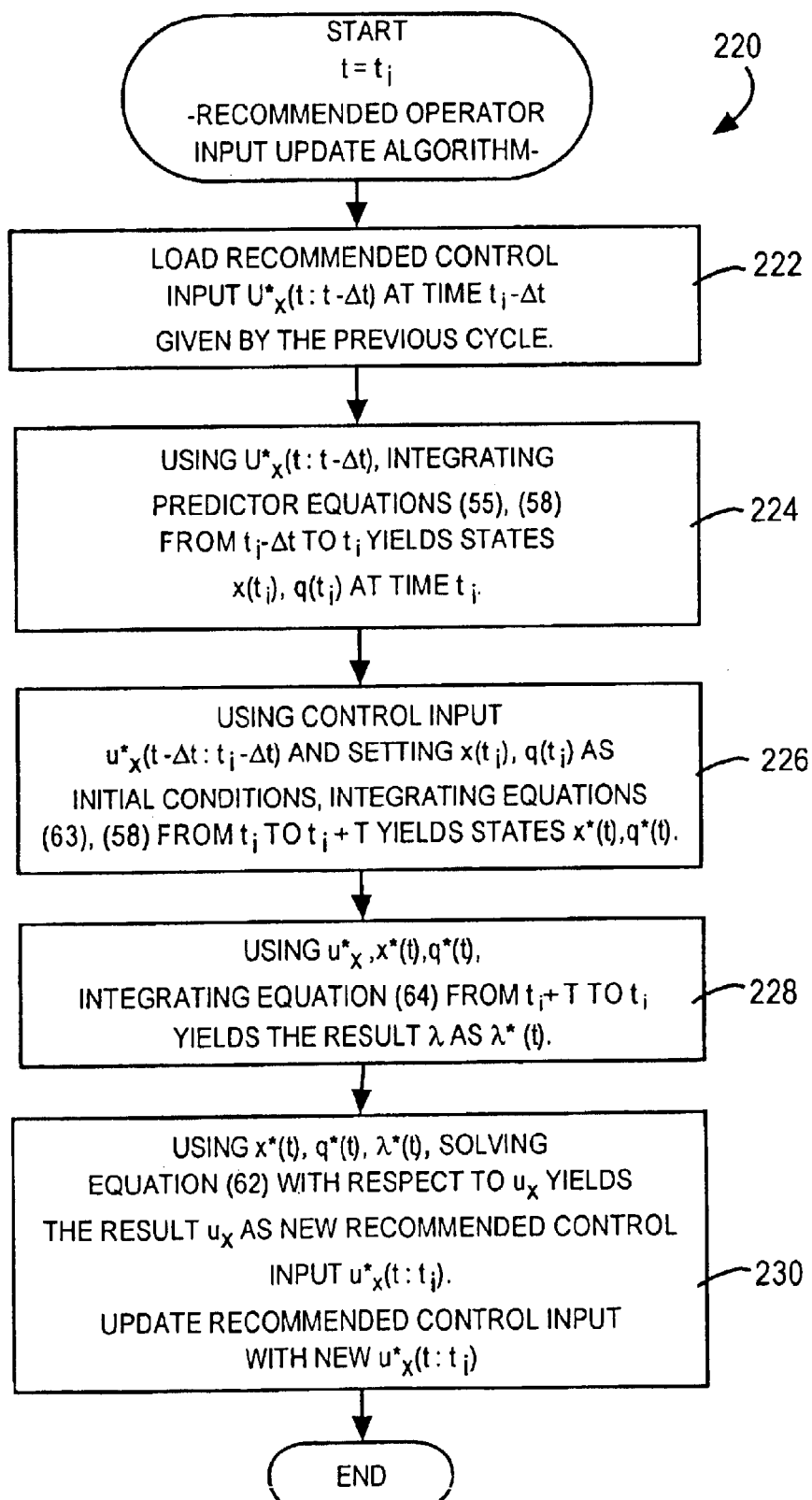
FIG. 22 is a flow chart illustrating a recommended control input update algorithm.

With reference to FIG. 22, we now explain a recommended control input update algorithm 220.

In box 242, the microprocessor loads the previous recommended control input $u_x^*(t:t-\Delta t)$ that was given by the previous cycle.

In box 224, using the previous control input $u_x^*(t:t-\Delta t)$ as $u_x$, the microprocessor integrates with respect to time the equations (55) and (58) from $t_i-\Delta t$ to $t_i$ to yield states $x(t_i)$ and $q(t_i)$ at time $t_i$.

In box 226, the microprocessor gives the result as $u_x^*(t-\Delta t:t_i-\Delta t)$ by shifting $u_x^*(t:t-\Delta t)$ to begin with the moment $t_i$. Using the shifted control input $u_x^*(t:t-\Delta t)$ and setting $x(t_i)$ and $q(t_i)$ as initial conditions, the microprocessor integrates the equations (63) and (58) from $t_i$ to $t_i+T$. The microprocessor checks q in parallel to checking x and changes the value of q when conditions are met for lane change. Immediately after a change in the value of q, this change is included in the integration of function f for the rest of period of integration. Here, T is the evaluating period of time.

In box 228, using $u_x^*, x^*(t)$ and $q^*(t)$, the microprocessor integrates the equation (64) from $t_i+T$ to $t_i$ to yield the result $\lambda$ as $\lambda^*(t)$. A change in the value of $q^*(t)$ is included in integrating the function f of the equation (64), causing Hamiltonian H to change. Here, T is the evaluating period.

In box 230, using $x^*+(t)$, $q^*(t)$ and $\lambda^*(t)$, the microprocessor solves the equation (62) with respect to $u_x$ to yield the solution $u_x$ as a new recommended control input $u_x^*(t: t_i)$ at $t_i$. The microprocessor updates the recommenced control input with the new recommended control input $u_x^*(t:t^i)$.

In the present embodiment, the equation (62) is expressed as $$\frac{\partial H}{\partial u_x} = ru_x(t) + \lambda_2(t) = 0 \tag{65}$$

Here, $\lambda_2(t)$ is the second component of the vector variable $\lambda(t)$. As $\lambda^*(t)$ is given by computation, the recommended control input is given by computing the following equation.

$$u_x^m(t:t_1) = -\frac{1}{r}\lambda_2^*(t) \tag{66}$$

An initial value needs to be set as recommended control input at the initial moment upon starting execution of the flow chart in FIG. 22. The initial value is loaded from stored optimum control inputs for known driving situations when detected driving situation belongs to one of them. A value may be selected out of values of control inputs similar to the optimum control input for a given driving situation and subsequently corrected by repeating execution of the algorithm in FIG. 22 for good approximation to the optimum initial value if, strictly speaking, any available values fail to be the optimum initial value. If an initial value is unknown, an apparent optimum control input at zero evaluating period is used as an initial value of recommended control input for the subsequent correction process to approximate the optimum initial value by increasing the length of the evaluating period. In this case, the algorithm may be illustrated by the flow chart in FIG. 23. This algorithm provides a recommended trajectory over the period of time $t_s \leq t \leq t_F$.

Figure 23:
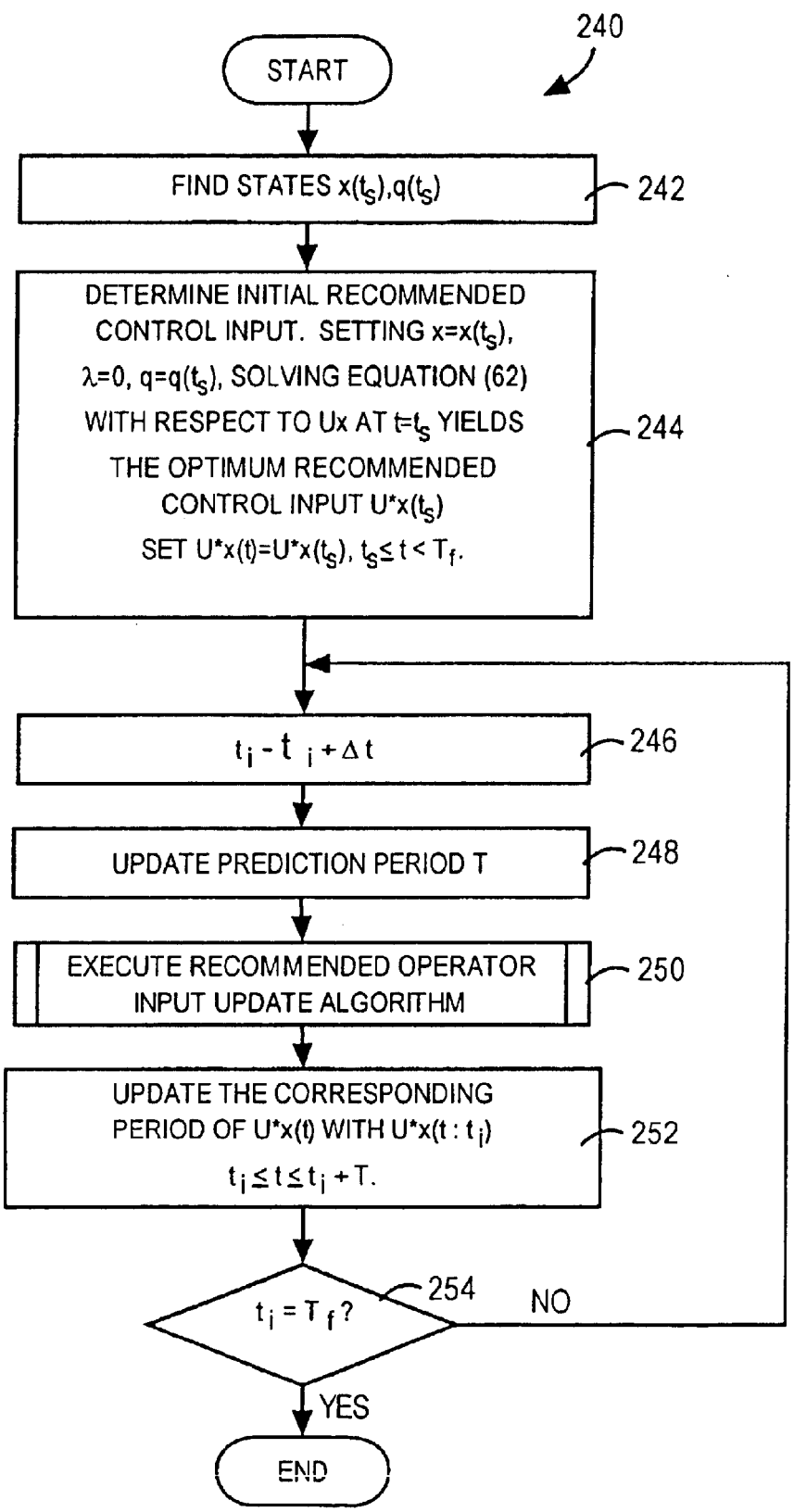
FIG. 23 is a flow chart illustrating an overall algorithm to recommend control input.

The flow chart in FIG. 23 illustrates the algorithm 240. In box 242, the microprocessor finds state $x(t_s)$, $q(t_s)$ at the initial moment $t_i=t_s$.

In box 244, the microprocessor determines an initial value of recommended control input. Specifically, we obtain an apparent optimum recommended control input $u_x^*(t_s)$ that is constant if the evaluating period is set equal to 0 (zero) by solving the equation (62) with respect to $t=t_s$, $aH/au_x=0$, after setting that $x^*(t)-x(t_s)$, $\lambda^*(t)=0$, and $q^*(t)=q(t_s)$. A storage variable $u_x^*(t)$ is prepared and initialized as follows.

$$u_x^*(t) = u_x^*(t_s), \ t_s \leq t \leq t_F \tag{67}$$

In box 246, the microprocessor advances the time $t_1$ by one step a $\Delta t(t_1 \leftarrow t_1+\Delta t)$.

In box 248, the microprocessor updates the evaluating period T. The evaluating period T increases from zero. The microprocessor determines the evaluating period by computing the following equation $$T=T_f exp(-\alpha(t-t_s)) \tag{68}$$

where $T_f$ is the maximum value of the evaluating period;

$\alpha$ is the appropriate positive real constant number

In box 250, the microprocessor executes the algorithm 220 shown in FIG. 22 to create a new recommended control input $u_x^*(t:t_i)$. It is to be remembered that the evaluating period is different one step from another. Thus, the evaluating period of the previous control input $u_x^*(t-\Delta t:t_i-\Delta t)$ does not match the present evaluating period in the present step. Thus, is the time scale of the previous control input $u_x^*(t-\Delta t:t_i-\Delta t)$ is corrected to match the present evaluating period. That is, if $T_p$ denotes the previous evaluating period, $u_x^*(t-\Delta t:t_i-\Delta t)$ is replaced with $u_x^*((T/T_p)(t-\Delta t):(t_i-\Delta t)$, which value is used for the optimization.

In box 252, the microprocessor updates the corresponding portion of the storage variable $u_x^*(t)$ with the created control input $u_x^*(t:t_i)$, $t_i \leq t \leq t_i + \Delta t$ that is obtained in box 252.

In box 254, the microprocessor determines whether or not the time $t_i$ has reached $T_f$. If the time $t_i$ has reached $T_f$, the content of the storage variable $u_x^*(t)$ is output as the final recommended control input. If not, the logic returns to box 246.

The vehicle control application utilizing the obtained recommended control input is the same as each of the previously described embodiments.

Figure 24A:
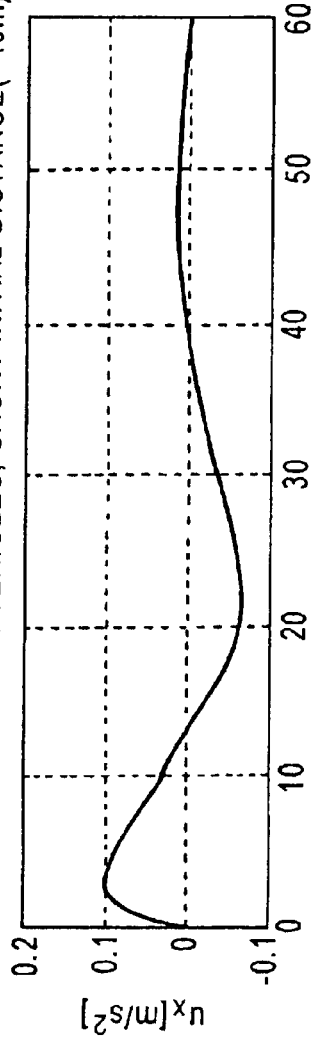
FIGS. 24A–24C illustrate simulation result.
Figure 24B:
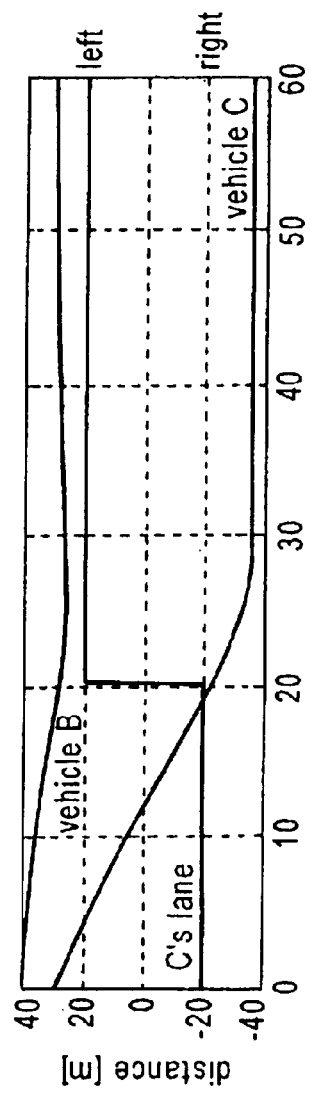
Figure 24C:
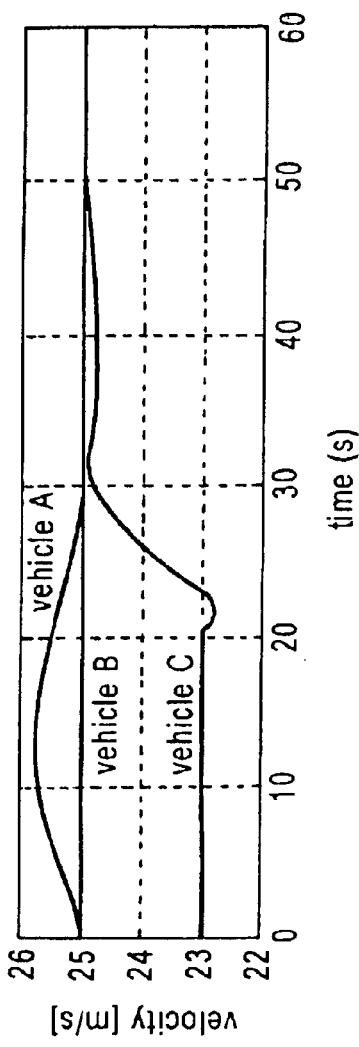
Figure 25A:
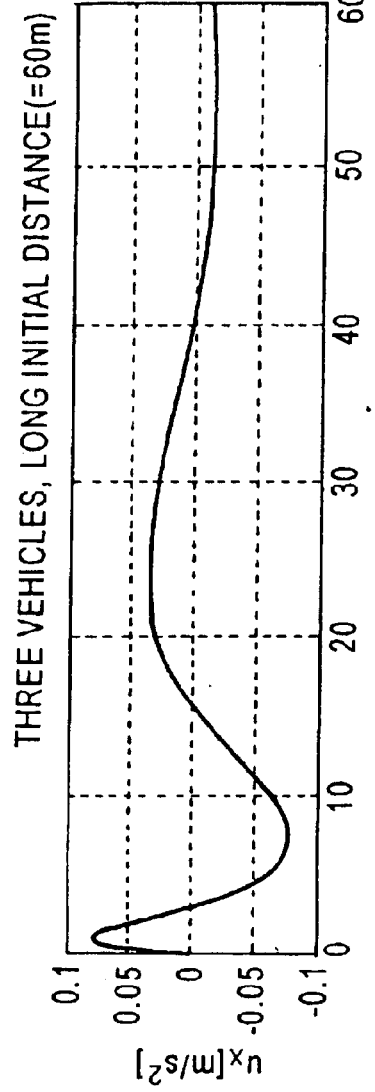
FIGS. 25A–25C illustrate simulation result.
Figure 25B:
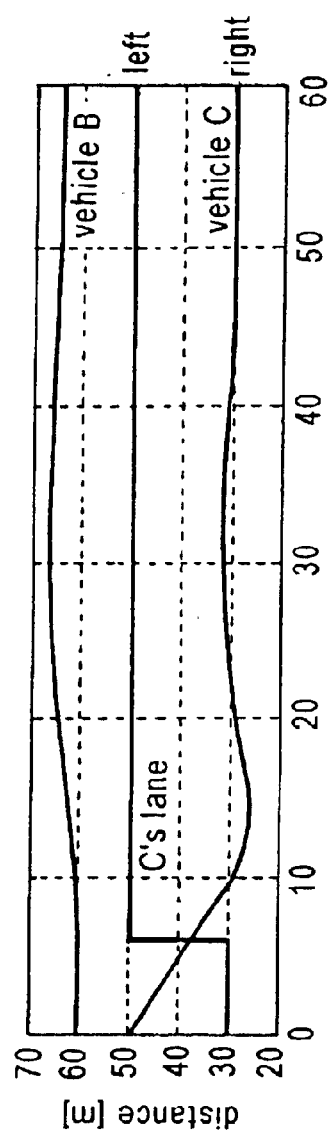
Figure 25C:
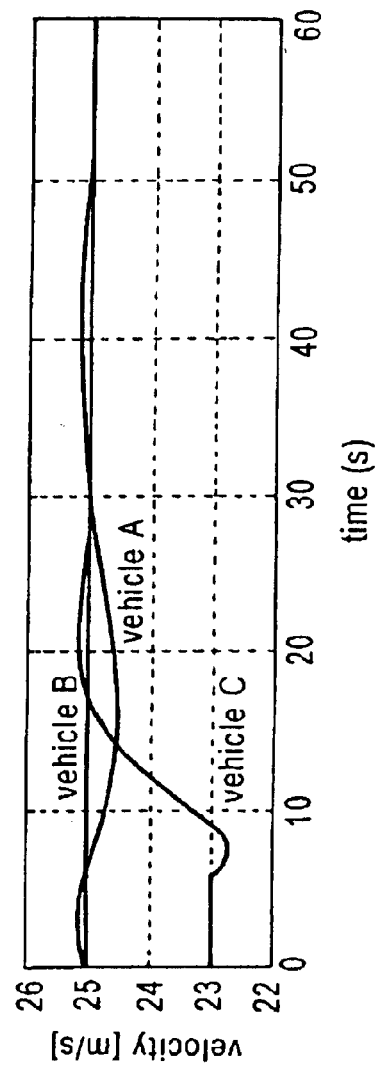

FIGS. 24A-24C and 25A-25C are simulation results for confirming the effectiveness of the embodiment just described above. FIG. 24A-24C illustrate the case where the initial relative distance to the obstacle vehicle B is 40 meters. FIGS. 25A–25C illustrate the case where the initial relative distance to the obstacle vehicle B is 60 meters. FIGS. 24A and 25A illustrate varying of recommended control input $u_x$ with time. FIGS. 24B and 25B illustrate varying of relative distance to each of the obstacle vehicles B and C with time. FIGS. 24C and 25C illustrate varying of velocity (=vehicle speed) of each of the automobile A and obstacle vehicles B and C with time.

What is illustrated in FIGS. 24A-24C includes an initial acceleration of the automobile A to prevent the obstacle vehicle C from change lane. What is illustrated in FIGS. 25A–25C includes an initial deceleration of the automobile A to allow the obstacle vehicle C to change lane.

From the simulation results, it will be well appreciated that the optimum recommended control input is computed with less is computational time and presented quickly.

Figure 26:
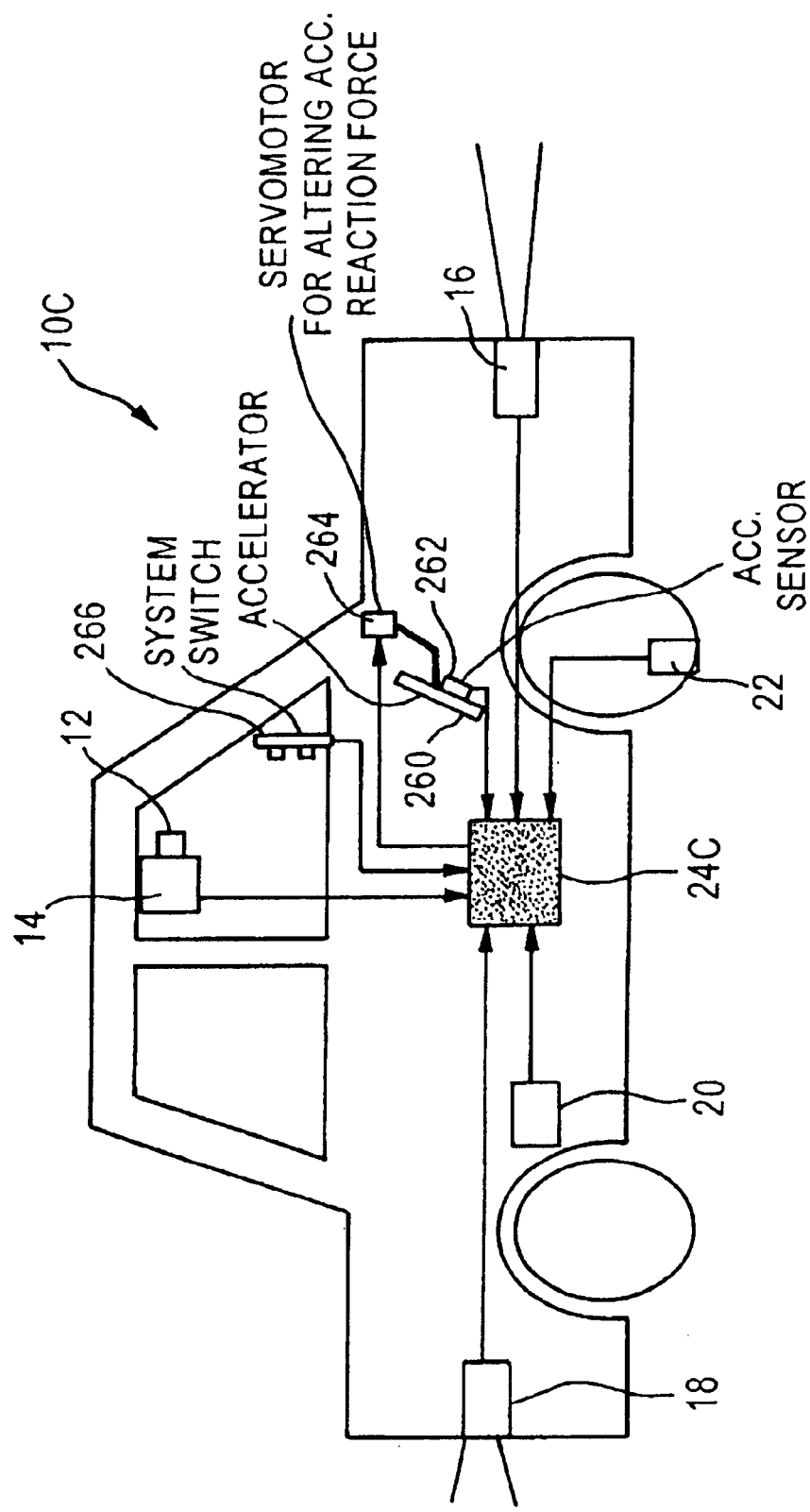
FIG. 26 is an automobile installed with a method and system for improving assistance to a vehicle operator in accordance with the present invention.

Another embodiment of the present invention can be understood with reference to FIGS. 26 to 31. In FIG. 26, an automobile, now generally designated at 10C, is substantially the same as the automobile 10 in FIG. 1 except the vehicle control application. The recommended control input $u_x(t)$, $u_y(t)$ at each time is determined so as to minimize the evaluation index $J[u_x, u_y]$. In the vehicle control application of the automobile 10, substituting the recommended control input $u_x(t)$ $u_y(t)$ into the predictor equation yields recommended trajectory displayed on the screen of the interface 42. In the vehicle control application of FIG. 10C, the recommended control input $u_x(t)$ is used to determine a desired accelerator position of an accelerator 260. An accelerator sensor 262, which belongs to a state sensing system, detects an accelerator position of the accelerator 260. A computing device 24C is operatively coupled with the accelerator sensor 262. The computing device 24C is also coupled with a servomotor 264 for altering reaction force opposed to operator manual effort to step on the accelerator 260. When a system switch 266 is turned on, the computing device 24C determines the control signal such that the reaction force prompts the operator to adjusting the accelerator 260 to the desired accelerator position.

The computing device 24C is substantially the same as the computing device 24 in FIG. 1 except the provision of algorithm for controlling the servomotor 264 to control the accelerator pedal reaction force.

Figure 27:
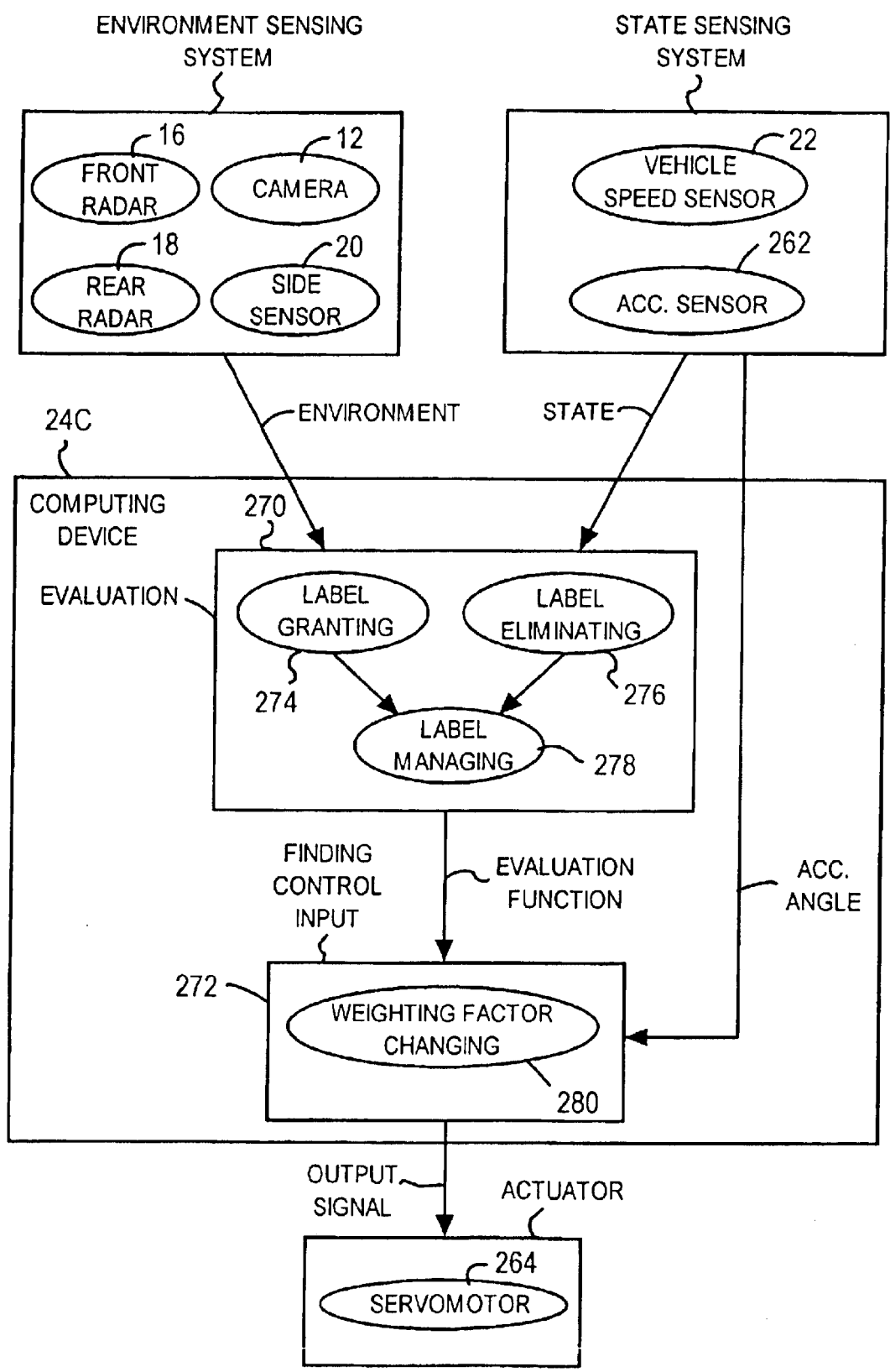
FIG. 27 is a block diagram illustrating the present invention.

With reference to FIG. 27, the computing device 24C has hardware or software components. They include a component for forming an evaluation function 270, and a component 272 for finding a control input. The component 270 includes a label granting component 274, a label eliminating component 276, and a label managing component 278. The component 272 includes a weighting factor changing component 280.

Referring to the driving situation in FIG. 28, the embodiment is further described below.

Figure 28:
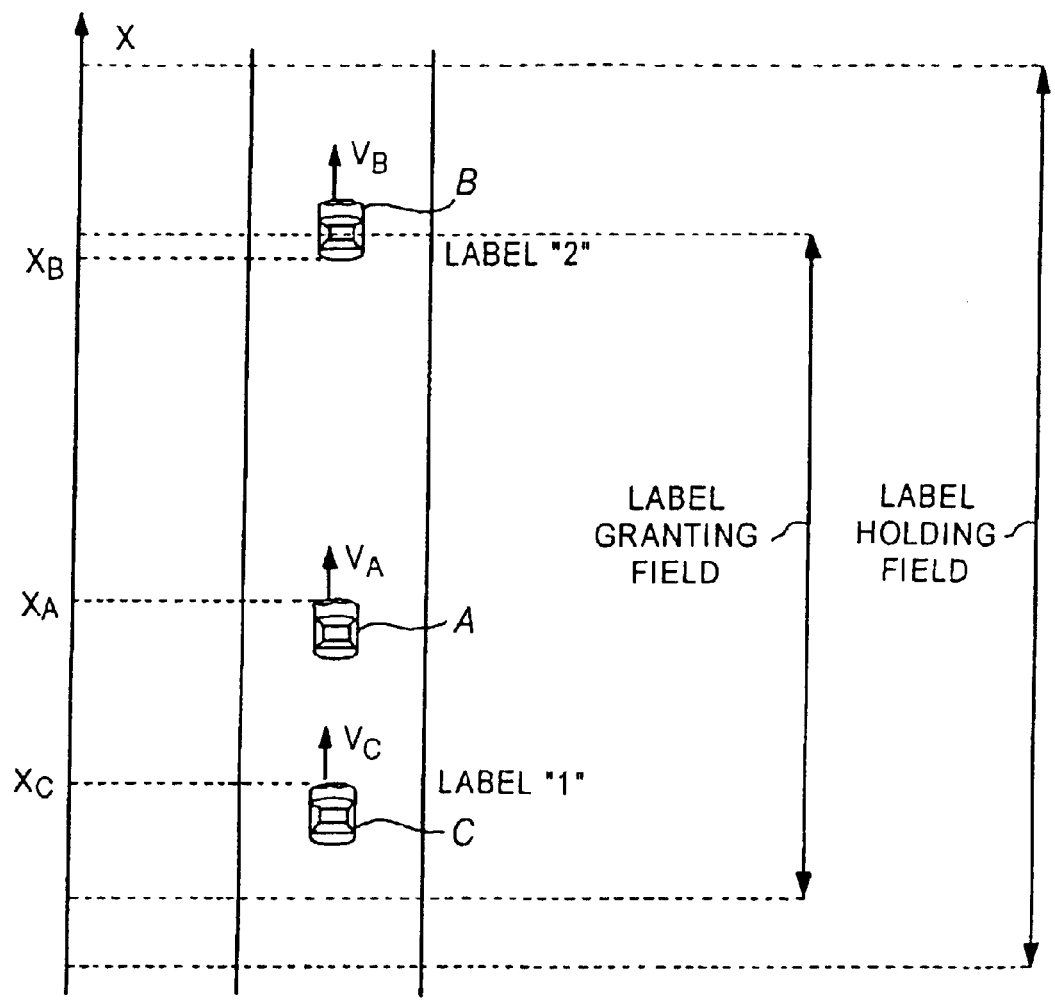

FIG. 28 illustrates a road having a single lane on one side. The automobile 10C, which is now designated by the reference character A, is traveling along the lane. The automobile A has a label granting field and a label holding field. If a need arises for avoiding undesired repetition of grating label and eliminating label, the label granting field should fall within the label holding field. Turning back to traffic, an obstacle vehicle C had come into the label granting field and is following the automobile A. The driving situation shows that another obstacle vehicle B has just come into the label granting field. The vehicle B is traveling at a speed lower than a speed at which the automobile A is traveling.

In order to improve assistance to operator of the automobile A, the vehicle operator has to turn on the system switch 266. Upon or immediately after turning on the switch 266, the environment sensing system (12, 16, 18, 20) starts detecting obstacles within the label granting field. The label granting component 274 generates a grant request for granting a label on any one of obstacles and/or obstacle vehicles, which the environment sensing system has detected within the label granting field. In order to identify the detected obstacle vehicle, the label has one of different real numbers, for example, 1, 2, 3, . . . The grant requests are applied to the label managing component 278. After receiving the grant requests, the label managing component 278 grant the labels on the associated obstacle vehicles, respectively. The relationship is recorded and held as labeled obstacle vehicles.

The evaluation function forming component 24C inputs distance to each of the labeled obstacle vehicles to compute an evaluation function or term evaluating the degree of risk which the obstacle vehicle imparts to the automobile A.

Subsequently, when it determines that the environment sensing system detects an incoming obstacle vehicle that has come into the label granting field, the label granting component 274 generates a new grant request for application to the label managing component 278. After receiving this grant request, the label managing component 278 grants a new label to the incoming obstacle vehicle. The label managing component 278 records the relationship and holds the record.

Subsequently, when it determines that the environment sensing system loses the labeled vehicle, the label eliminating component 278 generates an elimination request for eliminating the label out of the labeled vehicle. When it determines that the environment sensing system detects an outgoing labeled obstacle vehicle that has left the label holding field, the label eliminating component 278 generates an elimination request for eliminating the label out of the outgoing labeled obstacle vehicle. The elimination requests are applied to the label managing component 278. In response to receiving each of the eliminating requests, the label managing component 278 eliminates the label out of the labeled obstacle vehicle. The label managing component 278 cancels the records on label-eliminated obstacle vehicles.

Let us review the functions of the label granting component 274 and label managing component 278 along with the driving situation in FIG. 28.

In FIG. 28, it is assumed that the label managing component 278 has a record that a label "1" is granted on the obstacle vehicle C. At moment to, the obstacle vehicle B has come into the label granting field. Immediately after the moment $t_0$, the label granting component 274 generates a grant request for granting a label on the obstacle vehicle B. In response to this request, the label managing component 278 grants a label "2" on the obstacle vehicle B. The label managing component 278 holds a record that the label "2" is granted on the obstacle vehicle B. Subsequently, the obstacle vehicles B and C are treated as labeled vehicles, respectively, in forming variables for evaluation.

The following sections provide description on evaluation functions, which are evaluation terms of an evaluation index. The evaluation index may be regarded as an evaluation function.

Now, we consider risk, which a labeled obstacle vehicle imparts to the automobile A. One of measures of risk is a time-to-collision (TTC). As is well known, the TTC is expressed as $(x_i - x_A)/v_A$ with respect to label i. In order to give the minimum when the risk with respect to the label i is optimal, an evaluation term or function is given as $$l_i = \left(\frac{v_A}{x_i - x_A}\right)^2 \tag{69}$$

Next, we consider evaluating a control input $u_x$ to the automobile A and present another evaluation term or function, which is expressed as $$l_x = u_x^2 \tag{70}$$

Further, we consider evaluating state of the automobile A and present another evaluation term or function, which is expressed as $$l_v = (v_A = v^d) \tag{71}$$

Using the above-mentioned evaluation terms or functions, we present the following function L, which is a weighted sum of the evaluation terms. The function L is expressed as $$L = w_{x/x} + w_{v/v} + \sum_i w_i l_i \tag{72}$$

where $w_x$, $w_v$ and we are weighting factors.

We now define an evaluation index or function as $$J = \int_t^{t+T} L d\tau \tag{73}$$

where

T is the evaluating period.

In order to determine control input $u_x(\tau)$ at each time $\tau$ so as to minimize the evaluation index J, it is necessary to predict future behaviors of each of vehicles A, B and C in FIG. 28. We now define appropriate predictor equations as follows.

With respect to the automobile A, we define a predictor equation as $$\dot{x}_A = v_A$$

$$\dot{v}_A = u_x \tag{74}$$

With respect to the labeled obstacle vehicle C, we define a predictor equation as $$\dot{x}_C = v_C$$

$$\dot{v}_C = k_1(x_A - x_C - h_C v_C) + k_2(v_A - v_C) \tag{75}$$

where $k_1$ and $k_2$ are the following characteristic of the labeled obstacle vehicle C;

$h_C$ is the time headway with respect to the automobile A.

This predictor equation is formed using a model that the labeled obstacle vehicle C is following the automobile A.

With respect to the labeled obstacle vehicle B, we define a predictor equation as $$\dot{x}_B = v_B$$

$$\dot{v}_B = 0 \tag{76}$$

This predictor equation is formed based on a model that the labeled obstacle vehicle B travels at a constant speed.

Solving the predictor equations (74), (75) and (76) yields states of the automobile A and the labeled obstacle vehicles B and C over the estimated period $t \leq \tau \leq t+T$. With the states given, we can determine control input $u_x(\tau)$ at each time $\tau$ so as to minimize the evaluation index J.

For the performance of algorithm, a need remains for continuous varying of the evaluation equation L (Equation 72) to ensure continuous varying of control input $u_x(\tau)$ with respect to time. To provide continuous varying of the evaluation equation L, the weighting factor changing component 280 is provided.

With reference to the driving situation in FIG. 28, the operation of the weighting factor changing component 280 is explained.

Before the moment to when the preceding vehicle B is labeled, the evaluation equation L is $$L = w_x f_x + w_v f_v + w_1 f_1 \tag{77}$$

Upon or immediately after the moment to, the evaluation equation L becomes $$L = w_x f_x + w_v f_v + w_1 f_1 + w_2 f_2 \tag{78}$$

In this case, the term $w_2/2$ causes a discontinuity of the evaluation equation L. In order to avoid this discontinuity, the weighting factor $W_2$ is made time dependent $w_2(t)$. Substituting $W_2(t)$ into the equation (78), we have $$L = w_x f_x + w_v f_v + w_1 f_1 + w_2(t)/2 \tag{79}$$

Figure 29:
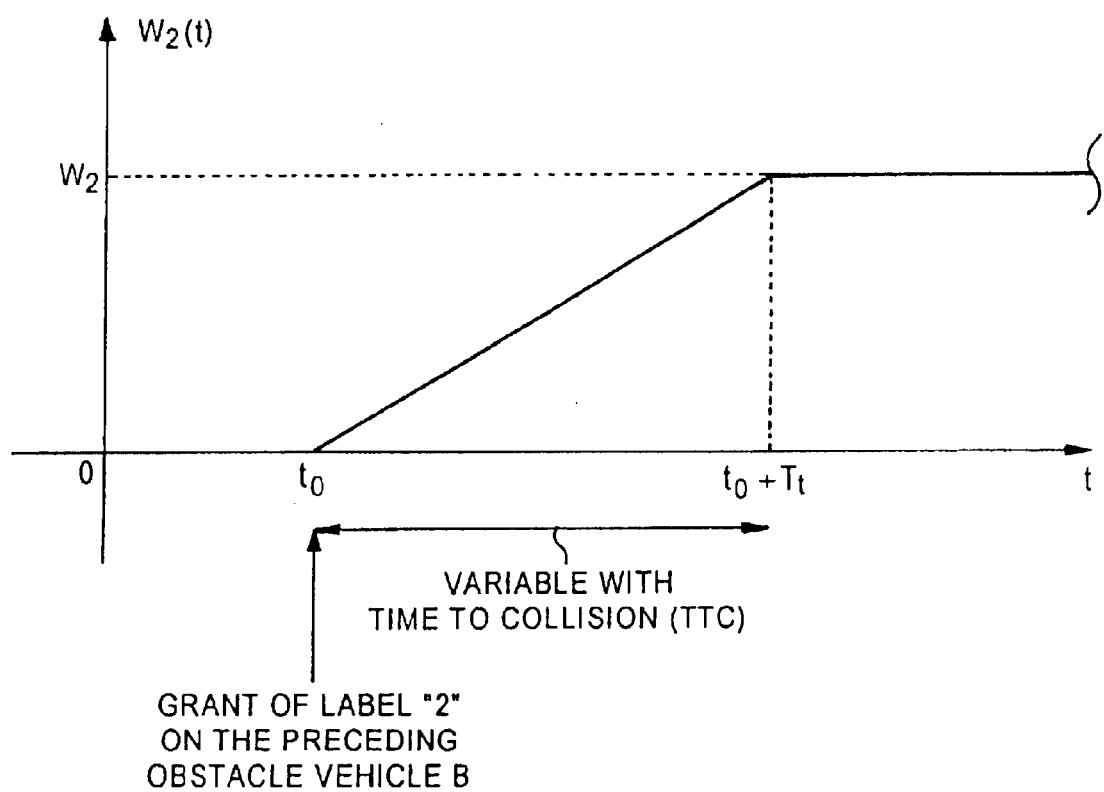
FIG. 29 is a graph illustrating increasing of a weighting factor with time.

Setting $W_2(t_0) = 0$, we have the continuity from the equation (77) to the equation (78). After the moment $t_0$, the time dependent weighting factor $w_2(t)$ increases from zero toward $w_2$ at a gradual rate as illustrated in FIG. 29. Expressing mathematically, we have $$w_2(t) = \begin{cases} \dfrac{w_2}{T_t}(t - t_0) & \ldots t_0 \leq t \leq t_0 + T_t \\ w_2 & \ldots t > t_0 + T_t \end{cases} \tag{80}$$

where $T_t$ is the parameter that determines the rate of variation of $w_2(t)$.

Here, if we set a large value as the parameter $T_t$, the evaluation function L varies gradually, and gradual variation of control input can be expected. However, if the parameter $T_t$ is too long, evaluation for newly detected obstacle vehicle cannot be reflected satisfactorily. Accordingly, in the embodiment, we defines the parameter $T_t$ using the TTC $T_C$ as $$T_t = \begin{cases} T_t^{min} & \ldots T_c < T_c^{min} \\ T_t^{min} + \dfrac{T_t^{max} - T_t^{min}}{T_c^{max} - T_c^{min}}(T_c - T_c^{min}) & \ldots T_c^{min} \leq T_c \leq T_c^{max} \\ T_t^{max} & \ldots T_c > T_c^{max} \end{cases} \tag{81}$$

Here, we define $T_C$ as $$T_c = \begin{cases} -\dfrac{x_2 - x_A}{v_2 - v_A} & \ldots v_A > v_2 \\ \infty & \ldots v_A \leq v_2 \end{cases} \tag{82}$$

In the formula (81), $T_t^{min}$ and $T_t^{max}$ define the lower and upper limits of an adjustable range of the parameter $T_C$. $T_C^{min}$ and $T_C^{max}$ are the appropriate values having the dimension of time.

This section provides the description on one example of determining accelerator reaction force F. Let it be that $u_x^*(t)$ is the value of the optimal solution, with respect to the present moment t, determined so as to minimize the evaluation index or function (73), and $\theta^*(t)$ is the accelerator angle of the accelerator pedal 260 for accomplishing the vehicle acceleration indicated by $u_x^*(t)$. Further, the actual accelerator angle of the accelerator pedal is $\theta(t)$, and the usual reaction force characteristic of the accelerator pedal 260 is $F(\theta)$. Then, the computing device 24C determines servomotor control signal so as to produce reaction force F, which is expressed as $$F = F(\theta(t)) + sat\_f(K(\theta^*(t) - \theta(t))) \tag{83}$$

where

K is the appropriate gain;

f is the upper limit of reaction force correction value.

Here, we define $$sat_{-f}^{f}(x) = \begin{cases} -f & \ldots x < -f \\ x & \ldots -f \leq x \leq f \\ f & \ldots x > f \end{cases} \quad (84)$$

If the actual accelerator angle θ(t) is greater than the accelerator angle determined by the optimal solution, the reaction force increases to prompt the vehicle operator to decelerating the automobile A. If the actual accelerator pedal angle θ(t) is less than the accelerator angle determined by the optimal solution, the reaction force reduces to inform the vehicle operator that s/he can accelerate the automobile A.

Figure 30:
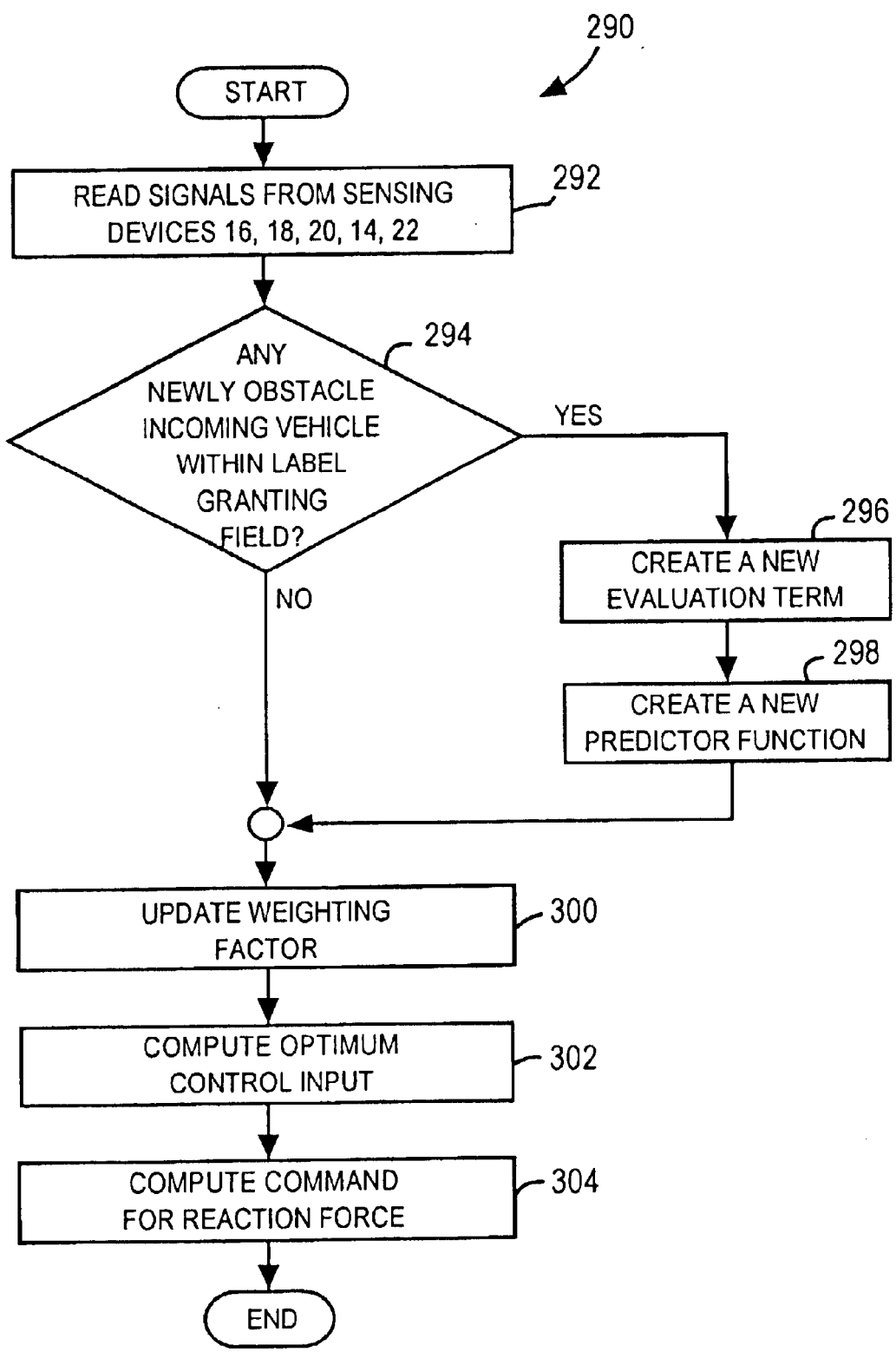
FIG. 30 is a flow chart illustrating operation of the present invention.

The flow chart in FIG. 30 illustrates a control routine 290 implementing the above-mentioned embodiment.

In box 292, the microprocessor reads signals from sensing devices 16, 18, 20, 14 and 22 to locate any obstacle and/or obstacle vehicle.

In box 294, the microprocessor determines whether or not there is any new incoming obstacle vehicle within the label granting field. If this is the case, the microprocessor creates an evaluation term (in box 296) and a predictor equation (in box 298) for the newly incoming obstacle vehicle.

In box 300, the microprocessor updates weighting factor(s) by incrementing with respect to a gradually increasing weighting factor and setting zero (0) as a value within respect to a newly appeared weighting factor.

In box 302, the microprocessor computes to solve the optimization problem to determine control input so as to minimize the evaluation index (73).

In box 304, the microprocessor computes reaction force F using the equation (83) and determines servomotor command needed to produce the reaction force. After box 304, the routine comes to an end to complete one cycle operation.

Figure 31:
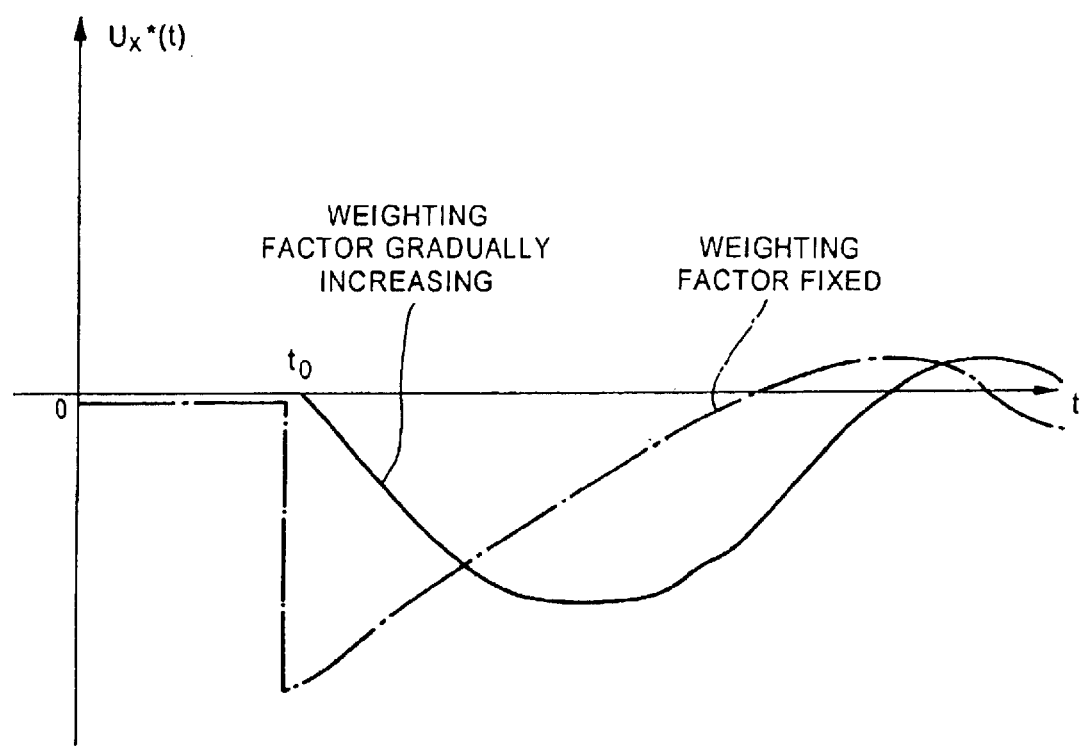
FIG. 31 is a graph illustrating varying of the optimal solution (control input) to the optimization problem.

With reference to FIG. 31, the fully drawn curve and the one-dot chain line curve illustrate varying of the optimal solution $u_x^*(t)$ with time before and after the moment to when the preceding obstacle vehicle B has come into the label granting field. It is assumed, here, that the vehicle operator traces the optimal solution $u_x^*(t)$ by accelerating or decelerating the automobile A. The fully drawn line illustrates the case where the weighting factor $w_2(t)$ increases at a gradual rate. The one-dot chain line curve illustrates the case where the weighting factor $w_2$ is fixed.

From the preceding description, it will be appreciated that the occurrence of discontinuity of the evaluation index J (73) has been avoided by providing the time dependent weighting factor $w_2(t)$ that is used in the evaluation equation L (72).

Because the discontinuity of the evaluation index J is avoided, making assumption that the optimal solution is continuous can shorten the computational time. The performance of algorithm is maintained. Smooth variation in accelerator reaction force has been accomplished without causing any objectionable feel to the vehicle operator.

As described above, the weighting factor $w_i$ providing the weighting on the evaluation term $w_i/_i$ equal is zero upon receiving a grant request for granting a label on the newly incoming obstacle vehicle into the label granting field. Subsequently, the weighting factor is increased from zero at a rate with time.

The rate at which the weighting factor is increased is determined by TTC of the automobile with respect to the labeled obstacle vehicle.

If desired, the rate at which the weighting factor is increased is determined by TTC of the automobile with respect to the labeled obstacle vehicle after an initial stage of increasing of the weighting factor and before a final stage thereof. During the initial and final stages, the rate at which the weighting factor is set in the neighborhood of zero.

Another embodiment can be understood with reference to FIGS. 32 to 35. The hardware and software components used in this embodiment are the same as those used in the above described embodiment.

Figure 32:
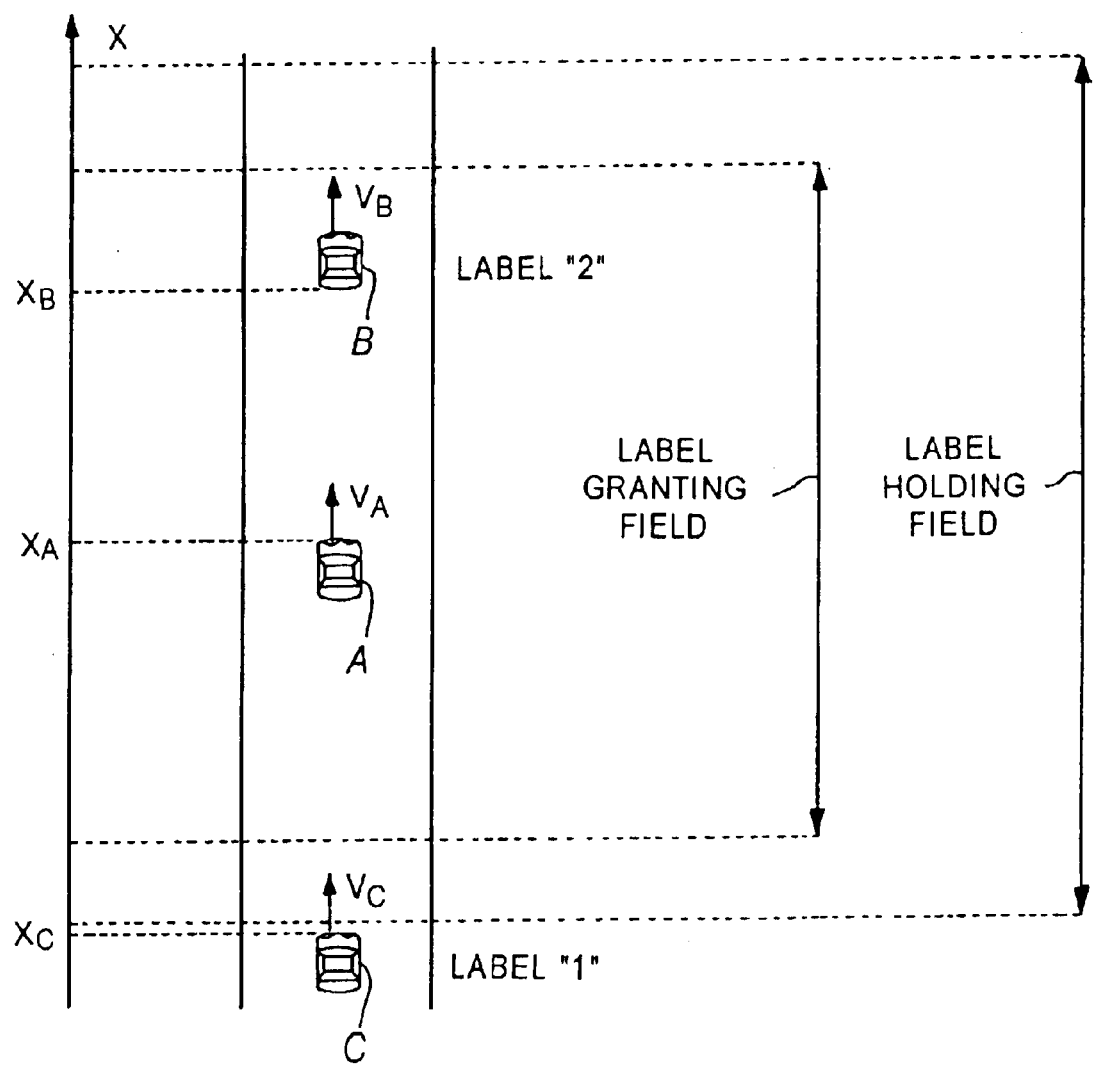
Figure 33:
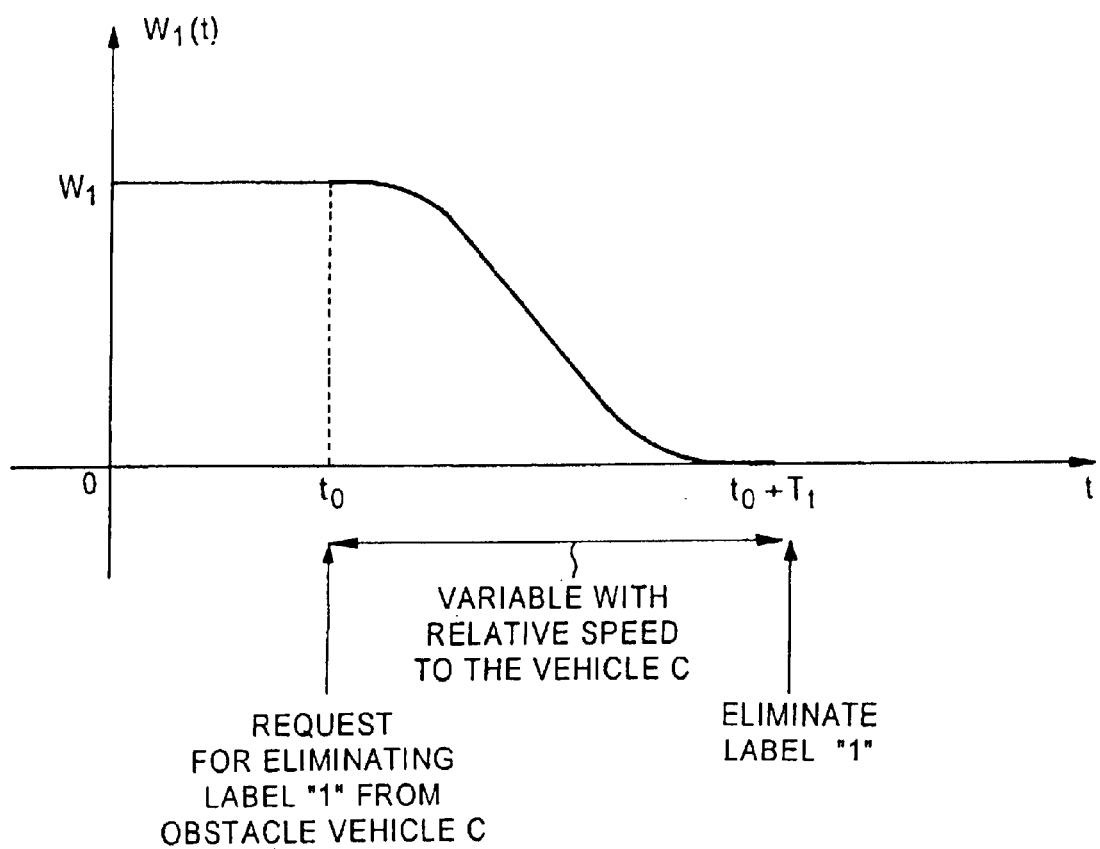
FIG. 33 is a graph illustrating decreasing of a weighting factor with time.

FIG. 32 illustrates a situation at the moment to when the labeled obstacle vehicle C has lost speed and left the label holding field. The evaluation equation L (78) holds immediately before the moment to.

With reference also to FIG. 27, immediately after the moment $t_0$, the label eliminating component 276 generates an elimination request for eliminating the label "1" from the labeled obstacle vehicle C. If the label managing component 278 eliminates the label "1"30 from the obstacle vehicle C immediately in response to the elimination request, the evaluation equation L is rewritten as $$L = w_x l_x + w_v l_v + w_2 l_2 \quad (85)$$

The elimination of the term will causes a reduction in L, amounting to the discontinuity in the evaluation equation. According to this embodiment, therefore, the label managing component 278 will not eliminate the label "1" upon receiving the elimination request. Instead, the label managing component 278 issues command, asking the weighting factor changing component 280 to alter a weighting factor $w_1$ for the label "1". That is, the evaluation equation L is written as $$L(t) = w_x l_x + w_v l_v + w_1(t) l_1 + w_2 l_2 \quad (86)$$

The time dependent weighting factor $w_1(t)$ reduces from the designed value $w_1$ toward zero at a gradual rate. The label managing component 278 eliminates the label "1" from the obstacle vehicle C when the weighting factor $w_1(t)$ has sufficiently reduced toward zero (0). Using such time dependent weighting factor $w_1(t)$, the discontinuity of the evaluation equation L is avoided.

The rate of reduction in the weighting factor $w_1(t)$ may be constant in the similar manner as expressed by the equation (80). However, quick response is not required in this case. Thus, the rate is varied to provide a smooth change in the weighting factor $w_1(t)$ as illustrated by the fully drawn curve in FIG. 33. Mathematically expressing, the weighting factor $w_1(t)$ is given as $$w_1(t) = \begin{cases} \dfrac{w_1}{2}\left(1 - \cos\dfrac{(t-t_o)\pi}{T_t}\right) & \ldots t_o \leq t \leq t_o + T_t \\ 0 & \ldots t > t_o + T_t \end{cases} \quad (87)$$

If the weighting factor $w_1(t)$ is subject to variation as expressed or governed by the equation (87), the following relation holds at the initial and final stage of this transient change from the designed value w, to zero (0).

$$\left.\frac{dw_1}{dt}\right|_{t=t_0} = \left.\frac{dw_1}{dt}\right|_{t=t_0+T_t} = 0 \quad (88)$$

The equation clearly indicates that the rate of reduction in $w_1(t)$ is zero at the initial stage and the final stage. The parameter $T_t$ may not be given as a function of TTC $T_C$, see equation (81) because TTC becomes infinite. Thus, in the present case, the parameter $T_t$ is given as $$T_t = \tag{89}$$

$$\begin{cases} T_t^{min} & \dots v_A - v_C < R_d^{min} \\ T_t^{min} + \dfrac{T_t^{max} - T_t^{min}}{R_d^{max} - R_d^{min}}(v_A - v_C - R_d^{min}) & \dots R_d^{min} \le v_A - v_C \le R_d^{max} \\ T_t^{max} & \dots v_A - v_C > R_d^{max} \end{cases}$$

where $R_d^{max}$ and $R_d^{min}$ are the appropriate real numbers having the dimension of velocity.

We have to consider the case the separating obstacle vehicle disappears from the detectable range by sensing system of the automobile A before the weighting factor matches zero (0). In this case, in order to continue calculation of the evaluation term (69), estimates are created using measures $x_C^{c1}$ and $v_C^{c1}$, which were detected at moment $t^{c1}$ immediately before the disappearance of obstacle vehicle C. The estimates are given as $$\dot{x}_C = v_C^{c1} \quad x_C(t^{c1}) = x_C^{c1}$$

$$\dot{v}_C = 0 \quad v_C(t^{c1}) = v_C^{c1} \tag{90}$$

Figure 34:
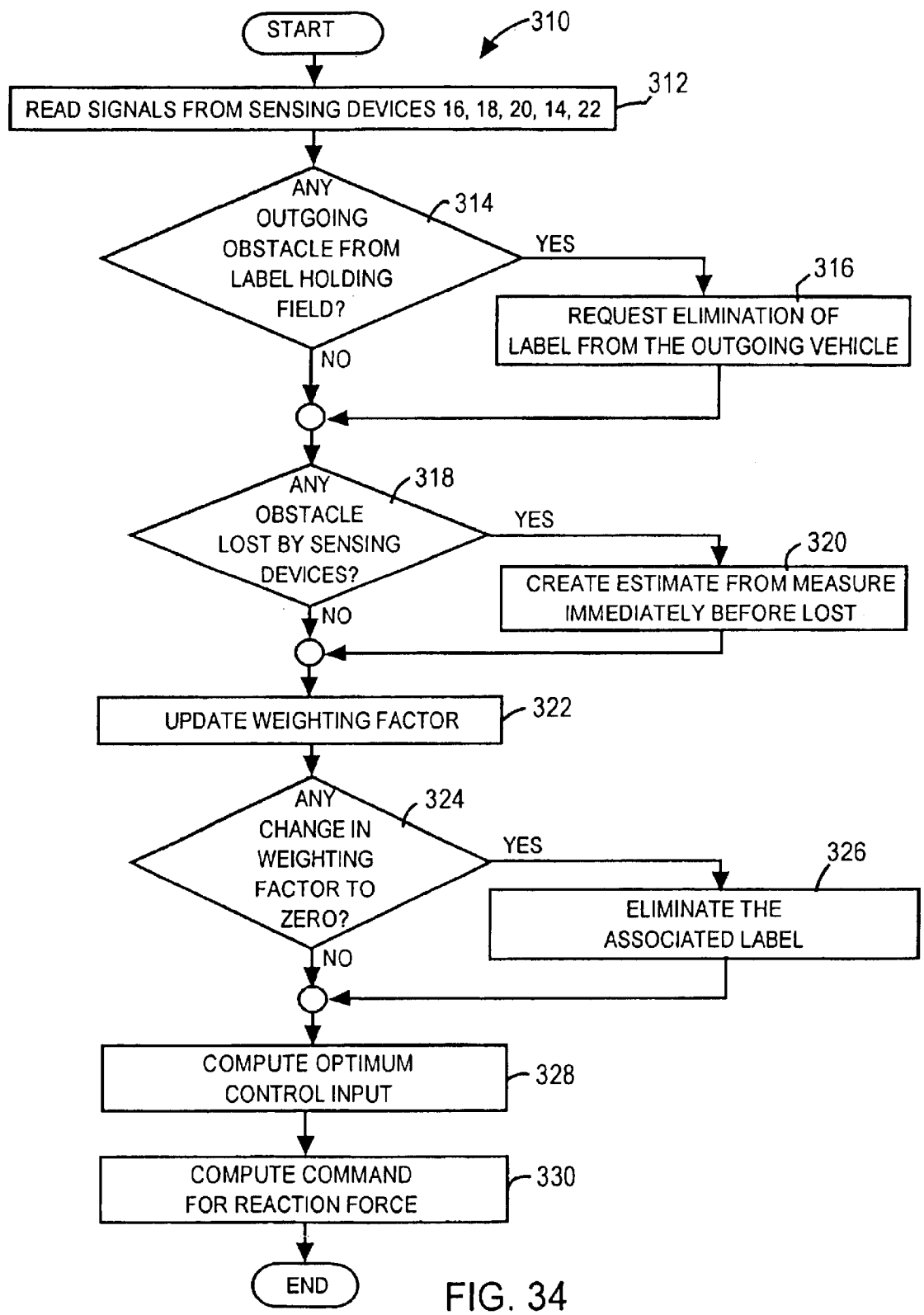
FIG. 34 is a flow chart illustrating operation of the present invention.

The flow chart in FIG. 34 illustrates a control routine 310 implementing the above-mentioned embodiment.

In box 312, the microprocessor reads signals from sensing devices 16, 18, 20, 14 and 22 to locate any obstacle and/or obstacle vehicle.

In box 314, the microprocessor determines whether or not there is any outgoing labeled vehicle from the label holding field. If this is the case, in box 316, the microprocessor requests elimination of label from the outgoing vehicle.

In box 318, the microprocessor determines whether or not any one of labeled obstacle vehicles is lost by the sensing system. If this is the case, in box 320, the microprocessor creates estimates, as expressed by the equation (90), using measures immediately before the labeled obstacle vehicle has been lost.

In box 322, the microprocessor updates weighting factor(s) by decreasing with respect to a gradually decreasing weighting factor and leaving the other weighting factor(s) as they are.

In box 324, the microprocessor determines whether or not there is any weighting factor that has changed to zero. If this is the case, in box 326, the microprocessor eliminates the label, its evaluation term, and its predictor equation.

In box 326, the microprocessor computes to solve the optimization problem to determine control input so as to minimize the evaluation index (73).

In box 330, the microprocessor computes reaction force F using the equation (83) and determines servomotor command needed to produce the reaction force. After box 330, the routine comes to an end to complete one cycle operation.

Figure 35:
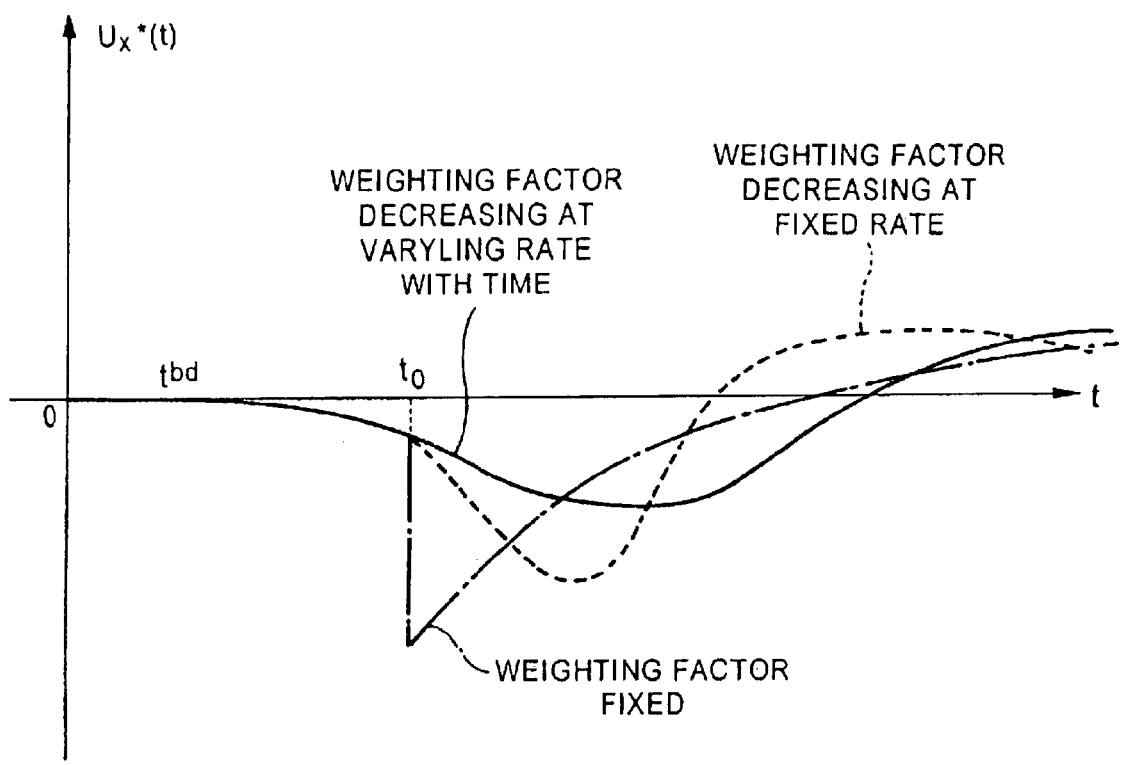
FIG. 35 is a graph illustrating varying of the optimal solution (control input) to the optimization problem.

With reference to FIG. 35, the fully drawn curve, the dotted line curve and the one-dot chain line curve illustrate varying of the optimal solution $u_x^*(t)$ with time before and after the moment $t_0$ when the following obstacle vehicle C has gone out of the label holding field. It is assumed, here, that the vehicle operator traces the optimal solution $u_x^*(t)$ by accelerating or decelerating the automobile A. The scenario is that until the moment $t^{bd}$, the obstacle vehicles B and C travel at fast as the automobile A. Immediately after the moment $t^{bd}$, the vehicle C slows down and leaves the label holding field at moment $t_0$. The fully drawn line illustrates the case where the weighting factor $w_1(t)$ decreases at varying rate. The dotted ine curve illustrates the case where the weighting factor $w_1(t)$ decreases at fixed rate. The one-dot chain line curve illustrates the case where the weighting factor $w_1$ is fixed. From the fully drawn curve, it is appreciated that the optimal solution varies smoothly.

Figure 36:
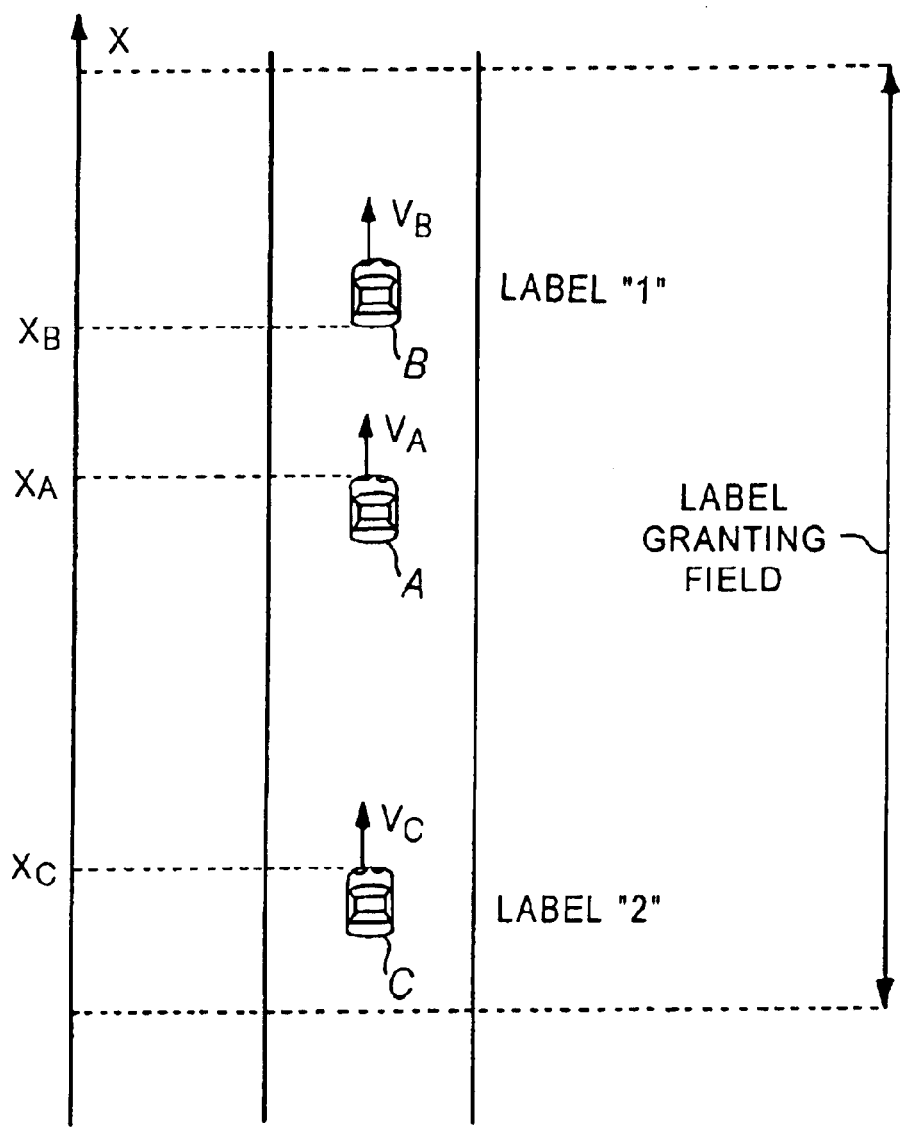
Figure 37:
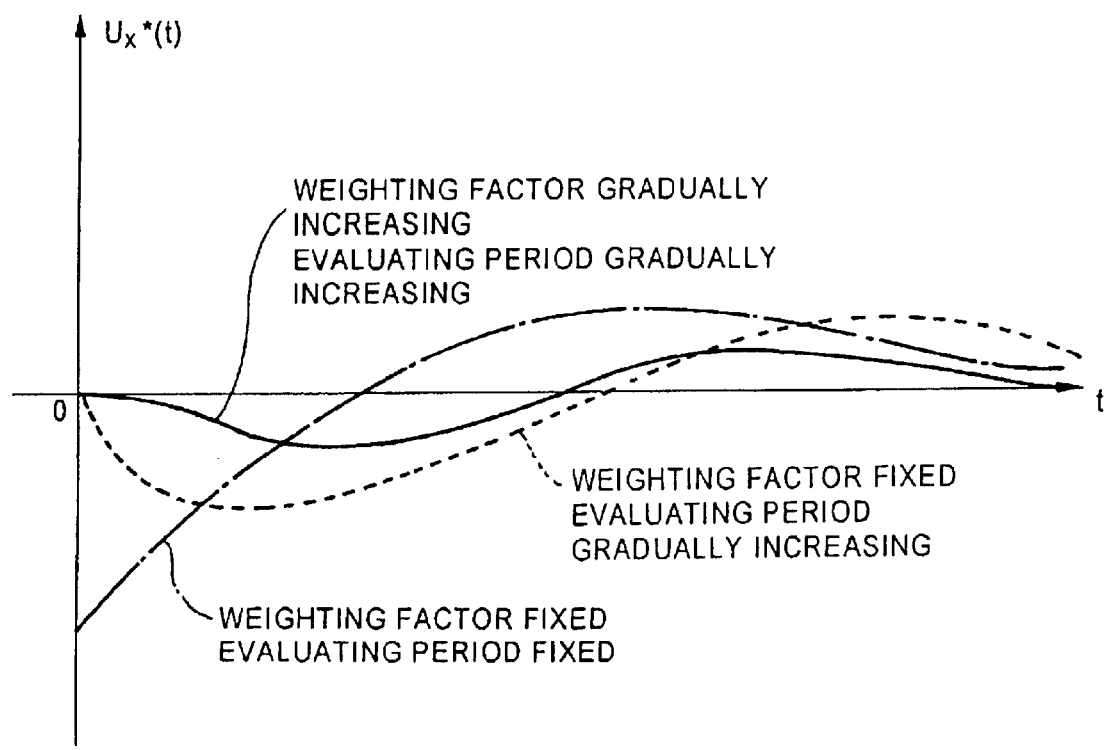
FIG. 37 is a graph illustrating varying of the optimal solution (control input) to the optimization problem.

Another embodiment can be understood with reference to FIGS. 36 and 37. The hardware and software components used in this embodiment are the same as those used in the above described embodiment and illustrated in FIG. 27.

FIG. 36 illustrates a situation when the automobile A travels as fast as the obstacle vehicle B and C within the label granting field. Under this condition, we consider the case where the system switch 266 is turned on at the moment t=0.

Immediately after the system switch 266 has been turned on, the environment sensing system detects the obstacle vehicles B and C within the label holding field. The label granting component 274 generates grant requests for granting labels on the obstacle vehicles B and C, respectively. Upon receiving such grant requests, the label managing component 278 grants a label "1" on the obstacle vehicle B and a label "2" on the obstacle vehicle C.

Since both of the obstacle vehicles B and C are regarded as new incoming vehicles, an evaluation equation L(t) is given as $$L(x) = w_x l_x + w_v l_v + w_1(t) l_1 + w_2(t) l_2 \tag{91}$$

In this embodiment, too, the equations (80) to (82) may be used to vary the weighting factors, and the equations (74) to (76) may be used as predictor equations.

Immediately after the system switch 266 has been turned on, no information as to the optimal solution is available. Under this condition, as mentioned before, the evaluating period T of the evaluation index J (73) is varied from zero at a gradual rate to the designed value so as to solve the optimization problem.

The evaluating period T is given as $$T(t) = T_0(1 - exp(\alpha t)) \tag{92}$$

where

T(t) is the evaluating period at moment t;

$T_0$ is the designed value of the evaluating period;

$\alpha$ is the appropriate positive real number.

With reference to FIG. 37, the fully drawn curve, the dotted line curve and the one-dot chain line curve illustrate varying of the optimal solution $u_x^*(t)$ with time after the moment t=0 when the system switch 266 has been turned on. The fully drawn line illustrates the case where the weighting factor increases gradually and the evaluating period increases gradually. The dotted line curve illustrates the case where the weighting factor is fixed and the evaluating period increases gradually. The one-dot chain line curve illustrates the case where the weighting factor is fixed and the evaluating period fixed. From the fully drawn curve, it is appreciated that the optimal solution varies smoothly immediately after the system switch 266 has been turned on.

While the present invention has been particularly described, in conjunction with various implementations of the present invention, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese patent applications no. 2002-025181, filed Feb. 1, 2002, and no. 2002-243212, filed Aug. 23, 2002, the disclosure of each of which is hereby incorporated by reference in its entirety.

What is claimed is:

1. A method for improving operator assistance of an automobile, the method comprising:
   collecting, on substantially real time basis, data on the automobile and on intervehicle relationship involving the automobile;
   processing the data to determine variables for evaluation; and
   evaluating the determined variables to recommend a control input.

2. The method as claimed in claim 1,
   wherein the data processing includes:
   predicting future behavior of obstacle vehicle around the automobile in response to a given control input to the automobile; and
   wherein the evaluating includes:
   correlating the predicted future behavior with the given control input in determining whether or not the given control input is to be recommended.

3. The method as claimed in claim 2, further comprising:
   generating a control signal in response to the recommended control input.

4. The method as claimed in claim 3, wherein the control signal prompts the operator to applying the recommended control input to the automobile.

5. The method as claimed in claim 4, wherein the control signal is an actuator command.

6. The method as claimed in claim 4, wherein the collected data include data on locations of the obstacle vehicle(s) around the automobile and lane(s) adjacent the automobile.

7. The method as claimed in claim 6, wherein the collected data include data on vehicle speed of the automobile.

8. The method as claimed in claim 2, wherein the predicting obstacle vehicle behavior includes:
   detecting location of the obstacle vehicle around the automobile;
   detecting lanes adjacent the automobile;
   detecting vehicle speed of the automobile;
   determining relative position to the obstacle vehicle and vehicle speed of the obstacle vehicle to create a map; and
   presenting a predictor equation expressing time dependent variations of the intervehicle relationship in the map.

9. The method as claimed in claim 8, wherein the evaluating includes:
   correlating the time dependent variations of the intervehicle relationship in the map with future time dependent variation of the recommenced control input.

10. The method as claimed in claim 8, wherein the map and the predictor equation are used in the evaluating the determined variables to recommend a control input.

11. The method as claimed in claim 1, wherein the data processing includes:
    generating a grant request for granting a label on one of the obstacle vehicles around the automobile;
    generating an elimination request for eliminating a label from the one obstacle vehicle;
    recording relationship between each of the obstacle vehicles and a label;
    updating the relationship in response to generation of the grant request and the elimination request;
    providing an evaluation function including a weighted sum of a first evaluation term for control input to the automobile, a second evaluation term for state of the automobile, and a third evaluation term for risk applied to the automobile by the labeled obstacle vehicle; and
    modifying weighting on the third term upon receiving one of the grant request and elimination request with respect to labeling of the associated obstacle vehicle.

12. The method as claimed in claim 8, wherein the data collecting includes:
    monitoring an environment sensing system of the automobile and a state sensing system of the automobile.

13. The method as claimed in claim 12, wherein the evaluating includes:
    computing an evaluation index indicative of the result of evaluation of the future time dependent variation of the intervehicle relationship of the obstacle vehicles with respect to future time dependent variation of any given control input; and
    finding a control input with the best score of the computed evaluation index at each of future time.

14. The method as claimed in claim 13, wherein the evaluating includes:
    providing terminal conditions indicative of a desired future behavior of the automobile; and wherein
    the evaluation index is computed with the restraint defined by the terminal conditions.

15. The method as claimed in claim 13, wherein the predictor equation accounts for interaction between the automobile and the obstacle vehicle.

16. The method as claimed in claim 13, wherein, when the automobile determines lane change intention of one of obstacle vehicles via attitude taken by the obstacle vehicle, the predictor equation for the obstacle vehicle is modified.

17. The method as claimed in claim 13, wherein, when the automobile is equipped with a road map based guidance system, the predictor equation is modified in response to information provided by the road map based guidance system.

18. The method as claimed in claim 13, wherein the evaluation index includes a plurality of different evaluation functions.

19. The method as claimed in claim 18, wherein the plurality of different evaluation functions are selectively included by the evaluation index in response to a desired maneuver preferred by the operator.

20. The method as claimed in claim 18, wherein, when the automobile is equipped with a road map based guidance system, the plurality of different evaluation functions are selectively included by the evaluation index in response to information provided by the road map based guidance system.

21. The method as claimed in claim 14, wherein, when the automobile is equipped with a road map based guidance system, the terminal conditions are created in response to one of control input by the operator and Information provided by the road map based guidance system.

22. The method as claimed in claim 12, wherein the recommended control input is updated, and wherein the recommenced control input before updating is used to predict lane change of one of the obstacle vehicles, and the predicted result of lane change is used to change the form of the predictor equation and the form of the evaluation index.

23. The method as claimed in claim 12, further comprising processing the predictor equation using the recommended control input to predict trajectories of the automobile and the obstacle vehicles.

24. The method as claimed in claim 12, wherein the step of evaluating the determined variables to recommend a control input is repeated on time frame driven basis.

25. The method as claimed in claim 12, wherein the step of evaluating the determined variables to recommend a control input is repeated on event driven basis.

26. The method as claimed In claim 12, wherein the step of evaluating the determined variables to recommend a control input is repeated upon event driven basis including occurrence of error in predicting the trajectories.

27. The method as claimed in claim 1, wherein the generating a grant request includes:
generating a grant request for granting a label on an incoming obstacle vehicle, which has just come into a label granting field around the automobile; and
wherein the generating an elimination request includes:
eliminating an elimination request for eliminating a label from an outgoing obstacle vehicle, which has just left a label holding filed around the automobile and an elimination request for eliminating a label from an obstacle vehicle, which has just disappeared.

28. The method as claimed in claim 11, wherein the updating the relationship includes:
setting a weighting factor providing the weighting on the third term equal to zero upon receiving a grant request for granting a label on the associated obstacle vehicle; and
subsequently increasing the weighting factor from zero at a rate with time.

29. The method as claimed in claim 28, wherein the rate at which the weighting factor is increased is determined by a time-to-collision (ITC) of the automobile with respect to the obstacle vehicle.

30. The method as claimed in claim 28, wherein the rate at which the weighting factor is increased is determined by a time-to-collision (ITC) of the automobile with respect to the obstacle vehicle after an initial stage of increasing of the weighting factor and before a final stage thereof, and during the initial and final stage, the rate at which the weighting factor is set in the neighborhood of zero.

31. The method as claimed in claim 11, wherein the updating the relationship includes:
reducing, at a gradual rate, a weighting factor providing the weighting on the third term toward zero upon receiving an elimination request for eliminating a label from the associated obstacle vehicle; and
subsequently eliminating the label from the associated obstacle vehicle.

32. The method as claimed in claim 31, wherein, when the associated obstacle vehicle disappears before reduction of the weighting factor to zero, the third term estimated by distance to and relative speed to the associated obstacle vehicle immediately before the disappearance.

33. The method as claimed in claim 31, wherein the rate at which the weighting factor is reduced is determined by a time-to-collision (TTC) of the automobile with respect to the obstacle vehicle.

34. The method as claimed in claim 31, wherein the rate at which the weighting factor is reduced is determined by a time-to-collision (TTC) of the automobile with respect to the obstacle vehicle after an initial stage of reducing of the weighting factor and before a final stage thereof, and during the initial and final stage, the rate at which the weighting factor is set in the neighborhood of zero.

35. The method as claimed in claim 11, wherein the control input includes an operator acceleration/deceleration command.

36. The method as claimed in claim 11, wherein the state of the automobile includes vehicle speed of the automobile.

37. The method as claimed in claim 11, wherein the risk increases as the distance to the labeled obstacle vehicle reduces and the relative speed to the labeled vehicle increases.

38. A system for improving operator assistance of an automobile, the system comprising:
sensing devices for collecting, on substantially real time basis, data on the automobile and on intervehicle relationship involving the automobile;
a component for processing the data to determine variables for evaluation; and
a component for evaluating the determined variables to recommend a control input.

39. A method for improving operator assistance of an automobile, the method comprising;
collecting, on substantially real time basis, data on the automobile and on intervehicle relationship involving the automobile;
presenting a behavior predictor equations to each of the automobile and obstacle vehicles forming the intervehicle relationship;
presenting an evaluation index including at least one evaluation function;
determining a solution so as to minimize the evaluation index using the behavior predictor equations; and
recommending the determined solution as a control input.

40. A system for improving operator assistance of an automobile, the system comprising:
means for collecting, on substantially real time basis, data on the automobile and on intervehicle relationship involving the automobile;
means for processing the data to determine variables for evaluation; and
means for evaluating the determined variables to recommend a control input.

41. The system as claimed in claim 38,
wherein the data processing component predicts future behavior of obstacle vehicle around the automobile in response to a given control input to the automobile by detecting location of the obstacle vehicle around the automobile; detecting lanes adjacent the automobile; detecting vehicle speed of the automobile; determining relative position to the obstacle vehicle and vehicle speed of the obstacle vehicle to create a map; and presenting a predictor equation expressing time dependent variations of the intervehicle relationship in the map; and
wherein the evaluating component correlates the predicted future behavior with the given control input in determining whether or not the given control input is to be recommended.

42. The system as claimed in claim 41, wherein the evaluating component correlates the time dependent variations of the intervehicle relationship in the map with future time dependent variation of the recommenced control input.

43. The system as claimed in claim 41, wherein the map and the predictor equation are used in the evaluating the determined variables to recommend a control input.

44. The system as claimed in claim 41, wherein the sensing devices collect the data by monitoring an environment sensing system of the automobile and a state sensing system of the automobile.

45. The system as claimed in claim 44, wherein the evaluating component computes an evaluation index indicative of the result of evaluation of the future time dependent variation of the intervehicle relationship of the obstacle vehicles with respect to future time dependent variation of any given control input; and finds a control input with the best score of the computed evaluation index at each of future time.

46. The system as claimed in claim 45,
    wherein the evaluating component provides terminal conditions indicative of a desired future behavior of the automobile; and
    wherein the evaluation index is computed with the restraint defined by the terminal conditions.

47. The system as claimed in claim 45, wherein the predictor equation accounts for interaction between the automobile and the obstacle vehicle.

48. The system as claimed in claim 45, wherein, when the automobile determines lane change intention of one of obstacle vehicles via attitude taken by the obstacle vehicle, the predictor equation for the obstacle vehicle is modified.

49. The system as claimed in claim 45, wherein the evaluation index includes a plurality of different evaluation functions.

50. The system as claimed in claim 49, wherein, when the automobile is equipped with a road map based guidance system, the plurality of different evaluation functions are selectively included by the evaluation index in response to information provided by the road map based guidance system.

51. The system as claimed in claim 44, wherein the recommended control input is updated, and wherein the recommenced control input before updating is used to predict lane change of one of the obstacle vehicles, and the predicted result of lane change is used to change the form of the predictor equation and the form of the evaluation index.

52. The system as claimed in claim 44, further comprising means for processing the predictor equation using the recommended control input to predict trajectories of the automobile and the obstacle vehicles.

53. The system as claimed in claim 44, wherein the evaluating component repeats evaluating the determined variables to recommend a control input on event driven basis.

* * * * *